(12) United States Patent
Toyota et al.

(10) Patent No.: US 11,476,744 B2
(45) Date of Patent: Oct. 18, 2022

(54) ELECTROMAGNETIC ACTUATOR AND VIBRATION GENERATOR INCLUDING THE SAME

(71) Applicant: HOSIDEN CORPORATION, Yao (JP)

(72) Inventors: Naoki Toyota, Yao (JP); Hitoshi Ao, Yao (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 17/241,402

(22) Filed: Apr. 27, 2021

(65) Prior Publication Data

US 2021/0359583 A1 Nov. 18, 2021

(30) Foreign Application Priority Data

May 12, 2020 (JP) .............................. JP2020-083599
Oct. 30, 2020 (JP) .............................. JP2020-182995

(51) Int. Cl.
*H02K 33/16* (2006.01)
*H01F 7/16* (2006.01)
(Continued)

(52) U.S. Cl.
CPC ............ *H02K 33/16* (2013.01); *H01F 7/081* (2013.01); *H01F 7/122* (2013.01); *H01F 7/1646* (2013.01)

(58) Field of Classification Search
CPC .... H02K 33/16; H02K 41/0356; H01F 7/081; H01F 7/122; H01F 7/1646; H01F 2007/086; G06F 3/016
See application file for complete search history.

(56) References Cited

U.S. PATENT DOCUMENTS

| 10,084,367 | B2 * | 9/2018 | Mao ..................... H02K 99/20 |
| 2011/0012441 | A1 * | 1/2011 | Oh ......................... H02K 33/16 310/25 |

(Continued)

FOREIGN PATENT DOCUMENTS

| JP | 58-28468 Y2 | 6/1983 |
| JP | 2008-228545 A | 9/2008 |
| JP | 2011-97747 A | 5/2011 |

OTHER PUBLICATIONS

Partial European search report issued by the European Patent Office for European patent application No. 21171646.9, dated Sep. 23, 2021, 29 pages.

(Continued)

*Primary Examiner* — Bernard Rojas
(74) *Attorney, Agent, or Firm* — Kilyk & Bowersox, P.L.L.C

(57) ABSTRACT

An electromagnetic actuator including a coil; a non-movable part constituted by a magnetic substance and disposed on one side relative to the coil; and a movable part including a permanent magnet on the other side relative to the coil. Applying a current to the coil alternately generates first and third driving forces to move the magnet and the movable part to one and the other sides in a first direction relative to the coil and the non-movable part. As the movable part moves from a neutral position to the one side in the first direction, a portion of the magnet positioned on the one side in the first direction relative to the first end of the first non-movable part gradually enlarges and is magnetically attracted toward the non-movable part. As the movable part moves from the neutral position to the other side in the first direction, a portion of the magnet positioned on the other side in the first direction relative to the second end of the first (Continued)

non-movable part gradually enlarges and is magnetically attracted toward the non-movable part.

20 Claims, 34 Drawing Sheets

(51) Int. Cl.
    *H01F 7/122*     (2006.01)
    *H01F 7/08*     (2006.01)

(56) References Cited

U.S. PATENT DOCUMENTS

| 2011/0101796 A1* | 5/2011 | Odajima | H02K 33/16 |
| | | | 310/25 |
| 2016/0254736 A1* | 9/2016 | Jin | H02K 33/18 |
| | | | 310/25 |

OTHER PUBLICATIONS

Partial European search report issued by the European Patent Office for European patent application No. 21202442.6, dated Feb. 18, 2022, 25 pages.

\* cited by examiner

ELECTROMAGNETIC ACTUATOR AND VIBRATION GENERATOR INCLUDING THE SAME

CROSS-REFERENCE TO RELATED APPLICATIONS

The present application claims priority under 35 U.S.C. § 119 of Japanese Patent Application No. 2020-083599 and 2020-182995 filed on May 12, 2020, and Oct. 30, 2020, respectively, the disclosures of which are expressly incorporated by reference herein in their entireties.

BACKGROUND OF THE INVENTION

Technical Field

The present invention relates to electromagnetic actuators and vibration generators including the same.

Background Art

A conventional vibration generator is disclosed in Japanese Unexamined Patent Application Publication No. 2011-97747. This electromagnetic actuator includes a magnet, first and second yokes, an annular coil, first and second weights, first and second shafts, and first, second, third, and fourth coil springs, and first and second spring receivers.

The magnet is a plate extending in a first direction. The magnet includes a first face on one side in a second direction and a second face on an opposite side thereof. The second direction is a thickness direction of the magnet and is orthogonal to the first direction. The first yoke is a plate extending in the first direction and is fixed to the first face of the magnet. The first yoke includes a dimension in the first direction that is larger than that of the magnet. The second yoke includes a flat plate and a pair of pieces. The flat plate extends in the first direction and faces the second face of the magnet with a clearance therebetween in the second direction. The pieces extend in the second direction from the opposite ends in the first direction of the flat plate to be fixed to the opposite ends in the first direction of the first yoke. The coil is disposed between the magnet and the flat plate.

The first and second weights extend in a third direction. Each of the first and second weights includes a first end portion on one side in the third direction, a second end portion on the other side in the third direction, and an intermediate portion between the first and second end portions. The intermediate portion of the first weight is fixed to the first and second yokes and positioned on one side in the first direction relative to the magnet and the coil. The first and second end portions of the first weight extend to the one and the other sides in the third direction, further than the first and second yokes. The intermediate portion of the second weight is fixed to first and second yokes and positioned on the other side in the first direction relative to the magnet and the coil. The first and second end portions of the second weight extend to the one and the other sides in the third direction, further than first and second yokes.

The first shaft extends in the first direction to be located on the one side in the third direction relative to the first and second yokes, the magnet, and the coil. The first shaft extends through the first end portions of the first and second weights in the first direction. The second shaft extends in the first direction to be located on the other side in the third direction relative to the first and second yokes, the magnet, and the coil. The second shaft extends through the second end portions of the first and second weights in the first direction. The first and second weights, the first and second yokes, and the magnet (these will be collectively referred to as a movable part) are movable along the first and second shafts.

The first spring receiver is fixed in position in the first direction between the first end portions of the first and second weights and receives therethrough the first shaft. The second spring receiver is fixed in position in the first direction between the second end portions of the first and second weight and receives therethrough the second shaft.

The first coil spring is disposed around the first shaft to be located between the first end portion of the first weight and the first spring receiver. The second coil spring is disposed around the first shaft to be located between the first end portion of the second weight and the first spring receiver. The third coil spring is disposed around the second shaft to be located d between the second end portion of the first weight and the second spring receiver. The fourth coil spring is disposed around the second shaft to be located between the second end portion of the second weight and the second spring receiver.

The conventional vibration generator is configured to generate vibration by applying a square-wave or sine-wave current to the coil so that the movable part repeatedly reciprocates in the first direction along the first and second shafts in the following manner. When the movable part moves to the one side in the first direction, the second coil spring is compressed between the first spring receiver and the first end portion of the second weight of the movable part, and the fourth coil spring is compressed between the second spring receiver and the second end portion of the second weight. The compressed second coil spring urges the first end portion of the second weight of the movable part to the other side in the first direction, and the compressed fourth coil spring urges the second end portion of the second weight of the movable part to the other side in the first direction. When the movable part moves to the other side in the first direction, the first coil spring is compressed between the first spring receiver and the first end portion of the first weight of the movable part, and the third coil spring is compressed between the second spring receiver and the first end portion of the second weight of the movable part. The compressed first coil spring urges the first end portion of the first weight of the movable part to the one side in the first direction, and the compressed third coil spring urges the first end portion of the second weight of the movable part is urged to the one side in the first direction. In short, the first to fourth coil springs, the first and second weights, and the first and second spring receivers apply such driving forces as to move the movable part, which has moved to one or the other side in the first direction, in the opposite direction.

SUMMARY OF INVENTION

The second coil spring abuts the first spring receiver and the first end portion of the second weight, the fourth coil spring abuts the second spring receiver and the second end portion of the second weight, the first coil spring abuts the first spring receiver and the first end portion of the first weight, and the third coil spring abuts the second spring receiver and the first end portion of the second weight.

The invention provides an electromagnetic actuator and a vibration generator capable of applying a driving force to a movable part in a non-contact manner in a direction opposite to a moving direction.

A first electromagnetic actuator according to an aspect of the invention includes a first coil, a first non-movable part, and a movable part being movable in a first direction and including a permanent magnet. The first direction is a moving direction of the movable part. The first non-movable part is constituted by a magnetic substance and extends in a first direction. The first non-movable part is disposed on one side in a second direction relative to the first coil, and includes a first end on one side in the first direction. The second direction is substantially orthogonal to the first direction. The permanent magnet of the movable part extends in the first direction. The permanent magnet of the movable part is disposed on the other side in the second direction relative to the first coil, and includes a first end portion on the one side in the first direction. The first end portion of the permanent magnet of the movable part has a first end on the one side in the first direction. The movable part at a neutral position is disposed such that the first end of the permanent magnet is at a relative position in the first direction that substantially coincides with the first end of the first non-movable part, or such that the first end portion of the permanent magnet is positioned, in the first direction, on the one side in the first direction relative to the first end of the first non-movable part.

Applying a current to the first coil generates a first driving force to move the permanent magnet to the one side in the first direction, and the first driving force moves the movable part relatively and linearly from the neutral position to a first position relative to the first coil and the first non-movable part. The first position is located on the one side in the first direction relative to the neutral position. As the movable part moves from the neutral position to the one side in the first direction, a first enlarging portion of the permanent magnet that is positioned on the one side in the first direction relative to the first end of the first non-movable part gradually enlarges.

The first enlarging portion of the permanent magnet is magnetically attracted toward the first non-movable part, so that the movable part moves to the other side in the first direction. In this aspect, when the first driving force moves the movable part from the neutral position to the first position, the first enlarging portion of the permanent magnet of the movable part is magnetically attracted toward the first non-movable part. A driving force is thus applied in a non-contact manner to the movable part so as to move the movable part to the other side in the first direction.

The first electromagnetic actuator may further include a second coil and a second non-movable part. The second non-movable part may be constituted by a magnetic substance and extend in the first direction. The second non-movable part may be disposed on the other side in the second direction relative to the second coil and include a first end on the one side in the first direction. The first coil may be disposed in the second direction between the movable part and the first non-movable part, and the second coil may be disposed in the second direction between the movable part and the second non-movable part. The movable part may be disposed in the second direction between the first coil and the second coil. The movable part at the neutral position may be disposed such that the first end of the permanent magnet is at a relative position in the first direction that substantially coincides with the first end of the second non-movable part, or such that the first end portion of the permanent magnet is positioned, in the first direction, on the one side in the first direction relative to the first end of the second non-movable part.

Applying a current to the second coil may generate a second driving force to move the permanent magnet to the one side in the first direction. The first and second driving forces may move the movable part relatively and linearly from the neutral position to the first position relative to the first and second coils and the first and second non-movable parts. As the movable part moves from the neutral position to the one side in the first direction, the first enlarging portion of the permanent magnet, which may also be positioned on the one side in the first direction relative to the first end of the second non-movable part, may gradually enlarge.

The first enlarging portion of the permanent magnet may be magnetically attracted toward the first and second non-movable parts, so that the movable part may move to the other side in the first direction.

A second electromagnetic actuator according to an aspect of the invention includes a first coil, a first non-movable part, and a movable part being movable in a first direction and including a permanent magnet. The first non-movable part may have a similar configuration to that of the first electromagnetic actuator but may be different in that the first non-movable part of the second electromagnetic actuator further includes a second end on the other side in the first direction. The permanent magnet of the movable part may have a similar configuration to that of the first electromagnetic actuator but may be different in that the permanent magnet of the second electromagnetic actuator further includes a second end portion on the other side in the first direction and the second end portion includes a second end on the other side in the first direction.

The movable part at a neutral position is disposed such that the first end of the permanent magnet is at a relative position in the first direction that substantially coincides with the first end of the first non-movable part or such that the first end portion of the permanent magnet is positioned, in the first direction, on the one side in the first direction relative to the first end of the first non-movable part, and such that the second end of the permanent magnet is at a relative position in the first direction that substantially coincides with the second end of the first non-movable part or such that the second end portion of the permanent magnet is positioned, in the first direction, on the other side in the first direction relative to the second end of the first non-movable part.

A current, which is reversed in polarity repeatedly at predetermined intervals, is applied to the first coil. Applying such current to the first coil alternately generates a first driving force to move the permanent magnet to the one side in the first direction and a third driving force to move the permanent magnet to the other side in the first direction. The first and third driving forces alternately move the movable part relatively and linearly from a second position to a first position, and relatively and linearly from the first position to the second position, relative to the first coil and the first non-movable part. The first position is located on the one side in the first direction relative to the neutral position. The second position is located on the other side in the first direction relative to the neutral position. The neutral position is located in the first direction between the first position and the second position. As the movable part moves from the neutral position to the one side in the first direction, a first enlarging portion of the permanent magnet that is positioned on the one side in the first direction relative to the first end of the first non-movable part gradually enlarges. As the movable part moves from the neutral position to the other side in the first direction, a second enlarging portion of the permanent magnet that is positioned on the other side in the first direction relative to the second end of the first non-movable part gradually enlarges.

The first enlarging portion of the permanent magnet is magnetically attracted toward the first non-movable part, so that the movable part moves to the other side in the first direction. The second enlarging portion of the permanent magnet is magnetically attracted toward the first non-movable part, so that the movable part moves to the one side in the first direction. In this aspect, when the first driving force moves the movable part from the second position to the first position, the first enlarging portion of the permanent magnet is magnetically attracted toward the first non-movable part. A driving force is thus applied in a non-contact manner to the movable part so as to move the movable part to the other side in the first direction. When the third driving force moves the movable part from the first position to the second position, the second enlarging portion of the permanent magnet is magnetically attracted toward the first non-movable part. A driving force is thus applied in a non-contact manner to the movable part so as to move the movable part to the one side in the first direction.

The second electromagnetic actuator may further include a second coil and a second non-movable part. The second non-movable part may have a similar configuration to that of the first electromagnetic actuator but may be different in that the second non-movable part of the second electromagnetic actuator further includes a second end on the other side in the first direction. The first coil may be disposed in the second direction between the movable part and the first non-movable part, and the second coil may be disposed in the second direction between the movable part and the second non-movable part. The movable part may be disposed in the second direction between the first coil and the second coil. The movable part at the neutral position may be disposed such that the first end of the permanent magnet is at a relative position in the first direction that substantially coincides with the first end of the second non-movable part or such that the first end portion of the permanent magnet is positioned, in the first direction, on the one side in the first direction relative to the first end of the second non-movable part, and such that the second end of the permanent magnet is at a relative position in the first direction that substantially coincides with the second end of the second non-movable part or such that the second end portion of the permanent magnet is positioned, in the first direction, on the other side in the first direction relative to the second end of the second non-movable part.

A current, which may be reversed in polarity repeatedly at predetermined intervals, may be applied to the second coil. Applying such current to the second coil may alternately generate a second driving force to move the permanent magnet to the one side in the first direction and a fourth driving force to move the permanent magnet to the other side in the first direction. The first and second driving forces and third and fourth driving forces alternately generated may alternately move the movable part relatively and linearly from the second position to the first position, and relatively and linearly from the first position to the second position, relative to the first and second coils and the first and second non-movable parts. As the movable part moves from the neutral position to the one side in the first direction, the first enlarging portion of the permanent magnet, which may also be positioned on the one side in the first direction relative to the first end of the second non-movable part, may gradually enlarge. As the movable part moves from the neutral position to the other side in the first direction, the second enlarging portion of the permanent magnet, which may also be positioned on the other side in the first direction relative to the second end of the second non-movable part, may gradually enlarge.

The first enlarging portion of the permanent magnet may be magnetically attracted toward the first and second non-movable parts, so that the movable part may moves to the other side in the first direction. The second enlarging portion of the permanent magnet may be magnetically attracted toward the first and second non-movable parts, so that the movable part may move to the one side in the first direction.

A third electromagnetic actuator according to an aspect of the invention includes a first coil, a first non-movable part constituted by a permanent magnet, and a movable part movable in a first direction together with the first coil. The first non-movable part extends in a first direction, is disposed on one side in a second direction relative to the first coil, and includes a first end on one side in the first direction. The movable part is fixed to the first coil and include a magnetic member. The magnetic member extends in the first direction, is disposed on the other side in the second direction relative to the first coil, and includes a first end portion on the one side in the first direction. The first end portion has a first end on the one side in the first direction. The movable part at a neutral position is disposed such that the first end of the magnetic member is at a relative position in the first direction that substantially coincides with the first end of the first non-movable part, or such that the first end portion of the magnetic member is positioned, in the first direction, on the one side in the first direction relative to the first end of the first non-movable part.

Applying a current to the first coil generates a first driving force to move the magnetic member to the one side in the first direction. The first driving force moves the movable part and the first coil relatively and linearly from the neutral position to a first position relative to the first non-movable part. The first position is located on the one side in the first direction relative to the neutral position. As the movable part moves from the neutral position to the one side in the first direction, a first enlarging portion of the magnetic member that is positioned on the one side in the first direction relative to the first end of the first non-movable part gradually enlarges.

The first enlarging portion of the magnetic member is magnetically attracted by the first non-movable part, so that the movable part moves to the other side in the first direction. In this aspect, when the first driving force moves the movable part from the neutral position to the first position, the first enlarging portion of the magnetic member is magnetically attracted by the first non-movable part. A driving force is thus applied in a non-contact manner to the movable part so as to move the movable part to the other side in the first direction.

The third electromagnetic actuator may further include a second coil, and a second non-movable part being constituted by a permanent magnet and extending in the first direction. The second non-movable part may be disposed on the other side in the second direction relative to the second coil, and may include a first end on the one side in the first direction. The first coil may be disposed in the second direction between the movable part and the first non-movable part. The second coil may be disposed in the second direction between the movable part and the second non-movable part. The movable part may be fixed to the second coil and disposed in the second direction between the first coil and the second coil. The movable part at the neutral position may be disposed such that the first end of the magnetic member is at a relative position in the first direction that substantially coincides with the first end of the second non-movable part, or such that the first end portion of the magnetic member is positioned, in the first direction, on the one side in the first direction relative to the first end of the second non-movable part.

Applying a current to the second coil may generate a second driving force to move the magnetic member to the one side in the first direction. The first and second driving forces may move the movable part and the first and second coils relatively and linearly from the neutral position to the first position relative to the first and second non-movable part. As the movable part moves from the neutral position to the one side in the first direction, the first enlarging portion of the magnetic member, which may also be positioned on the one side in the first direction relative to the first end of the second non-movable part, may gradually enlarge.

The first enlarging portion of the magnetic member may be magnetically attracted by the first and second non-movable parts, so that the movable part may move to the other side in the first direction.

A fourth electromagnetic actuator according to an aspect of the invention includes a first coil, a first non-movable part constituted by a permanent magnet, and a movable part movable in a first direction together with the first coil. The first non-movable part extends in a first direction, is disposed on one side in a second direction relative to the first coil, and includes a first end on one side in the first direction and a second end on the other side in the first direction. The movable part is fixed to the first coil and includes a magnetic member constituted by a magnetic substance. The magnetic member extends in the first direction, is disposed on the other side in the second direction relative to the first coil, and includes a first end portion on the one side in the first direction and a second end portion on the other side in the first direction. The first end portion has a first end on the one side in the first direction. The second end portion has a second end on the other side in the first direction. The movable part at a neutral position is disposed such that the first end of the magnetic member is at a relative position in the first direction that substantially coincides with the first end of the first non-movable part or such that the first end portion of the magnetic member is positioned, in the first direction, on the one side in the first direction relative to the first end of the first non-movable part, and such that the second end of the magnetic member is at a relative position in the first direction that substantially coincides with the second end of the first non-movable part or such that the second end portion of the magnetic member is positioned, in the first direction, on the other side in the first direction relative to the second end of the first non-movable part.

Applying a current, which is reversed in polarity repeatedly at predetermined intervals, to the first coil alternately generates a first driving force to move the magnetic member to the one side in the first direction and a third driving force to move the magnetic member to the other side in the first direction. The first and third driving forces alternately move the movable part and the first coil relatively and linearly from a second position to a first position, and relatively and linearly from the first position to the second position, relative to the first non-movable part. The first position is located on the one side in the first direction relative to the neutral position, the second position is located on the other side in the first direction relative to the neutral position, and the neutral position is located in the first direction between the first position and the second position. As the movable part moves from the neutral position to the one side in the first direction, a first enlarging portion of the magnetic member that is positioned on the one side in the first direction relative to the first end of the first non-movable part gradually enlarges. As the movable part moves from the neutral position to the other side in the first direction, a second enlarging portion of the magnetic member that is positioned on the other side in the first direction relative to the second end of the first non-movable part gradually enlarges.

The first enlarging portion of the magnetic member is magnetically attracted by the first non-movable part, so that the movable part moves to the other side in the first direction. The second enlarging portion of the magnetic member is magnetically attracted by the first non-movable part, so that the movable part moves to the one side in the first direction. In this aspect, when the first driving force moves the movable part from the second position to the first position, the first enlarging portion of the magnetic member is magnetically attracted by the first non-movable part. A driving force is thus applied in a non-contact manner to the movable part so as to move the movable part to the other side in the first direction. When the third driving force moves the movable part from the first position to the second position, the second enlarging portion of the magnetic member is magnetically attracted by the first non-movable part. A driving force is thus applied in a non-contact manner to the movable part so as to move the movable part to the one side in the first direction.

The fourth electromagnetic actuator may further include a second coil, and a second non-movable part being constituted by a permanent magnet and extending in the first direction. The second non-movable part may be disposed on the other side in the second direction relative to the second coil, and may include a first end on the one side in the first direction and a second end on the other side in the first direction. The first coil may be disposed in the second direction between the movable part and the first non-movable part. The second coil may be disposed in the second direction between the movable part and the second non-movable part.

The movable part may be fixed to the second coil and disposed in the second direction between the first coil and the second coil. The movable part at the neutral position may be disposed such that the first end of the magnetic member is at a relative position in the first direction that substantially coincides with the first end of the second non-movable part or such that the first end portion of the magnetic member is positioned, in the first direction, on the one side in the first direction relative to the first end of the second non-movable part, and such that the second end of the magnetic member is at a relative position in the first direction that substantially coincides with the second end of the second non-movable part or such that the second end portion of the magnetic member is positioned, in the first direction, on the other side in the first direction relative to the second end of the second non-movable part.

Applying a current, which may be reversed in polarity repeatedly at predetermined intervals, to the second coil may alternately generate a second driving force to move the magnetic member to the one side in the first direction and a fourth driving force to move the magnetic member to the other side in the first direction. The first and second driving forces and third and fourth driving forces alternately generated may alternately move the movable part and the first and second coils relatively and linearly from the second position to the first position, and linearly from the first position to the second position, relative to the first and second non-movable parts. As the movable part moves from the neutral position to the one side in the first direction, the first enlarging portion of the magnetic member, which may also be positioned on the one side in the first direction relative to the first end of the second non-movable part, may gradually enlarge. As the movable part moves from the neutral position to the other side in the first direction, the second enlarging portion of the magnetic member, which may also be positioned on the other side in the first direction relative to the second end of the second non-movable part, may gradually enlarge.

The first enlarging portion of the magnetic member may be magnetically attracted by the first and second non-movable parts, so that the movable part may move to the other side in the first direction. The second enlarging portion of the magnetic member may be magnetically attracted by the first and second non-movable parts, so that the movable part may moves to the one side in the first direction.

A fifth electromagnetic actuator according to an aspect of the invention includes a first coil, a first non-movable part constituted by a magnetic substance, and a movable part being movable in a first direction and including a permanent magnet. The first non-movable part extends in a first direction, is disposed on one side in a second direction relative to the first coil, and has an opening extending through the first non-movable part in the second direction. The opening includes a first edge portion on one side in the first direction of the opening and a second edge portion on the other side in the first direction of the opening. The first edge portion of the opening includes a first edge on the one side in the first direction of the opening. The second edge portion of the opening includes a second edge on the other side in the first direction of the opening. The permanent magnet extends in the first direction, is disposed on the other side in the second direction relative to the first coil, and includes a first portion and a second portion on the other side in the first direction relative to the first portion. The movable part at a neutral position is disposed such that the first portion of the permanent magnet is positioned in the second direction in spaced relation to the opening of the first non-movable part, such that the second portion of the permanent magnet is positioned in the second direction in spaced relation to the second edge portion of the opening of the first non-movable part, and such that an end on the one side in the first direction of the first portion of the permanent magnet and an end on the one side in the first direction of the second portion of the permanent magnet substantially coincide in the first direction with the first edge and the second edge, respectively, of the opening of the first non-movable part.

Applying a current to the first coil generates a first driving force to move the permanent magnet to the one side in the first direction, and the first driving force moves the movable part relatively and linearly from the neutral position to a first position relative to the first coil and the first non-movable part. The first position is located on the one side in the first direction relative to the neutral position. As the movable part moves from the neutral position to the one side in the first direction, a first enlarging portion of the first portion of the permanent magnet that is positioned on the one side in the first direction relative to the first edge of the opening of the first non-movable part and a second enlarging portion of the second portion of the permanent magnet that is positioned on the one side in the first direction relative to the second edge of the opening of the first non-movable part gradually enlarge.

The first and second enlarging portions of the permanent magnet are magnetically attracted toward the first non-movable part, so that the movable part moves to the other side in the first direction. In this aspect, when the first driving force moves the movable part from the neutral position to the first position, the first and second enlarging portions of the permanent magnet are magnetically attracted toward the first non-movable part. A driving force is thus applied in a non-contact manner to the movable part so as to move the movable part to the other side in the first direction.

The fifth electromagnetic actuator may further include a second coil, and a second non-movable part being constituted by a magnetic substance and extending in the first direction. The second non-movable part may be disposed on the other side in the second direction relative to the second coil, and may have an opening extending through the second non-movable part in the second direction. The opening of second non-movable part may include a first edge portion on one side in the first direction of the opening of second non-movable part and a second edge portion on the other side in the first direction of the opening of second non-movable part. The first edge portion of the opening of second non-movable part may include a first edge on the one side in the first direction of the opening of second non-movable part. The second edge portion of the opening of second non-movable part may include a second edge on the other side in the first direction of the opening of second non-movable part. The first coil may be disposed in the second direction between the movable part and the first non-movable part. The second coil may be disposed in the second direction between the movable part and the second non-movable part. The movable part may be disposed in the second direction between the first coil and the second coil. The movable part at the neutral position may be disposed such that the first portion of the permanent magnet is positioned in the second direction in spaced relation to the opening of the second non-movable part, such that the second portion of the permanent magnet is positioned in the second direction in spaced relation to the second edge portion of the opening of the second non-movable part, and such that the end on the one side in the first direction of the first portion of the permanent magnet and the end on the one side in the first direction of the second portion of the permanent magnet substantially coincide in the first direction with the first edge and the second edge, respectively, of the opening of the second non-movable part.

Applying a current to the second coil may generate a second driving force to move the permanent magnet to the one side in the first direction. The first and second driving forces may move the movable part relatively and linearly from the neutral position to the first position relative to the first and second coils and the first and second non-movable parts. As the movable part moves from the neutral position to the one side in the first direction, the first enlarging portion of the first portion of the permanent magnet, which may also be positioned on the one side in the first direction relative to the first edge of the opening of the second non-movable part, and the second enlarging portion of the second portion of the permanent magnet, which may also be positioned on the one side in the first direction relative to the second edge of the opening of the second non-movable part, may gradually enlarge.

The first and second enlarging portions of the permanent magnet may be magnetically attracted toward the first and second non-movable parts, respectively, so that the movable part may move to the other side in the first direction.

A sixth electromagnetic actuator according to an aspect of the invention includes a first coil, a first non-movable part constituted by a magnetic substance, and a movable part being movable in a first direction and including a permanent magnet. The first non-movable part is constituted by a magnetic substance, extends in a first direction, being disposed on one side in a second direction relative to the first coil, and has an opening extending through the first non-movable part in the second direction. The opening includes a first edge portion on one side in the first direction of the opening and a second edge portion on the other side in the first direction of the opening. The first edge portion of the opening includes a first edge on the one side in the first direction of the opening. The second edge portion of the opening includes a second edge on the other side in the first direction of the opening. The permanent magnet extends in the first direction, is disposed on the other side in the second direction relative to the first coil, and includes a first portion, a second portion on the other side in the first direction relative to the first portion, a third portion on the one side in the first direction relative to the first portion, and a fourth portion between the first portion and the second portion. The movable part at a neutral position is disposed such that the first portion of the permanent magnet is positioned in the second direction in spaced relation to the opening of the first non-movable part, such that the second portion of the permanent magnet is positioned in the second direction in spaced relation to the second edge portion of the opening of the first non-movable part, such that the third portion of the permanent magnet is positioned in the second direction in spaced relation to the first edge portion of the opening of the first non-movable part, such that the fourth portion of the permanent magnet is positioned in the second direction in spaced relation to the opening of the first non-movable part, such that an end on the one side in the first direction of the first portion of the permanent magnet and an end on the one side in the first direction of the second portion of the permanent magnet substantially coincide in the first direction with the first edge and the second edge, respectively, of the opening of the first non-movable part, and such that an end on the other side in the first direction of the third portion of the permanent magnet and an end on the other side in the first direction of the fourth portion of the permanent magnet substantially coincide in the first direction with the first edge and the second edge, respectively, of the opening of the first non-movable part.

Applying a current, which is reversed in polarity repeatedly at predetermined intervals, to the first coil alternately generates a first driving force to move the permanent magnet to the one side in the first direction and a third driving force to move the permanent magnet to the other side in the first direction, and the first and third driving forces alternately move the movable part relatively and linearly from a second position to a first position, and relatively and linearly from the first position to the second position, relative to the first coil and the first non-movable part. The first position is located on the one side in the first direction relative to the neutral position. The second position is located on the other side in the first direction relative to the neutral position. The neutral position is located in the first direction between the first position and the second position. As the movable part moves from the neutral position to the one side in the first direction, a first enlarging portion of the first portion of the permanent magnet that is positioned on the one side in the first direction relative to the first edge of the opening of the first non-movable part and a second enlarging portion of the second portion of the permanent magnet that is positioned on the one side in the first direction relative to the second edge of the opening of the first non-movable part gradually enlarge. As the movable part moves from the neutral position to the other side in the first direction, a third enlarging portion of the third portion of the permanent magnet that is positioned on the other side in the first direction relative to the first edge of the opening of the first non-movable part and a fourth enlarging portion of the fourth portion of the permanent magnet that is positioned on the other side in the first direction relative to the second edge of the opening of the first non-movable part gradually enlarge.

The first and second enlarging portions of the permanent magnet are magnetically attracted toward the first non-movable part, so that the movable part moves to the other side in the first direction. The third and fourth enlarging portions of the permanent magnet are magnetically attracted toward the first non-movable part, so that the movable part moves to the one side in the first direction. In this aspect, when the first driving force moves the movable part from the second position to the first position, the first and second enlarging portions of the permanent magnet are magnetically attracted toward the first non-movable part. A driving force is thus applied in a non-contact manner to the movable part so as to move the movable part to the other side in the first direction. When the third driving force moves the movable part from the first position to the second position, the third and fourth enlarging portions of the permanent magnet are magnetically attracted toward the first non-movable part. A driving force is thus applied in a non-contact manner to the movable part so as to the one side in the first direction.

The sixth electromagnetic actuator may further include a second coil, and a second non-movable part being constituted by a magnetic substance and extending in the first direction. The second non-movable part may be constituted by a magnetic substance, extending in the first direction, may be disposed on the other side in the second direction relative to the second coil, and may have an opening extending through the second non-movable part in the second direction. The opening of second non-movable part may include a first edge portion on one side in the first direction of the opening of second non-movable part and a second edge portion on the other side in the first direction of the opening of second non-movable part. The first edge portion of the opening of second non-movable part may include a first edge on the one side in the first direction of the opening of second non-movable part. The second edge portion of the opening of second non-movable part may include a second edge on the other side in the first direction of the opening of second non-movable part. The first coil may be disposed in the second direction between the movable part and the first non-movable part. The second coil may be disposed in the second direction between the movable part and the second non-movable part. The movable part may be disposed in the second direction between the first coil and the second coil. The movable part at the neutral position may be disposed such that the first portion of the permanent magnet is positioned in the second direction in spaced relation to the opening of the second non-movable part, such that the second portion of the permanent magnet is positioned in the second direction in spaced relation to the second edge portion of the opening of the second non-movable part, such that the third portion of the permanent magnet is positioned in the second direction in spaced relation to the first edge portion of the opening of the second non-movable part, such that the fourth portion of the permanent magnet is positioned in the second direction in spaced relation to the opening of the second non-movable part, such that the end on the one side in the first direction of the first portion of the permanent magnet and the end on the one side in the first direction of the second portion of the permanent magnet substantially coincide in the first direction with the first edge and the second edge, respectively, of the opening of the second non-movable part, and such that the end on the other side in the first direction of the third portion of the permanent magnet and the end on the other side in the first direction of the fourth portion of the permanent magnet substantially coincide in the first direction with the first edge and the second edge, respectively, of the opening of the second non-movable part.

Applying a current, which may be reversed in polarity repeatedly at predetermined intervals, to the second coil may alternately generate a second driving force to move the permanent magnet to the one side in the first direction and a fourth driving force to move the permanent magnet to the other side in the first direction. The first and second driving forces and third and fourth driving forces alternately generated may alternately move the movable part relatively and linearly from the second position to the first position, and relatively and linearly from the first position to the second position, relative to the first and second coils and the first and second non-movable parts. As the movable part moves from the neutral position to the one side in the first direction, the first enlarging portion of the first portion of the permanent magnet, which may also be positioned on the one side in the first direction relative to the first edge of the opening of the second non-movable part, and the second enlarging portion of the second portion of the permanent magnet, which may also be positioned on the one side in the first direction relative to the second edge of the opening of the second non-movable part, may gradually enlarge. As the movable part moves from the neutral position to the other side in the first direction, the third enlarging portion of the third portion of the permanent magnet, which may also be positioned on the other side in the first direction relative to the first edge of the opening of the second non-movable part, and the fourth enlarging portion of the fourth portion of the permanent magnet, which may also be positioned on the other side in the first direction relative to the second edge of the opening of the second non-movable part, may gradually enlarge.

The first and second enlarging portions of the permanent magnet may be magnetically attracted toward the second non-movable part, so that the movable part may move to the other side in the first direction. The third and fourth enlarging portions of the permanent magnet may be magnetically attracted toward the second non-movable part, so that the movable part moves to the one side in the first direction.

A seventh electromagnetic actuator according to an aspect of the invention may include a first coil, a first non-movable part constituted by a permanent magnet, and a movable part movable in a first direction together with the first coil. The first non-movable part extends in a first direction including one and the other sides, is disposed on one side in a second direction relative to the first coil, and includes a third portion and a fourth portion on the other side in the first direction relative to the third portion, the second direction being substantially orthogonal to the first direction. The movable part includes a magnetic member constituted by a magnetic substance and is fixed to the first coil. The magnetic member extends in the first direction, is disposed on the other side in the second direction relative to the first coil, and has an opening extending through the magnetic member in the second direction. The opening includes a first edge portion on one side in the first direction of the opening and a second edge portion on the other side in the first direction of the opening. The first edge portion of the opening includes a first edge on the one side in the first direction of the opening. The second edge portion of the opening includes a second edge on the other side in the first direction of the opening. The movable part at a neutral position is disposed such that the first edge portion of the opening of the magnetic member is positioned in the second direction in spaced relation to the third portion of the first non-movable part, such that the opening of the magnetic member is positioned in the second direction in spaced relation to the fourth portion of the first non-movable part, and such that the first edge and the second edge of the opening of the magnetic member substantially coincide in the first direction with an end on the other side in the first direction of the third portion of the first non-movable part and an end on the other side in the first direction of the fourth portion of the first non-movable part, respectively.

Applying a current to the first coil generates a first driving force to move the magnetic member to the one side in the first direction, and the first driving force moves the movable part and the first coil relatively and linearly from the neutral position to a first position relative to the first non-movable part. The first position is located on the one side in the first direction relative to the neutral position. As the movable part moves from the neutral position to the one side in the first direction, a third enlarging portion of the third portion of the first non-movable part that is positioned on the other side in the first direction relative to the first edge of the movable part and a fourth enlarging portion of the fourth portion of the first non-movable part that is positioned on the other side in the first direction relative to the second edge of the movable part gradually enlarge.

The third and fourth enlarging portions of the first non-movable part magnetically attract the magnetic member, so that the movable part moves to the other side in the first direction. In this aspect, when the first driving force moves the movable part from the neutral position to the first position, the third and fourth enlarging portions of the first non-movable part magnetically attract the magnetic member. A driving force is thus applied in a non-contact manner to the movable part so as to move the movable part to the other side in the first direction.

The seventh electromagnetic actuator may further include a second coil, and a second non-movable part being constituted by a permanent magnet and extending in the first direction. The second non-movable part may be disposed on the other side in the second direction relative to the second coil, and may include a third portion and a fourth portion on the other side in the first direction relative to the third portion of the second non-movable part. The first coil may be disposed in the second direction between the movable part and the first non-movable part. The second coil may be disposed in the second direction between the movable part and the second non-movable part. The movable part may be fixed to the second coil and disposed in the second direction between the first coil and the second coil. The movable part at the neutral position may be disposed such that the first edge portion of the opening of the magnetic member is positioned in the second direction in spaced relation to the third portion of the second non-movable part, such that the opening of the magnetic member is positioned in the second direction in spaced relation to the fourth portion of the second non-movable part, and such that the first edge and the second edge of the opening of the magnetic member substantially coincide in the first direction with the end on the other side in the first direction of the third portion of the second non-movable part and the end on the other side in the first direction of the fourth portion of the second non-movable part, respectively.

Applying a current to the second coil may generate a second driving force to move the magnetic member to the one side in the first direction. The first and second driving forces may move the movable part and the first and second coils relatively and linearly from the neutral position to the first position relative to the first and second non-movable part. As the movable part moves from the neutral position to the one side in the first direction, a third enlarging portion of the third portion of the second non-movable part that may be positioned on the other side in the first direction relative to the first edge of the movable part and a fourth enlarging portion of the fourth portion of the second non-movable part that may be positioned on the other side in the first direction relative to the second edge of the movable part may gradually enlarge.

The third and fourth enlarging portions of the second non-movable part may magnetically attract the magnetic member, so that the movable part may move to the other side in the first direction.

An eighth electromagnetic actuator according to an aspect of the invention includes a first coil, a first non-movable part constituted by a permanent magnet, and a movable part movable in a first direction together with the first coil. The first non-movable part extends in a first direction including one and the other sides, is disposed on one side in a second direction relative to the first coil, and includes a first portion, a second portion on the other side in the first direction relative to the first portion, a third portion on the one side in the first direction relative to the first portion, and a fourth portion between the first portion and the second portion, the second direction being substantially orthogonal to the first direction. The movable part includes a magnetic member constituted by a magnetic substance and is fixed to the first coil. The magnetic member extends in the first direction, is disposed on the other side in the second direction relative to the first coil, and has an opening extending through the magnetic member in the second direction. The opening includes a first edge portion on one side in the first direction of the opening and a second edge portion on the other side in the first direction of the opening. The first edge portion of the opening includes a first edge on the one side in the first direction of the opening. The second edge portion of the opening includes a second edge on the other side in the first direction of the opening. The movable part at a neutral position is disposed such that the first edge portion of the opening of the magnetic member is positioned in the second direction in spaced relation to the third portion of the first non-movable part, such that the opening of the magnetic member is positioned in the second direction in spaced relation to the fourth portion of the first non-movable part, such that the opening of the magnetic member is positioned in the second direction in spaced relation to the first portion of the first non-movable part, such that the second edge portion of the opening of the magnetic member is positioned in the second direction in spaced relation to the second portion of the first non-movable part, such that the first edge and the second edge of the opening of the magnetic member substantially coincide in the first direction with an end on the other side in the first direction of the third portion of the first non-movable part and an end on the other side in the first direction of the fourth portion of the first non-movable part, respectively, and such that the first edge and the second edge of the opening of the magnetic member substantially coincide in the first direction with an end on the one side in the first direction of the first portion of the first non-movable part and an end on the one side in the first direction of the second portion of the first non-movable part, respectively.

Applying a current, which is reversed in polarity repeatedly at predetermined intervals, to the first coil alternately generates a first driving force to move the magnetic member to the one side in the first direction and a third driving force to move the magnetic member to the other side in the first direction, and the first and third driving forces alternately move the movable part and the first coil relatively and linearly from a second position to a first position, and relatively and linearly from the first position to the second position, relative to the first non-movable part. The first position is located on the one side in the first direction relative to the neutral position. The second position is located on the other side in the first direction relative to the neutral position. The neutral position is located in the first direction between the first position and the second position. As the movable part moves from the neutral position to the one side in the first direction, a third enlarging portion of the third portion of the first non-movable part that is positioned on the other side in the first direction relative to the first edge of the movable part and a fourth enlarging portion of the fourth portion of the first non-movable part that is positioned on the other side in the first direction relative to the second edge of the movable part gradually enlarge. As the movable part moves from the neutral position to the other side in the first direction, a first enlarging portion of the first portion of the first non-movable part that is positioned on the one side in the first direction relative to the first edge of the movable part and a second enlarging portion of the second portion of the first non-movable part that is positioned on the one side in the first direction relative to the second edge of the movable part gradually enlarge.

The third and fourth enlarging portions of the first non-movable part magnetically attract the magnetic member, so that the movable part moves to the other side in the first direction. The first and second enlarging portions of the first non-movable part magnetically attract the magnetic member, so that the movable part moves to the one side in the first direction. In this aspect, when the first driving force moves the movable part from the second position to the first position, the third and fourth enlarging portions of the first non-movable part magnetically attract the magnetic member. A driving force is thus applied in a non-contact manner to the movable part so as to move the movable part to the other side in the first direction. When the third driving force moves the movable part from the first position to the second position, the first and second enlarging portions of the first non-movable part magnetically attract the magnetic member. A driving force is thus applied in a non-contact manner to the movable part so as to move the movable part to the one side in the first direction.

The eighth electromagnetic actuator may further include a second coil, and a second non-movable part being constituted by a permanent magnet and extending in the first direction. The second non-movable part may be disposed on the other side in the second direction relative to the second coil, and may include a first portion, a second portion on the other side in the first direction relative to the first portion of the second non-movable part, a third portion on the one side in the first direction relative to the first portion of the second non-movable part, and a fourth portion between the first portion and the second portion of the second non-movable part. The first coil may be disposed in the second direction between the movable part and the first non-movable part, and the second coil may be disposed in the second direction between the movable part and the second non-movable part. The movable part may be fixed to the second coil and disposed in the second direction between the first coil and the second coil. The movable part at the neutral position may be disposed such that the first edge portion of the opening of the magnetic member is positioned in the second direction in spaced relation to the third portion of the second non-movable part, such that the opening of the magnetic member is positioned in the second direction in spaced relation to the fourth portion of the second non-movable part, such that the opening of the magnetic member is positioned in the second direction in spaced relation to the first portion of the second non-movable part, such that the second edge portion of the opening of the magnetic member is positioned in the second direction in spaced relation to the second portion of the second non-movable part, such that the first edge and the second edge of the opening of the magnetic member substantially coincide in the first direction with the end on the other side in the first direction of the third portion of the second non-movable part and the end on the other side in the first direction of the fourth portion of the second non-movable part, respectively, and such that the first edge and the second edge of the opening of the magnetic member substantially coincide in the first direction with the end on the one side in the first direction of the first portion of the second non-movable part and the end on the one side in the first direction of the second portion of the second non-movable part, respectively.

Applying a current, which may be reversed in polarity repeatedly at predetermined intervals, to the second coil may alternately generate a second driving force to move the magnetic member to the one side in the first direction and a fourth driving force to move the magnetic member to the other side in the first direction. The first and second driving forces and third and fourth driving forces alternately generated may alternately move the movable part and the first and second coils relatively and linearly from the second position to the first position, and relatively and linearly from the first position to the second position, relative to the first and second non-movable parts. As the movable part moves from the neutral position to the one side in the first direction, the third enlarging portion of the third portion of the second non-movable part, which may also be positioned on the other side in the first direction relative to the first edge of the movable part, and the fourth enlarging portion of the fourth portion of the second non-movable part, which may also be positioned on the other side in the first direction relative to the second edge of the movable part, may gradually enlarge. As the movable part moves from the neutral position to the other side in the first direction, a first enlarging portion of the first portion of the second non-movable part that may be positioned on the one side in the first direction relative to the first edge of the movable part, and a second enlarging portion of the second portion of the second non-movable part that may be positioned on the one side in the first direction relative to the second edge of the movable part, may gradually enlarge.

The third and fourth enlarging portions of the second non-movable part may magnetically attract the magnetic member, so that the movable part moves to the other side in the first direction. The first and second enlarging portions of the second non-movable part may magnetically attract the magnetic member, so that the movable part may move to the one side in the first direction.

A first distance in the second direction from the first non-movable part to the movable part may be substantially equal to a second distance in the second direction from the second non-movable part to the movable part, but the first distance may be different from the second distance.

A current having one of two polarities may be intermittently applied to the first coil.

A current having one of two polarities may be intermittently applied to the second coil.

Any of the first to fourth electromagnetic actuators of the above aspects may further include a housing. The first coil and the first non-movable part may be directly or indirectly fixed to the housing.

In addition to the first coil and the first non-movable part, the second coil and the second non-movable part may also be directly or indirectly fixed to the housing.

Any of the first to eighth electromagnetic actuators of the above aspects may further include a housing. The first non-movable part may be directly or indirectly fixed to the housing. Alternatively, the first and second non-movable parts may be directly or indirectly fixed to the housing.

The housing may include a first facing portion facing the first coil in the second direction. The first facing portion may include an inner face facing the first coil in the second direction, an outer face opposite to the inner face in the second direction, and an inner portion between the inner face and the outer face. The first non-movable part may be fixed to the outer or inner face of the first facing portion or embedded in the inner portion of the first facing portion.

The housing may fourth include a second facing portion facing the second coil in the second direction. The second facing portion may include an inner face facing the second coil in the second direction, an outer face opposite to the inner face of the second facing portion in the second direction, and an inner portion between the inner face and the outer face of the second facing portion. The second non-movable part may be fixed to the outer or inner face of the second facing portion or embedded in the inner portion of the second facing portion.

Any of the first to eighth electromagnetic actuators of the above aspects may further include at least one support. The at least one support may be provided between the first non-movable part and the second non-movable part in the second direction and may be configured to support the first and second non-movable parts.

The housing may accommodate the first coil, the second coil, and the movable part.

The first non-movable part and the second non-movable part may hold the housing therebetween in the second direction.

The electromagnetic actuator of any of the above aspects may further include a guide configured to guide the movable part movably in the first direction.

A vibration generator of an aspect of the invention includes the electromagnetic actuator of any of the above aspects, and may be configured to generate vibration by moving the movable part.

Figure 1A:
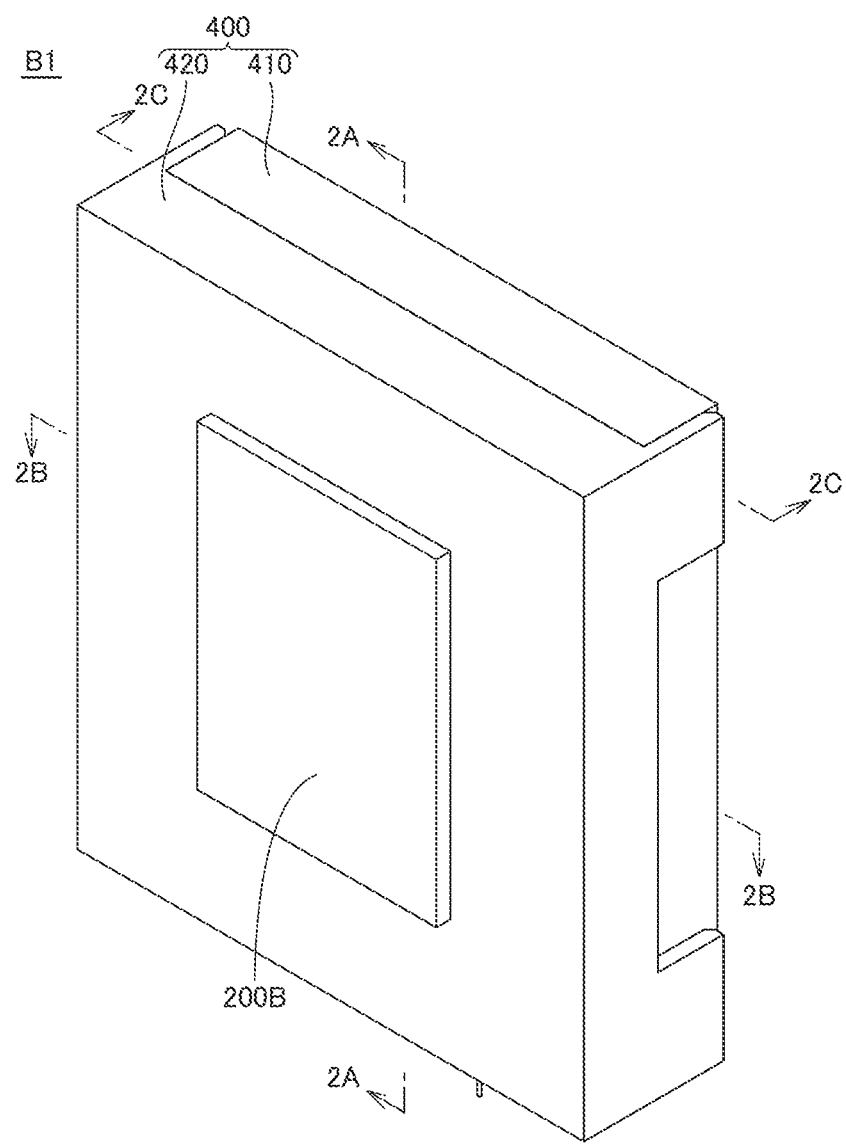
FIG. 1A is a front, top, right side perspective view of a vibration generator according to a first embodiment of the invention.
Figure 1B:
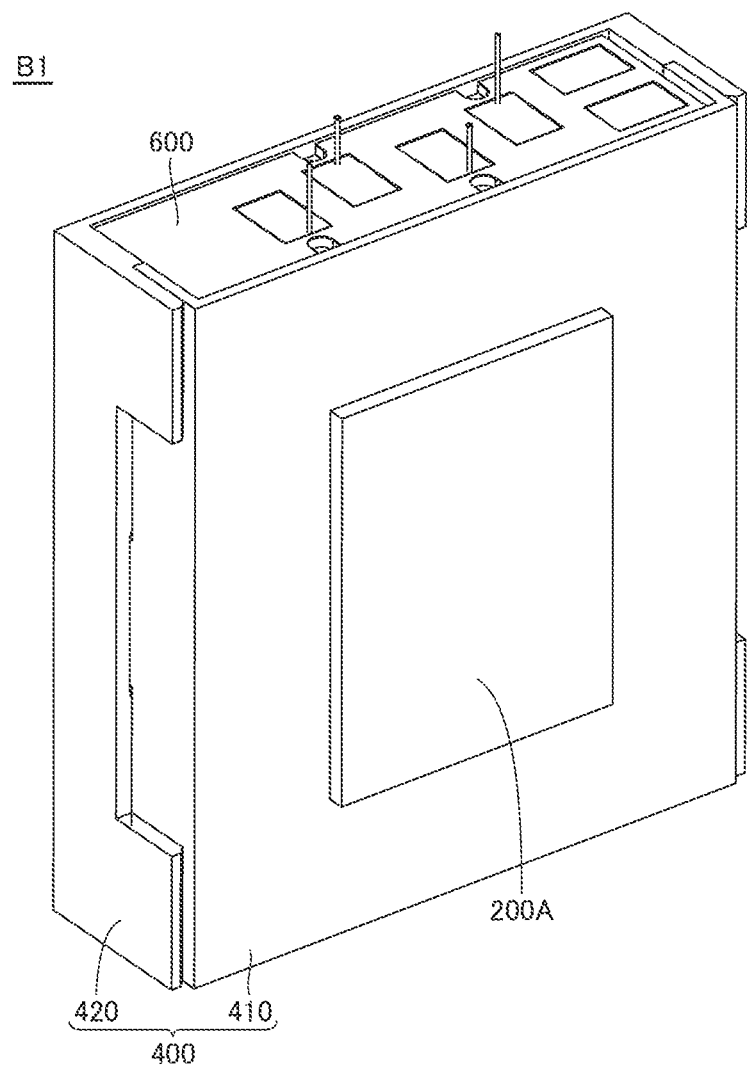
FIG. 1B is a rear, bottom, left side perspective view of the vibration generator of the first embodiment.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the electromagnetic actuators, the vibration generators, and their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

Various embodiments of the invention, including first, second, and third embodiments and modifications thereof, will now be described. Constituents of the embodiments and the modifications thereof to be described may be combined in any possible manner. Materials, shapes, dimensions, numbers, arrangements, etc. of the constituents of the various aspects of the embodiments and the modifications thereof will be discussed below as examples only and may be modified as long as they achieve similar functions.

First Embodiment

Hereinafter described is a vibration generator B1 according to a plurality of embodiments, including the first embodiment and modifications thereof, of the invention, with reference to FIGS. 1A to 6C. FIGS. 1A to 5B illustrate the vibration generator B1 according to the first embodiment. FIGS. 6A to 6C illustrate a vibration generator B1 of a first variant of the first embodiment. The vibration generator B1 includes an electromagnetic actuator A1 (which may be referred to simply as an actuator A1). The actuator A1 includes a first coil 100A and a second coil 100B, a first non-movable part 200A and a second non-movable part 200B, and a movable part 300. FIGS. 2B to 5B show an X-X' direction, which is a moving direction of the movable part 300 and corresponds to a first direction. The X-X' direction includes an X direction, which corresponds to one side in the first direction, and an X' direction, which corresponds to the other side in the first direction. FIGS. 2A to 2B and 3 to 5B show a Z-Z' direction, which is substantially orthogonal to the X-X' direction and corresponds to a second direction. The Z-Z' direction includes a Z direction, which corresponds to one side in the second direction, and a Z' direction, which corresponds to the other side in the second direction. FIGS. 2A and 2C to 4B show a Y-Y' direction, which is substantially orthogonal to the X-X' and Z-Z' directions and corresponds to a third direction.

The movable part 300 is disposed in the Z-Z' direction between, and in spaced relation to, the first coil 100A and the second coil 100B. The movable part 300 includes a permanent magnet 310 extending in the X-X' direction. The permanent magnet 310 is a plate or a column having a circular or polygonal section. The permanent magnet 310 includes a portion on the Z-direction side and a portion on the Z'-direction side. The permanent magnet 310 may be constituted by a single permanent magnet. In this case, the portion on the Z-direction side of the permanent magnet 310 is the half on the Z-direction side of the single permanent magnet, and the portion on the Z'-direction side of the permanent magnet 310 is the other half on the Z'-direction side of the single permanent magnet. The X- and X'-direction sides of the portion on the Z-direction side of the permanent magnet 310 are so magnetized as to form south and north poles, respectively; and the X- and X'-direction sides of the portion on the Z'-direction side of the permanent magnet 310 are so magnetized as to form the north and south poles, respectively. Alternatively, the permanent magnet 310 may be constituted by two separate permanent magnets bonded together in the Z-Z' direction. In this case, the portion on the Z-direction side of the permanent magnet 310 is constituted by one of the two permanent magnets, and the portion on the Z'-direction side of the permanent magnet 310 is constituted by the other permanent magnet. The X- and X'-direction sides of the portion on the Z-direction side of the permanent magnet 310 form the south and north poles, respectively; and the X- and X'-direction sides of the portion on the Z'-direction side of the permanent magnet 310 form the north and south poles, respectively. For convenience in description, the portions forming the south and north poles, respectively, of the portion on the Z-direction side of the permanent magnet 310 may be referred to as a first magnetic pole portion and a second magnetic pole portion, respectively; and the portions forming the north and south poles, respectively, of the portion on the Z'-direction side of the permanent magnet 310 may be referred to as a third magnetic pole portion and a fourth magnetic pole portion, respectively. The permanent magnet 310 may be modified such that the first and second magnetic pole portions form north and south poles, respectively, and the third and fourth magnetic pole portions form the south and north poles, respectively.

The permanent magnet 310 has a dimension in the X-X' direction that may or may not be substantially equal to, or larger than, that of each of the first and second coils 100A, 100B. The dimension in the X-X' direction of the permanent magnet 310 may or may not be substantially equal to, or larger than, that of each of the first and second non-movable parts 200A, 200B.

The permanent magnet 310 includes a first end portion 311 on the X-direction side and a second end portion 312 on the X'-direction side. The first end portion 311 includes a first end 311a on the X-direction side. The second end portion 312 includes a second end 312a on the X'-direction side.

The permanent magnet 310 is disposed in the Z-Z' direction between, and in spaced relation to, the first coil 100A and the second coil 100B. In other words, the permanent magnet 310 is disposed in spaced relation to the first coil 100A on the Z'-direction side, and in spaced relation to the second coil 100B on the Z-direction side.

Figure 5A:
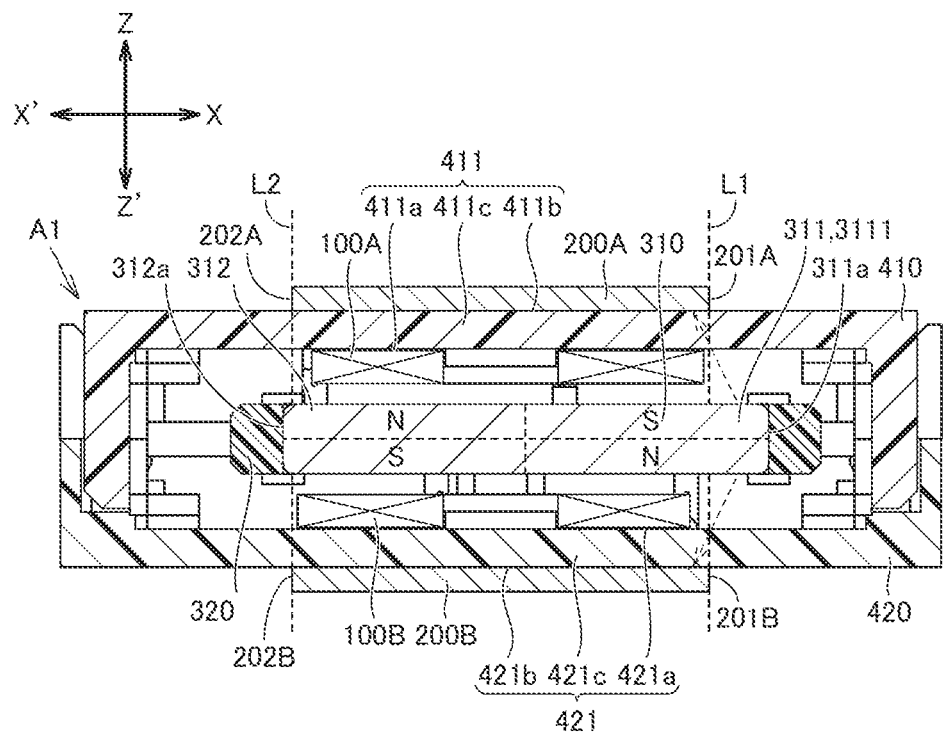
FIG. 5A is a cross-sectional view of the vibration generator of the first embodiment corresponding to FIG. 2B, with the movable part of the vibration generator positioned at a first position.
Figure 5B:
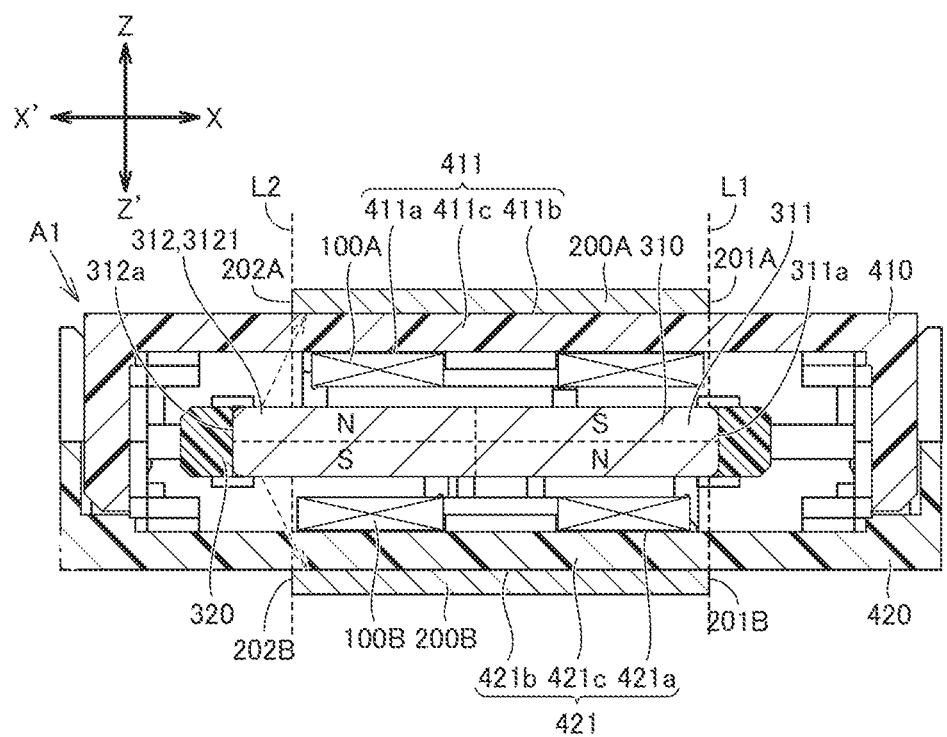
FIG. 5B is a cross-sectional view of the vibration generator of the first embodiment corresponding to FIG. 2B, with the movable part of the vibration generator positioned at a second position.
Figure 6A:
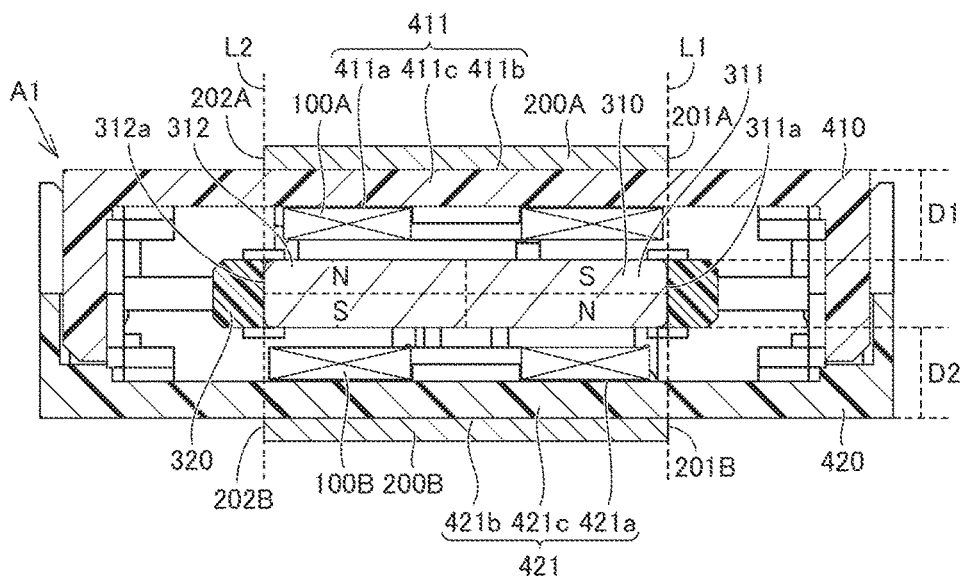
FIG. 6A is a cross-sectional view illustrating a first variant of the vibration generator of the first embodiment corresponding to FIG. 2B, with a movable part of the vibration generator positioned at a neutral position.
Figure 6B:
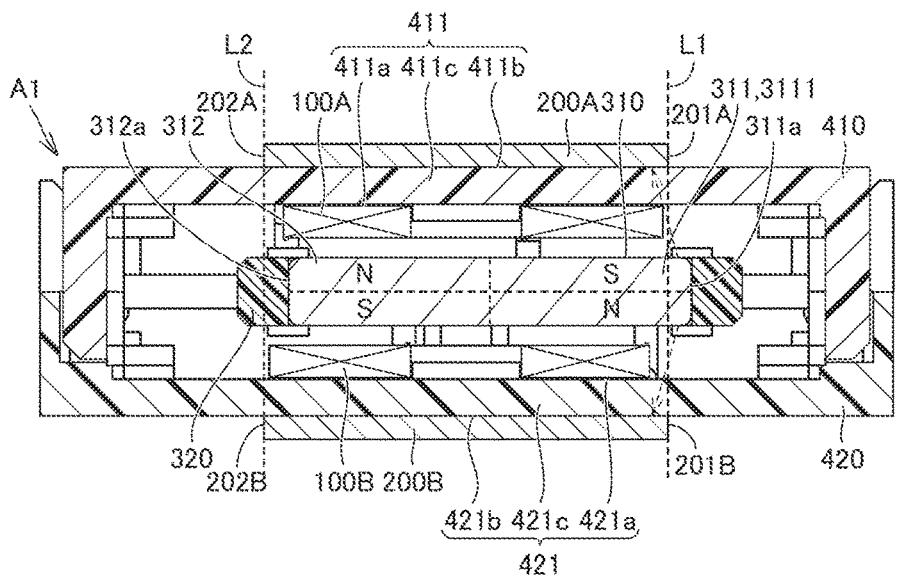
FIG. 6B is a cross-sectional view of the vibration generator of the first design modification of the first embodiment corresponding to FIG. 2B, with the movable part of the vibration generator positioned at a first position.
Figure 6C:
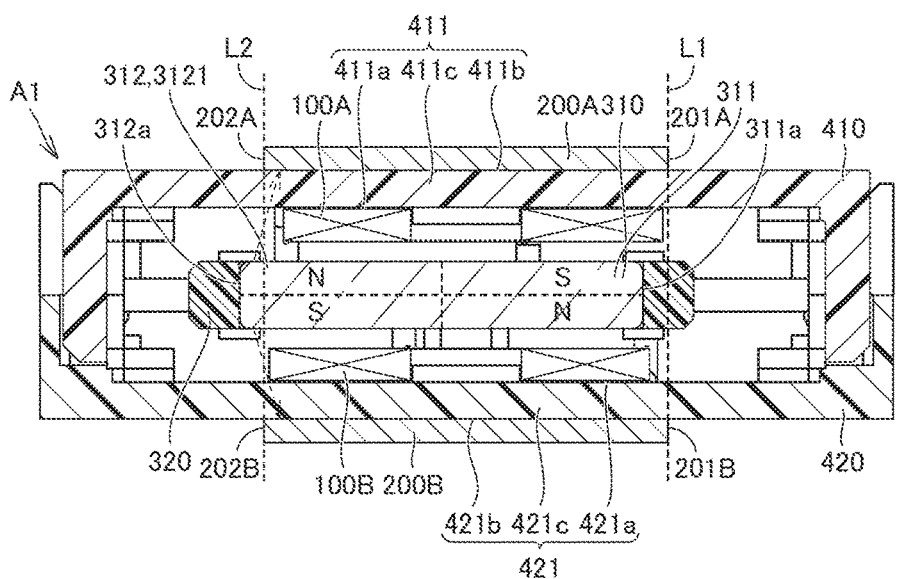
FIG. 6C is a cross-sectional view of the vibration generator of the first design modification of the first embodiment corresponding to FIG. 2B, with the movable part of the vibration generator positioned at a second position.
Figure 7A:
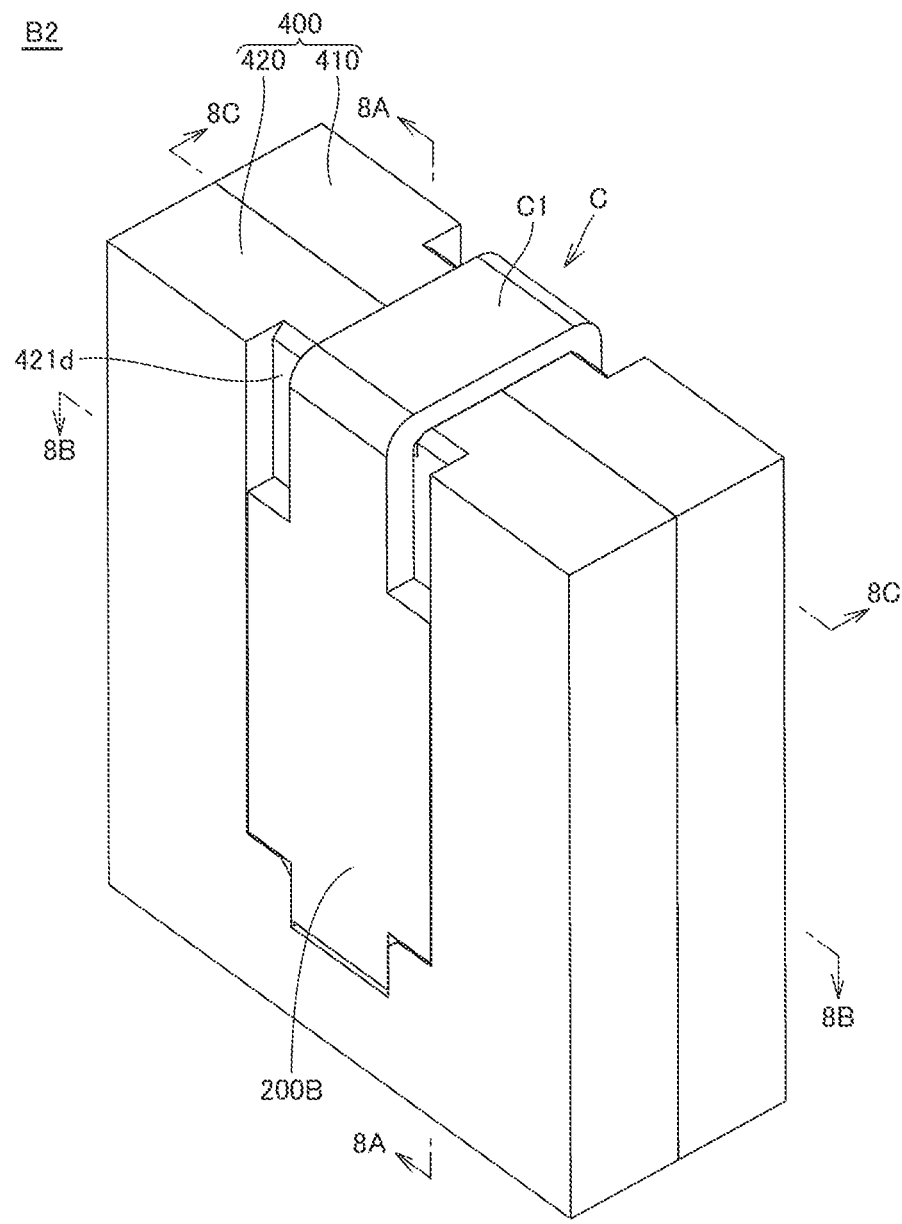
FIG. 7A is a front, top, right side perspective view of a vibration generator according to a second embodiment of the invention.
Figure 7B:
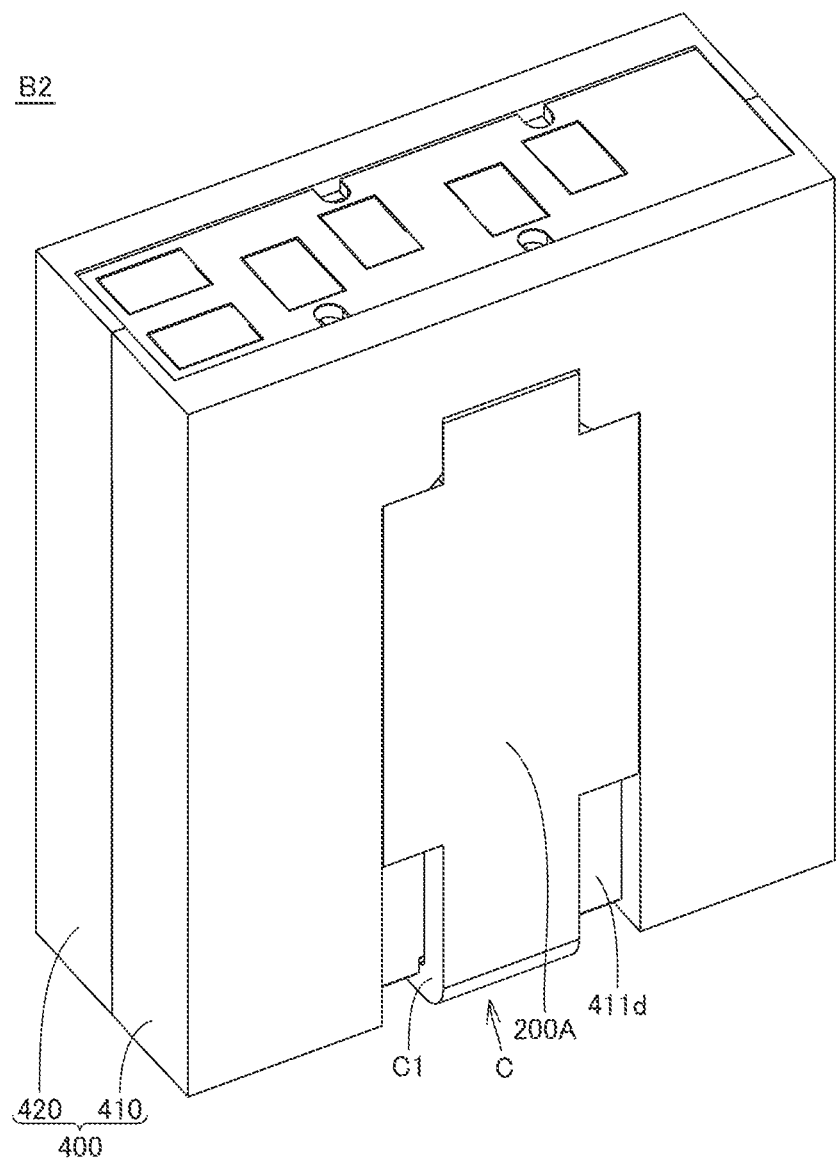
FIG. 7B is a rear, bottom, left side perspective view of the vibration generator of the second embodiment.
Figure 8A:
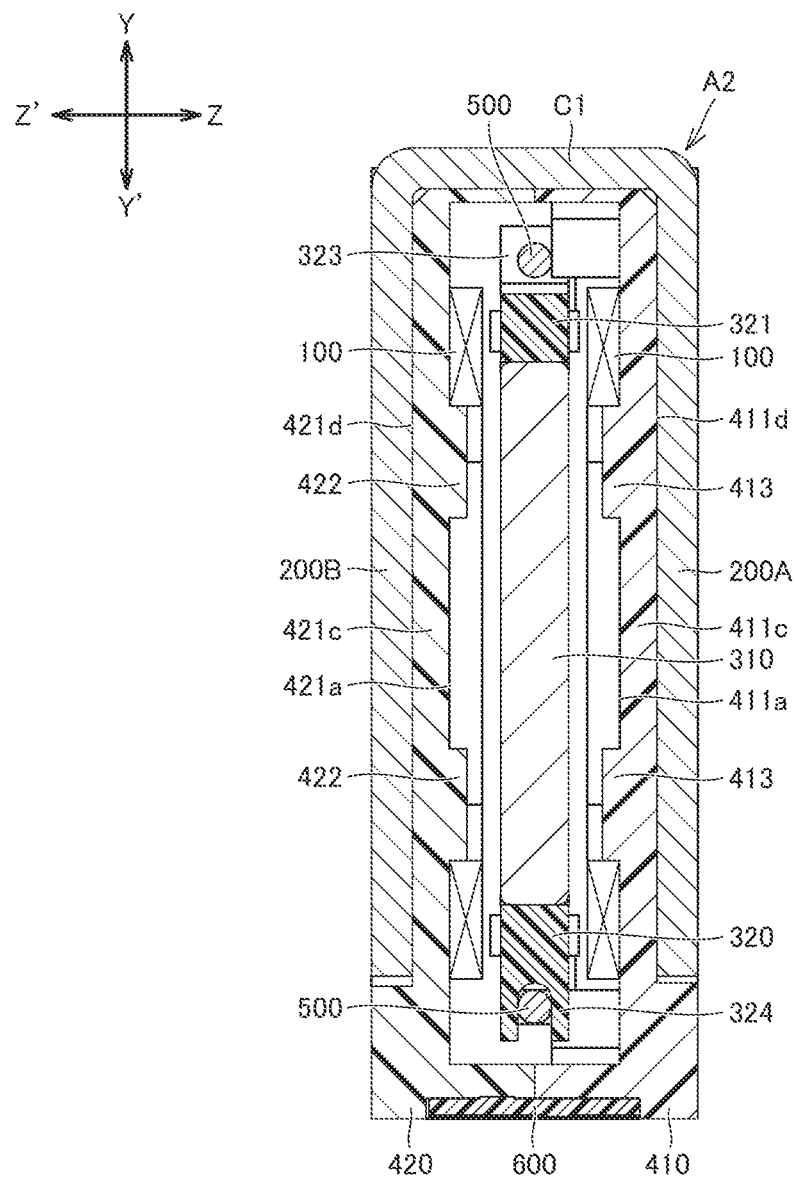
FIG. 8A is a cross-sectional view of the vibration generator of the second embodiment, taken along line 8A-8A in FIG. 7A, with a movable part of the vibration generator positioned at a neutral position.
Figure 8B:
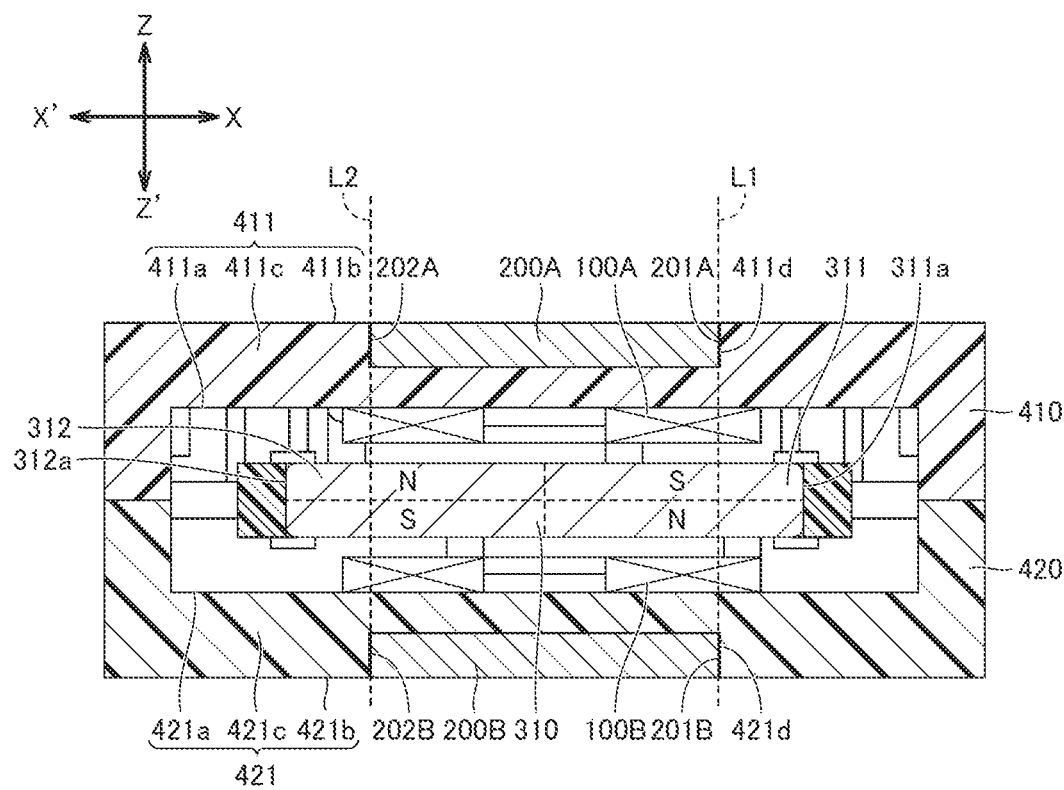
FIG. 8B is a cross-sectional view of the vibration generator of the second embodiment, taken along line 8B-8B in FIG. 7A, with the movable part of the vibration generator positioned at the neutral position.
Figure 8C:
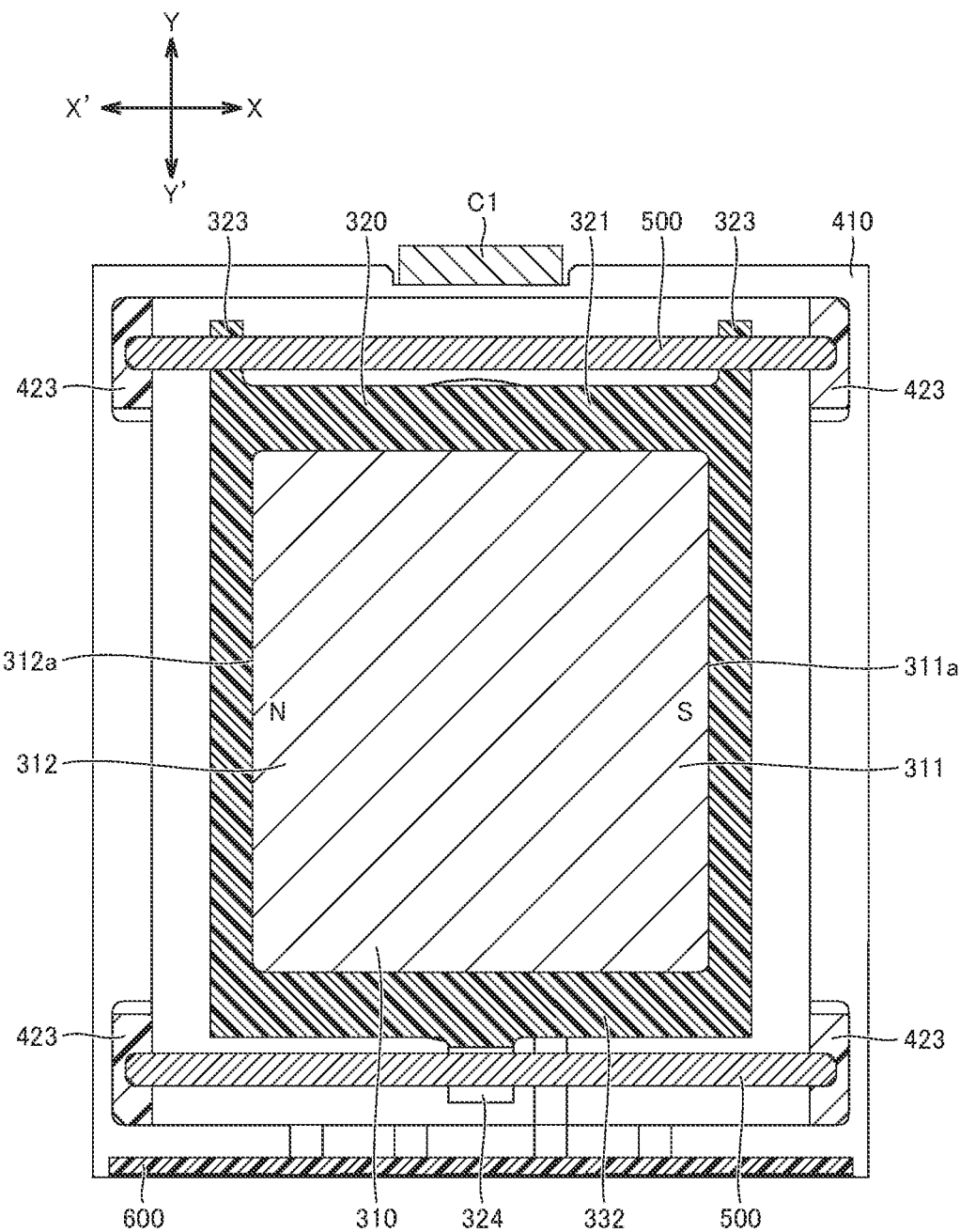
FIG. 8C is a cross-sectional view of the vibration generator of the second embodiment, taken along line 8C-8C in FIG. 7A, with the movable part of the vibration generator positioned at the neutral position.
Figure 9:
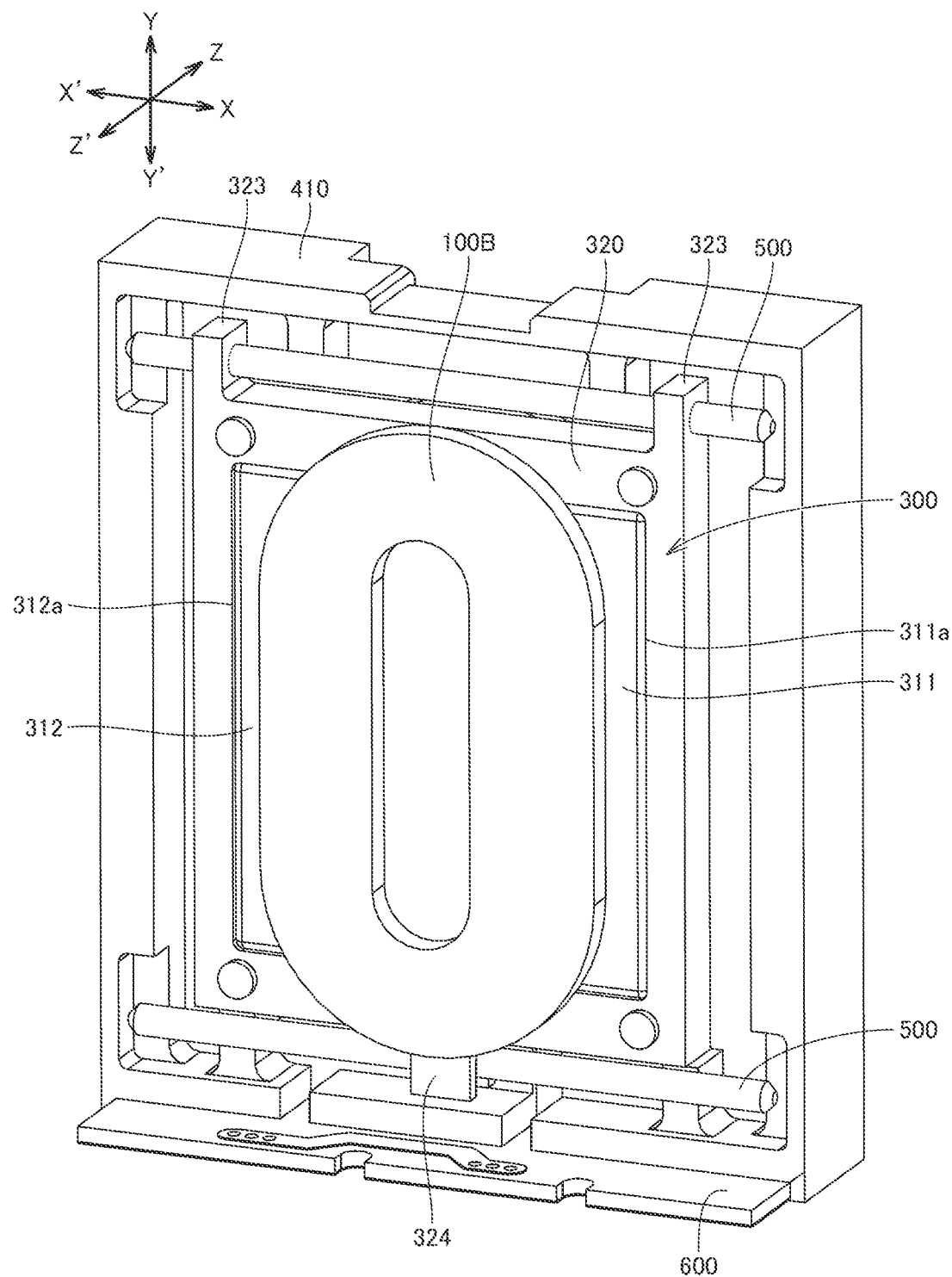
FIG. 9 is a front, top, light side perspective view of the vibration generator of the second embodiment, with a second housing removed from a first housing.
Figure 10A:
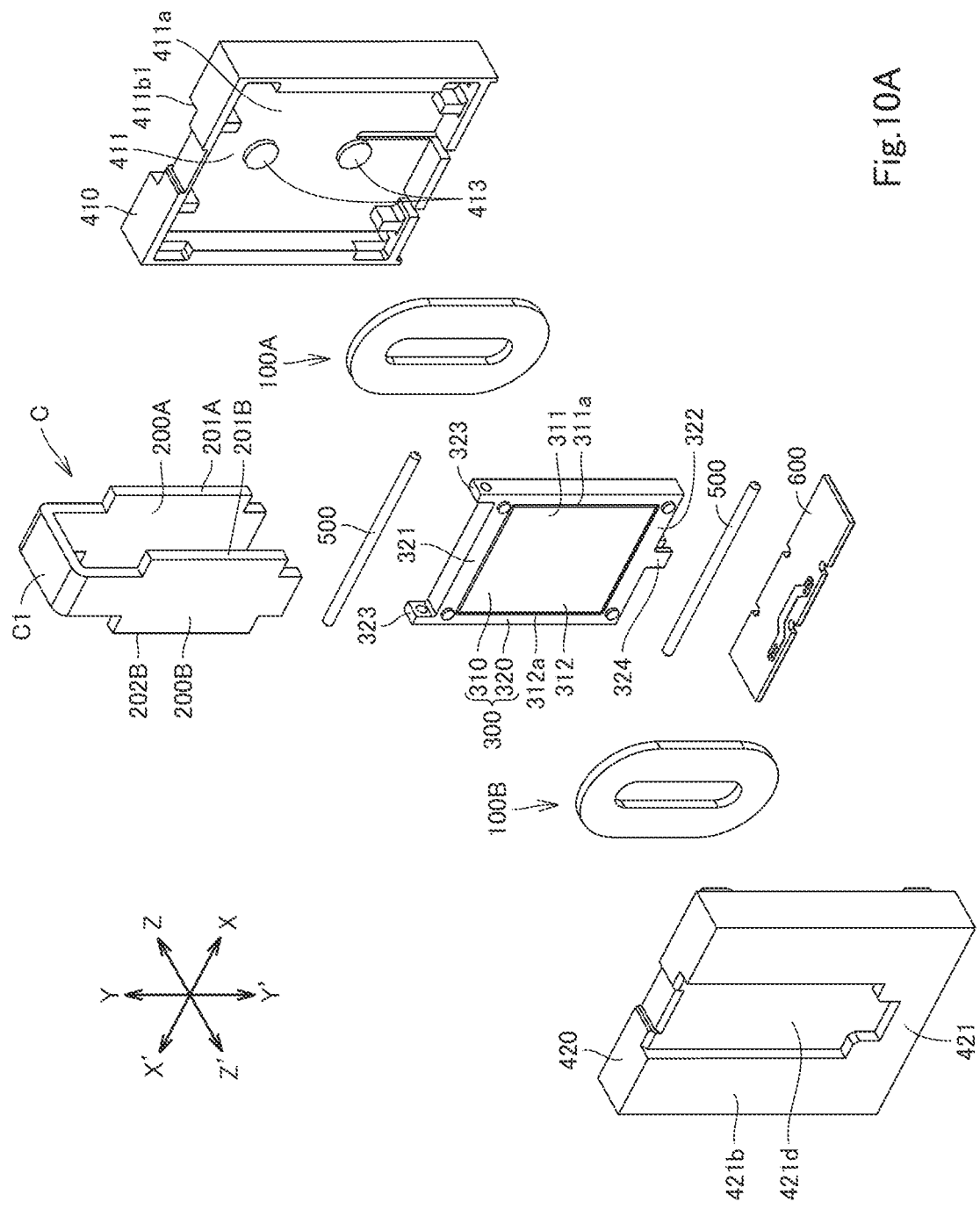
FIG. 10A is an exploded, front, top, right side perspective view of the vibration generator of the second embodiment.
Figure 10B:
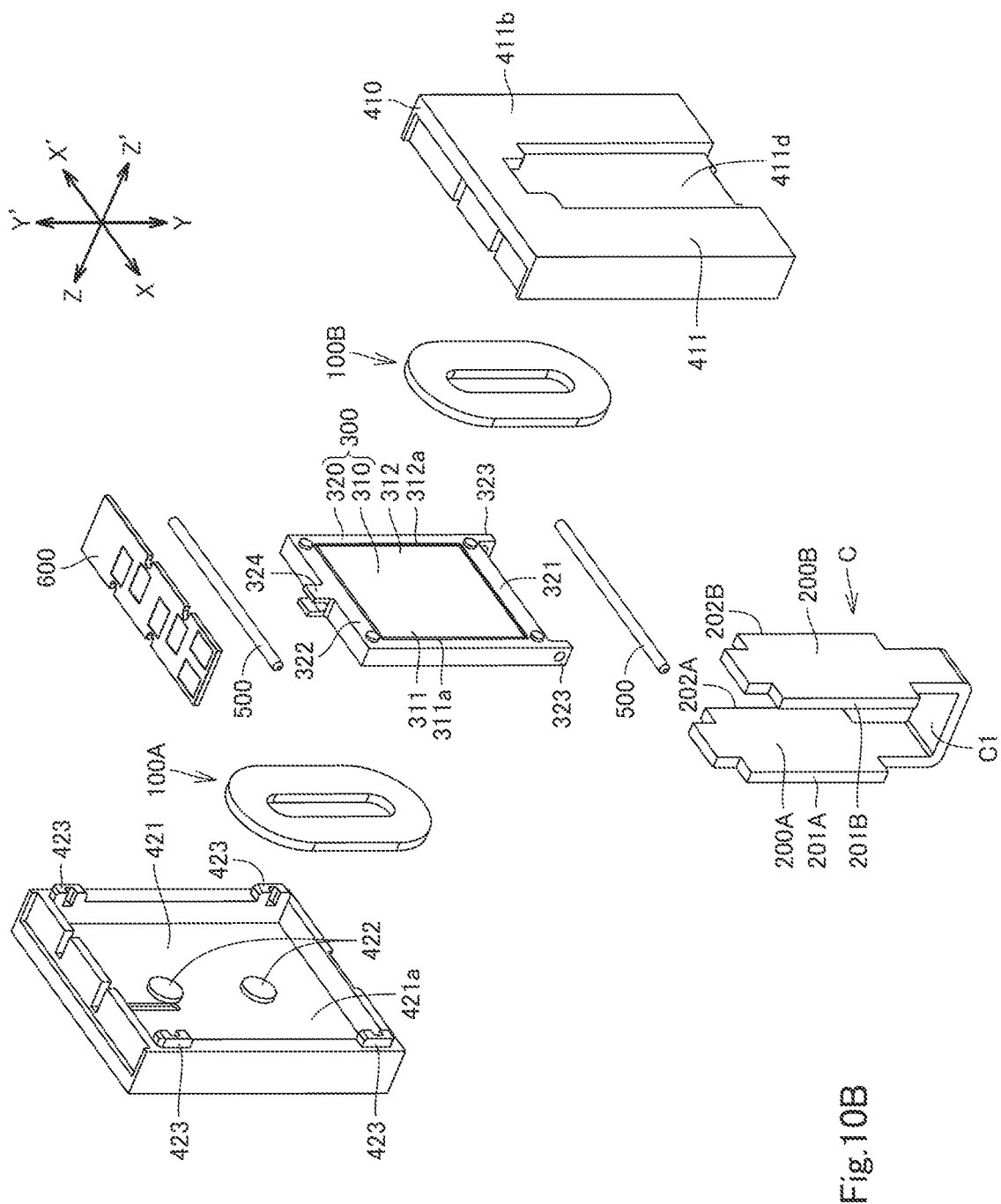
FIG. 10B is an exploded, rear, bottom, left side perspective view of the vibration generator of the second embodiment.
Figure 11A:
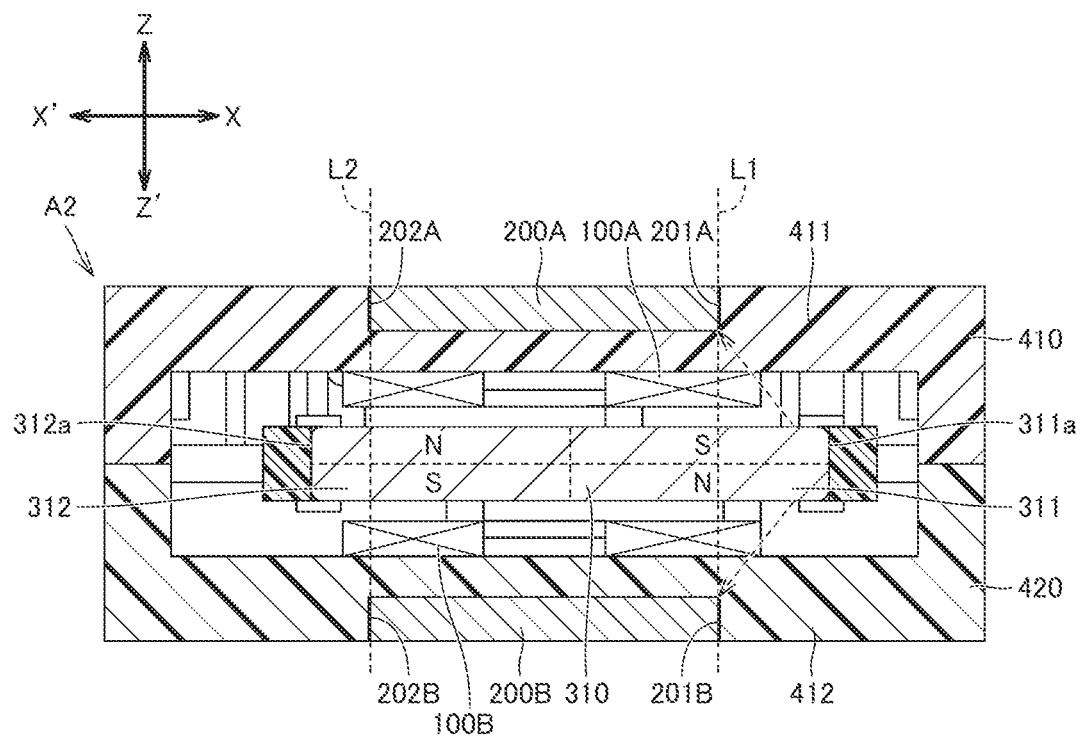
FIG. 11A is a cross-sectional view of the vibration generator of the second embodiment corresponding to FIG. 8B, with the movable part of the vibration generator positioned at a first position.
Figure 11B:
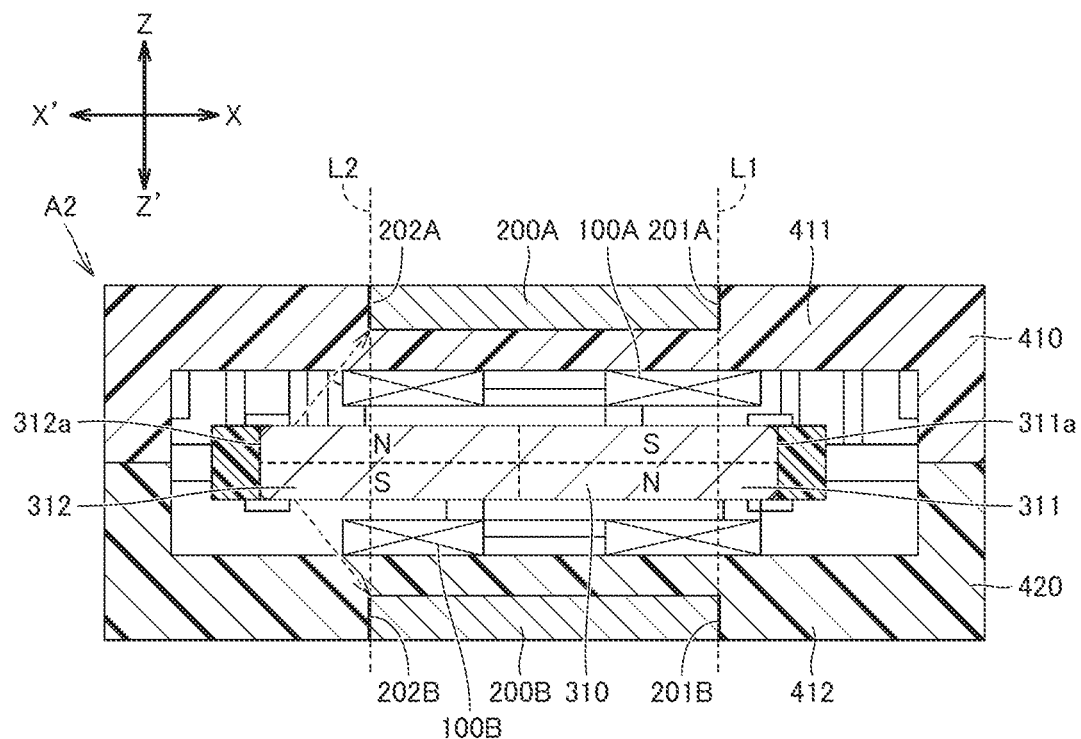
FIG. 11B is a cross-sectional view of the vibration generator of the second embodiment corresponding to FIG. 8B, with the movable part of the vibration generator positioned at a second position.
Figure 12A:
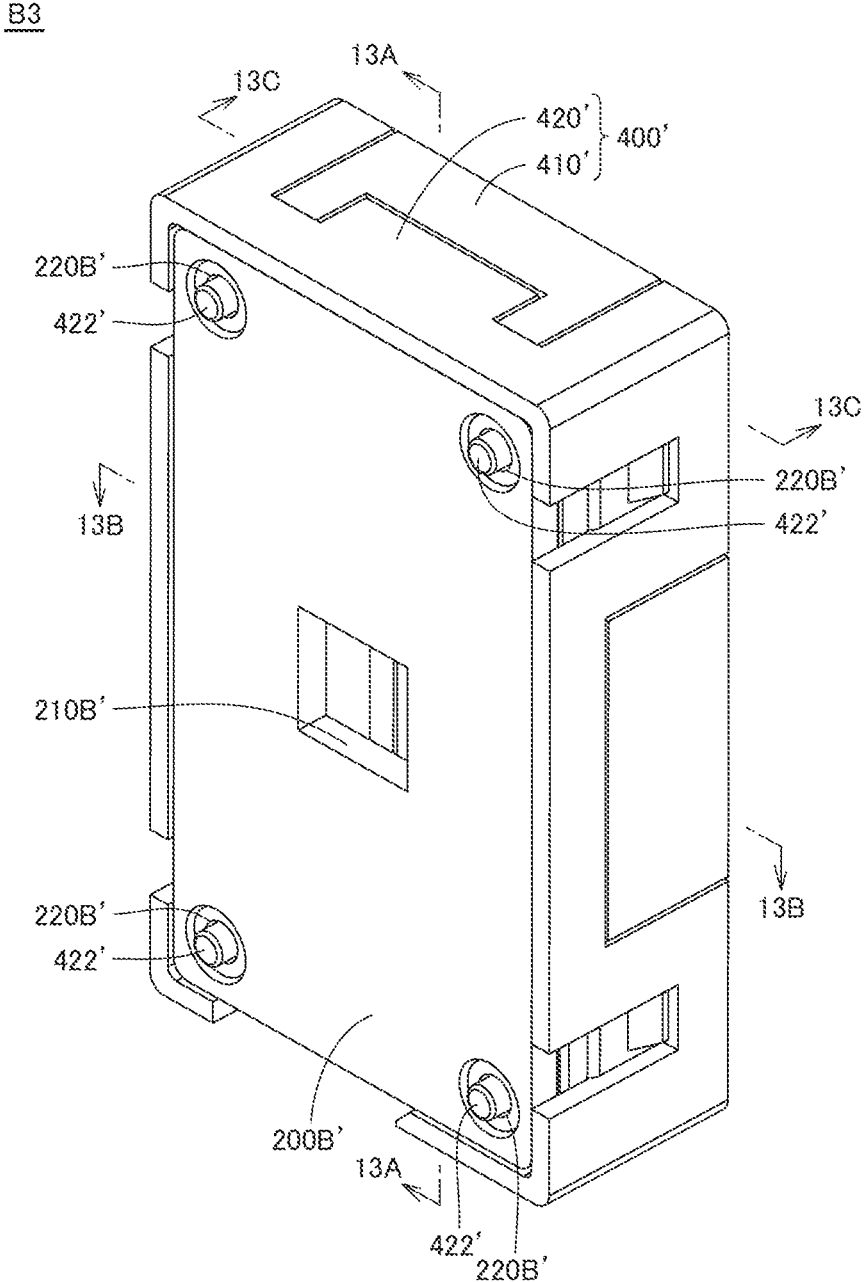
FIG. 12A is a front, top, right side perspective view of a vibration generator according to a third embodiment of the invention.
Figure 12B:
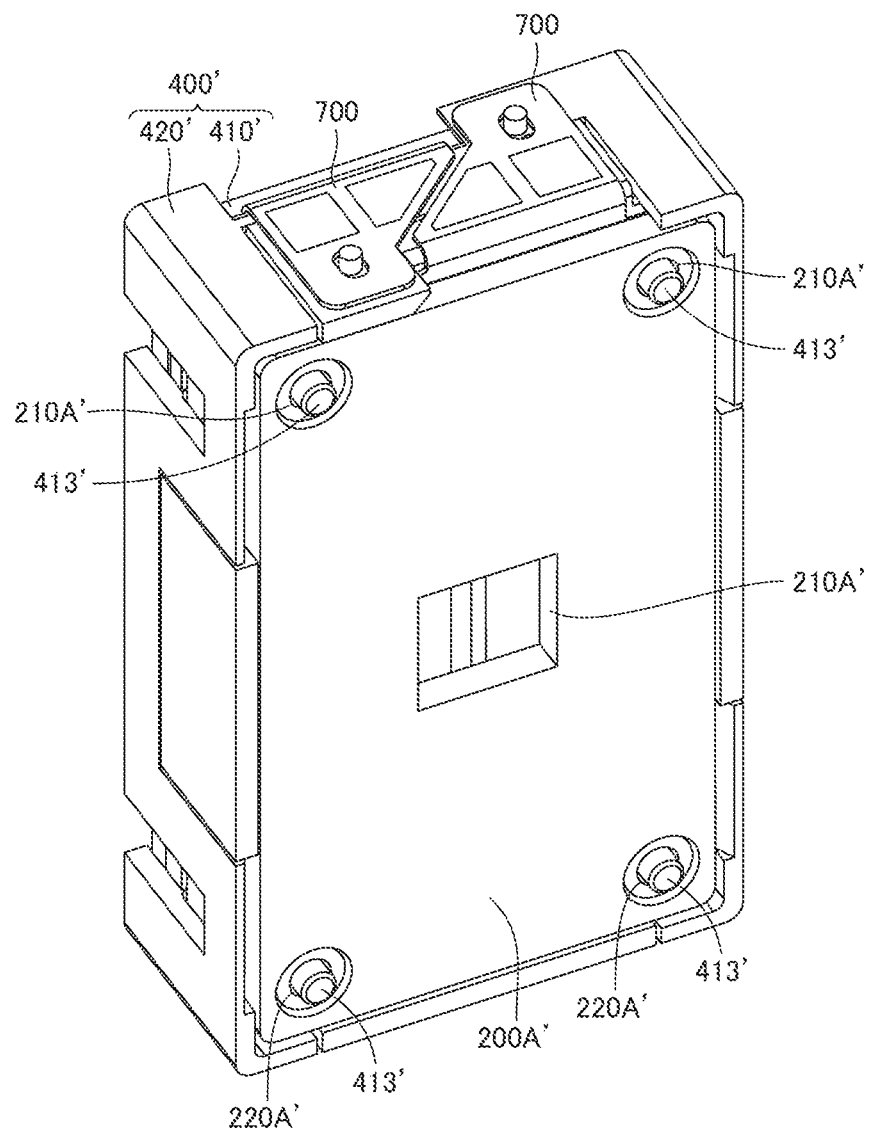
FIG. 12B is a rear, bottom, left side perspective view of the vibration generator of the third embodiment.

The movable part 300 is linearly movable at least between a neutral position (see FIGS. 2A to 2C and 6A) and a first position (see FIGS. 5A and 6B). The first position is positioned on the X-direction side relative to the neutral position. The movable part 300 may be linearly movable between the first position and a second position (see FIGS. 5B and 6C). The second position is positioned on the X'-direction side relative to the neutral position, and the neutral position is between the first and second positions in the X-X' direction. In this case, the movable part 300 passes through the neutral position in order to move from the first position to the second position, and from the second position to the first position. Hereinafter, for convenience in description, a "first movement aspect" refers to an aspect in which the movable part 300 moves between the first position and the second position, and a "second movement aspect" refers to an aspect in which the movable part 300 moves between the neutral position and the first position.

The movable part 300 may further include a holder 320. The holder 320 is constituted by a non-magnetic substance, such as synthetic resin, and holds the permanent magnet 310. For example, the holder 320 may be an annular body (see FIGS. 2B to 4B) fitting around the permanent magnet 310, a block of any shape with the permanent magnet 310 insert-molded therein, or a box housing the permanent magnet 310. The holder 320 includes a first end portion 321 on the Y-direction side and a second end portion 322 on the Y'-direction. The holder 320 can be omitted.

The actuator A1 may further include a housing 400. The housing 400 includes a first housing 410 and a second housing 420. The first housing 410 and the second housing 420 are each constituted by a non-magnetic substance, such as synthetic resin. The first housing 410 may be provided with an accommodation recess. With the first housing 410 combined with the second housing 420, the accommodation recess is closed by the second housing 420 to form an accommodation space of the housing 400. Alternatively, the first housing 410 and the second housing 420 are each provided with an accommodation recess. With the first housing 410 combined with the second housing 420, the accommodation recesses of the first housing 410 and the second housing 420 in combination form an accommodation space of the housing 400. In either case, the accommodation space of the housing 400 accommodates at least the movable part 300, the first coil 100A, and the second coil 100B.

The first housing 410 may include walls on the X- and X'-direction sides of the accommodation recess. Each of the walls on the X- and X'-direction sides include a portion on the Y-direction side and a portion on the Y'-direction side.

The first housing 410 includes a first facing portion 411 facing the first coil 100A in the Z-Z' direction. The second housing 420 includes a second facing portion 421 facing the second coil 100B in the Z-Z' direction. The first facing portion 411 includes an inner face 411a facing the first coil 100A in the Z-Z' direction, an outer face 411b opposite to the inner face 411a in the Z-Z' direction, and an inner portion 411c between the inner face 411a and the outer face 411b. The inner face 411a may be a bottom face of the accommodation recess of the first housing 410. The second facing portion 421 includes an inner face 421a facing the second coil 100B in the Z-Z' direction, an outer face 421b opposite to the inner face 421a in the Z-Z' direction, and an inner portion 421c between the inner face 421a and the outer face 421b. Where the second housing 420 includes the accommodation recess, the inner face 421a may form a bottom face of the accommodation recess of the second housing 420.

The first housing 410 may further include a holding portion 413 to hold the first coil 100A. The second housing 420 may further include a holding portion 422 to hold the second coil 100B. The holding portion 413 may include one or more protrusions being provided on the inner face 411a of the first facing portion 411 (see FIGS. 2A and 4A to 4B) and fitting in the first coil 100A. The holding portion 422 may include one or more protrusions being provided on the inner face 421a of the second facing portion 421 (see FIGS. 2A and 4A to 4B) and fitting in the second coil 100B. Alternatively, the holding portion 413 may be provided with a recess to fittingly receive the first coil 100A, the holding portion 422 may be provided with a recess to fittingly receive the second coil 100B. It should be appreciated that the first coil 100A and the second coil 100B may be bonded to the first and second housings 410 and 420, respectively, in which case the holding portions 413 and 422 can be omitted.

The actuator A1 may further include a guide. The guide is configured to guide the movable part 300 movably in the X-X' direction. For example, the guide and the movable part 300 may have any of the following configurations (1) to (4).

(1) The guide includes first and second guide rails 500 (see FIGS. 2A to 6C). The first and second guide rails 500 are shafts or the like members provided separately from the housing 400 and attached to the first housing 410 of the housing 400. Each of the first and second guide rails 500 extends in the X-X' direction and include a first end on the X-direction side and a second end on the X'-direction side. The portions on the Y-direction side of the walls on the X- and X' direction sides of the first housing 410 are provided with a pair of first support recesses 412 to receive and support the first and second ends of the first guide rail 500. The portions on the Y'-direction side of the walls on the X- and X' direction sides of the first housing 410 are provided with a pair of second support recesses 412 to receive and support the first and second ends of the second guide rail 500. The movable part 300 further includes at least one first runner 323 and at least one second runner 324. Where the holder 320 is provided, the at least one first runner 323 and the at least one second runner 324 are provided on the first end portion 321 and the second end portion 322, respectively, of the holder 320 (see FIGS. 2A, 2C, and 3 to 4B). Where the holder 320 is omitted, the at least one first runner 323 and the at least one second runner 324 are provided on the end portions on the Y- and Y-direction sides, respectively, of the permanent magnet 310. In either case, the at least one first runner 323 has a dimension in the X-X' direction that is smaller than that of the first guide rail 500, and the at least one second runner 324 has a dimension in the X-X' direction that is smaller than that of the second guide rail 500. The or each first runner 323 has a groove or hole extending in the X-X' direction through the or each first runner 323 and receiving the first guide rail 500, so that the or each first runner 323 is movable in the X-X' direction along the first guide rail 500. Likewise, the or each second runner 324 has a groove or hole extending in the X-X' direction through the or each second runner 324 and receiving the second guide rail 500, so that the or each second runner 324 is movable in the X-X' direction along the second guide rail 500.

(2) The first and second guide rails 500 have a configuration similar to that of configuration (1) above, but different in that the first and second guide rails 500 of configuration (2) are ridges (not illustrated) being provided in the first housing 410, protruding toward the at least one first runner 323 side and the at least one second runner 324, respectively, of the movable part 300, and extending in the X-X' direction. The at least one first runner 323 and the at least one second runner 324 of configuration (2) is similar to those of configuration (1) above, but different in that the or each first runner 323 has a groove extending in the X-X' direction through the or each first runner 323, opening toward the first guide rail 500, and receiving the first guide rail 500, so that the or each first runner 323 is movable in the X-X' direction along the first guide rail 500. Likewise, the or each second runner 324 has a groove extending in the X-X' direction through the or each second runner 324, opening toward the second guide rail 500, and receiving the second guide rail 500, so that the or each second runner 324 is movable in the X-X' direction along the second guide rail 500.

(3) The guide includes first and second guide grooves (not illustrated). The first and second guide grooves are provided in the first housing 410, open toward the at least one first runner 323 and the at least one second runner 324, respectively, of the movable part 300, and extend in the X-X' direction. The at least one first runner 323 of configuration (2) is similar to that of configuration (1) above, but different in that the or each first runner 323 protrudes toward the first guide groove, is received in the first guide groove, and is movable in the X-X' direction along the first guide groove. The at least one second runner 324 of configuration (2) is similar to that of configuration (1) above, but different in that the or each second runner 324 protrudes toward the second guide groove side, is received in the second guide groove, and is movable in the X-X' direction along the second guide groove.

Configurations (1) and (2) above may be modified such that only one of the first and second guide rails 500 is provided, with the other omitted, and only either of the at least one first runner 323 or the at least one second runner 324 is provided, with the other omitted. Configuration (3) above may be modified such that, only one of the first and second guide grooves is provided, with the other omitted, only one of the at least one first runner 323 and the at least one second runner 324 is provided, with the other omitted.

(4) The guide includes an indentation in the first housing 410 or a pair of ridges on the first housing 410. The indentation or the ridges extend in the X-X' direction. The indentation or each of the ridges has a dimension in the X-X' direction that is larger than that of the movable part 300. The movable part 300 is disposed in the indentation and movable in the X-X' direction, or alternatively the movable part 300 is disposed between the ridges and movable in the X-X' direction. In either case, the first and second runners 323 and 324 of the movable part 300 are omitted.

Each of the first and second non-movable parts 200A, 200B is a plate or a column having a circular or polygonal section, extends in the X-X' direction, and is constituted by a magnetic substance, such as soft iron (a yoke). The first non-movable part 200A includes a first end 201A on the X-direction side and a second end 202A on the X'-direction side, and the second non-movable part 200B includes a first end 201B on the X-direction side and a second end 202B on the X'-direction side.

The first non-movable part 200A is disposed on the Z-direction side relative to, and in spaced relation to, the first coil 100A, and the second non-movable part 200B is disposed on the Z'-direction side relative to, and in spaced relation to, the second coil 100B. The first non-movable part 200A is disposed on the Z-direction side, and in spaced relation to, the movable part 300, and the distance from the first non-movable part 200A to the movable part 300 is larger than the distance from the first non-movable part 200A to the first coil 100A. The second non-movable part 200B is disposed on the Z'-direction side, and in spaced relation to, the movable part 300, and the distance from the second non-movable part 200B to the movable part 300 is larger than the distance from the second non-movable part 200B to the second coil 100B. A first magnetic field is generated between the first non-movable part 200A and the permanent magnet 310 of the movable part 300. A second magnetic field is generated between the second non-movable part 200B and the permanent magnet 310 of the movable part 300.

Figure 2A:
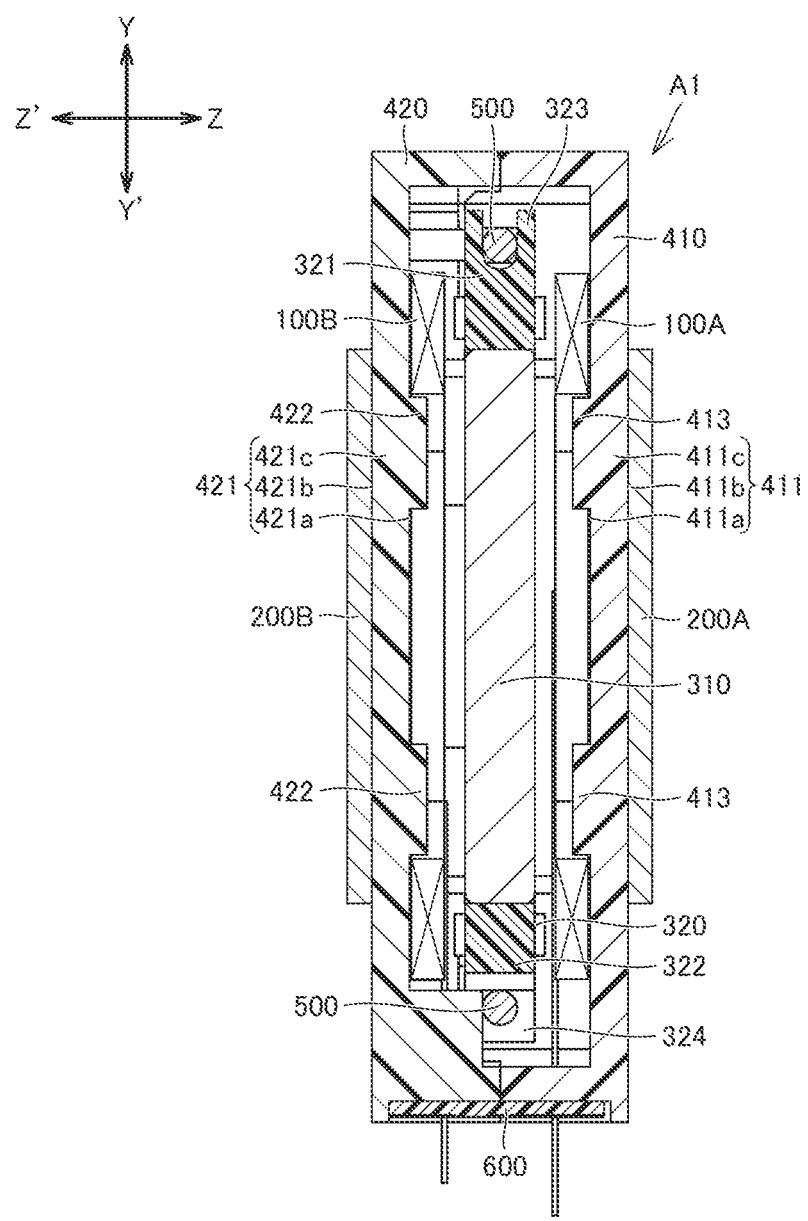
FIG. 2A is a cross-sectional view of the vibration generator of the first embodiment, taken along line 2A-2A in FIG. 1A, with a movable part of the vibration generator positioned at a neutral position.
Figure 2B:
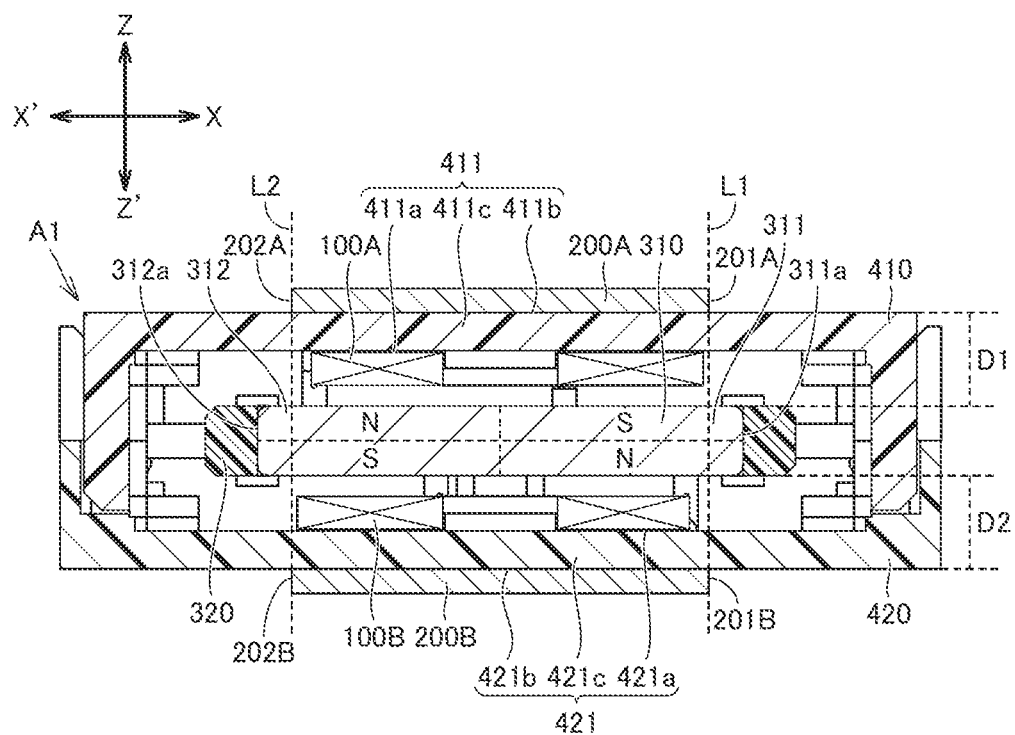
FIG. 2B is a cross-sectional view of the vibration generator of the first embodiment, taken along line 2B-2B in FIG. 1A, with the movable part of the vibration generator positioned at the neutral position.
Figure 2C:
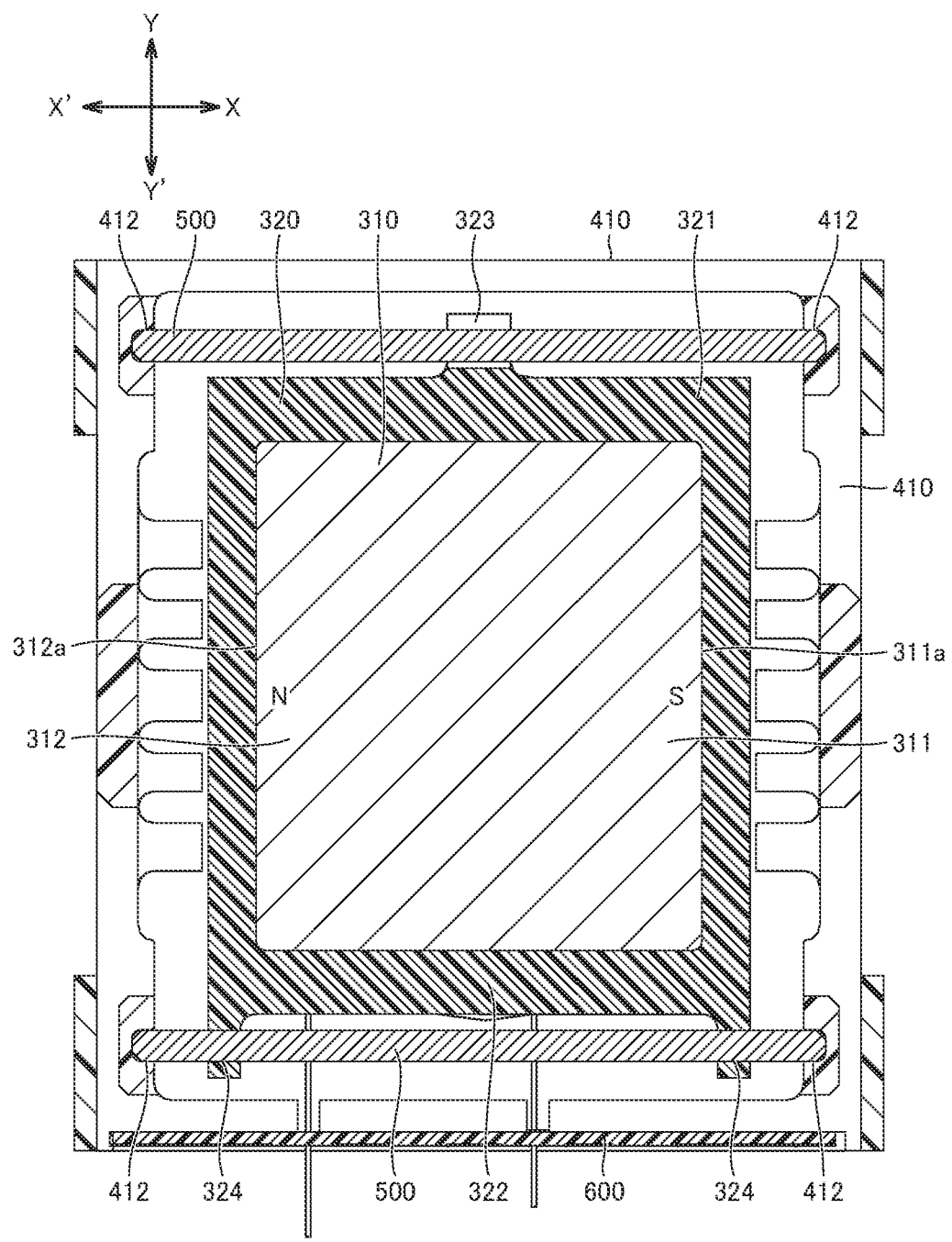
FIG. 2C is a cross-sectional view of the vibration generator of the first embodiment, taken along line 2C-2C in FIG. 1A, with the movable part of the vibration generator positioned at the neutral position.
Figure 3:
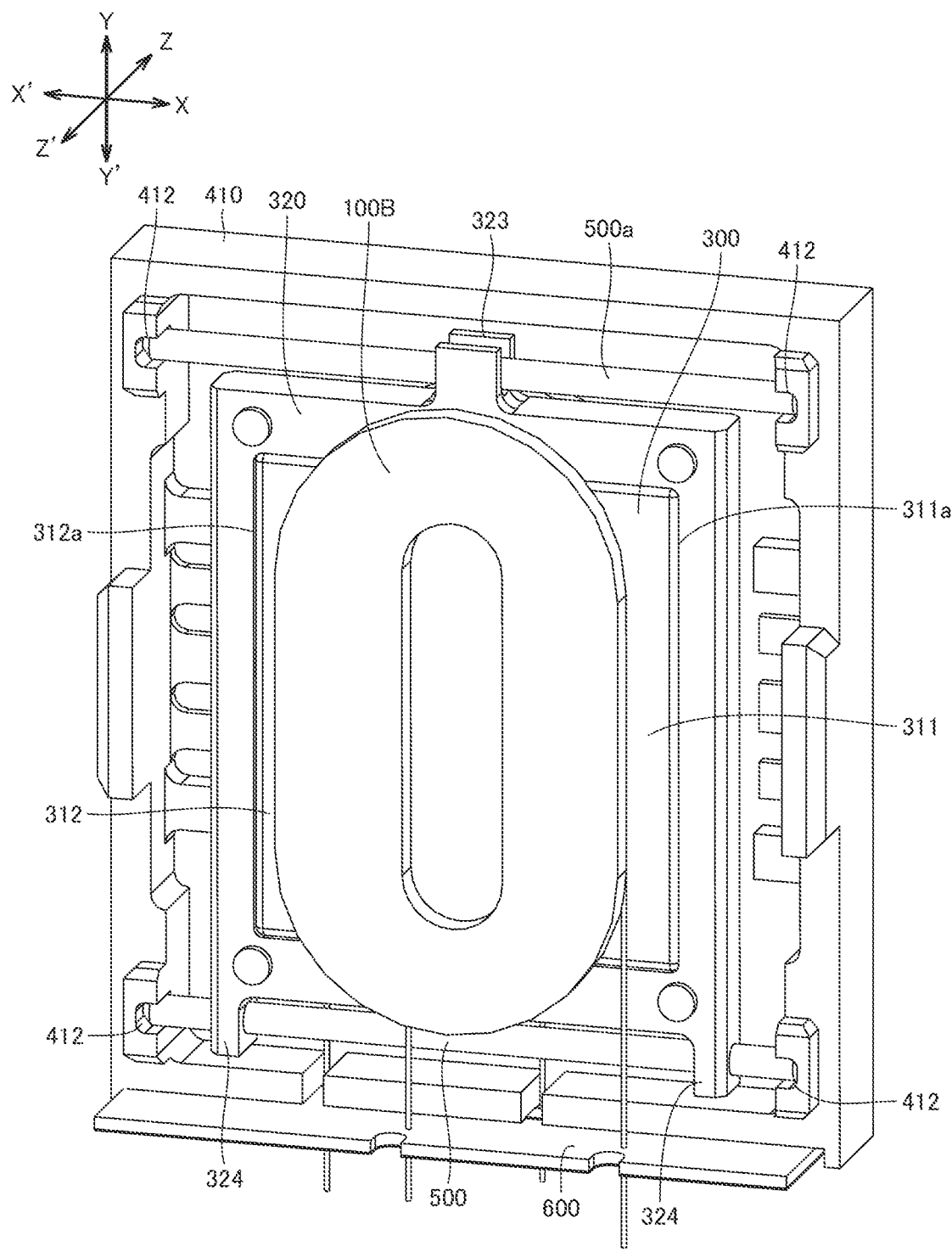
FIG. 3 is a front, top, right side perspective view of the vibration generator of the first embodiment, with a second housing removed from a first housing.
Figure 4A:
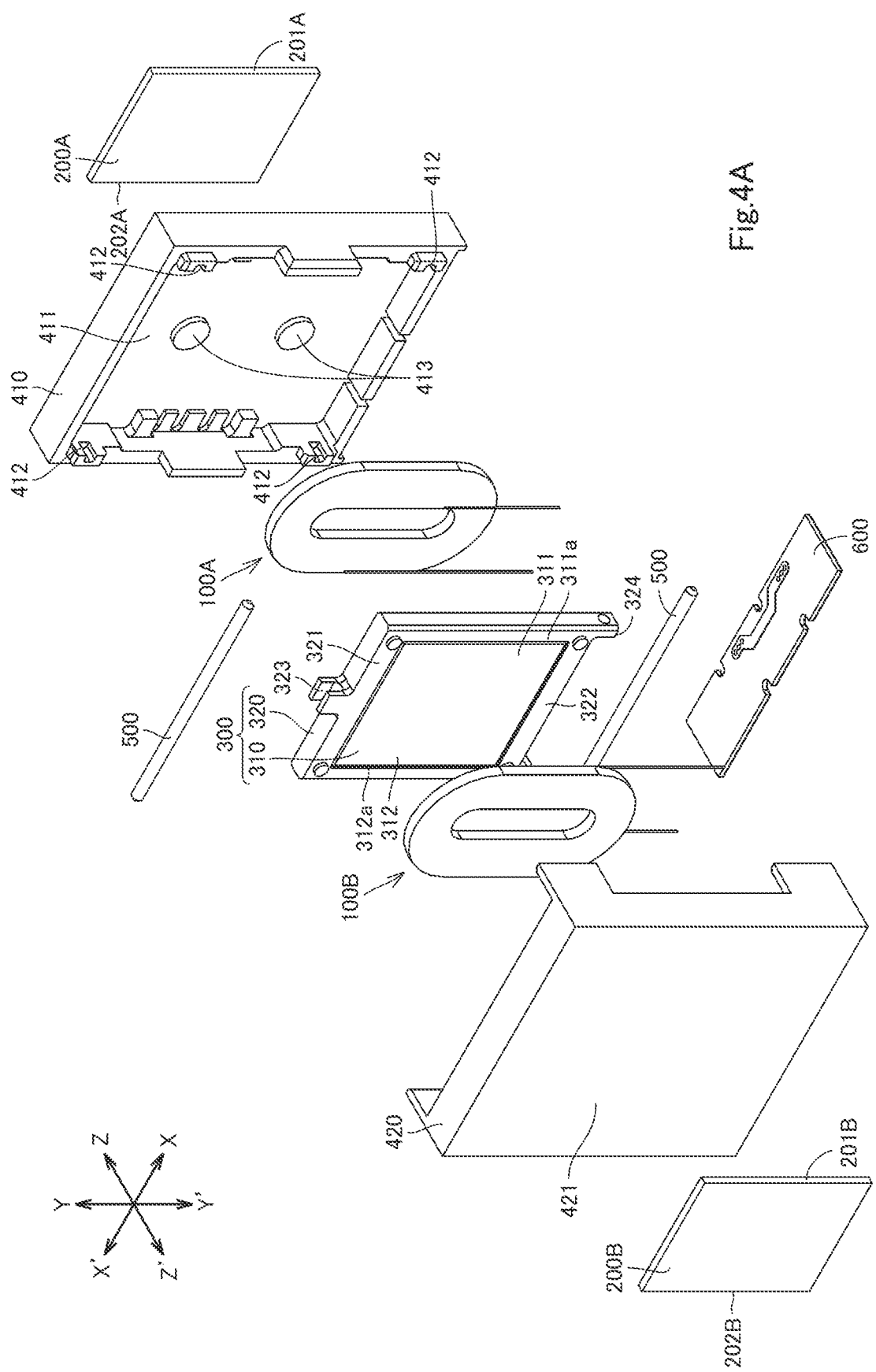
FIG. 4A is an exploded, front, top, right side perspective view of the vibration generator of the first embodiment.
Figure 4B:
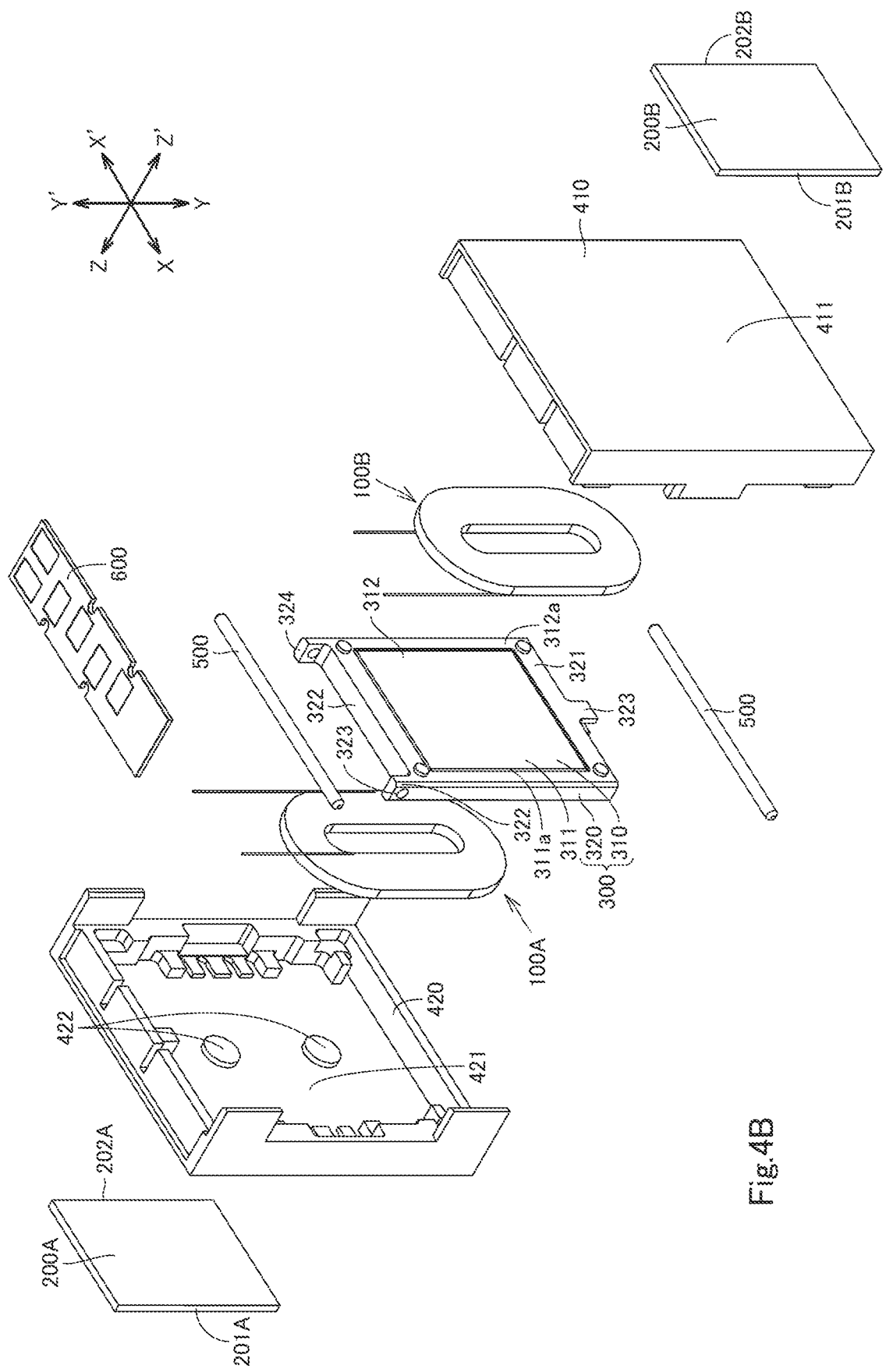
FIG. 4B is an exploded, rear, bottom, left side perspective view of the vibration generator of the first embodiment.

A first distance D1 in the Z-Z' direction from the first non-movable part 200A to the permanent magnet 310 of the movable part 300 may be substantially equal to a second distance D2 in the Z-Z' direction from the second non-movable part 200B to the permanent magnet 310 of the movable part 300 (see FIGS. 2B and 6A). In this case, a magnetic attraction force to attract the permanent magnet 310 in the Z direction toward the first non-movable part 200A is cancelled by a magnetic attraction force to attract the permanent magnet 310 in the Z' direction toward the second non-movable part 200B. The first and second distances D1 and D2 may be different from each other.

The first non-movable part 200A and the second non-movable part 200B are fixed to the housing 400. For example, the first non-movable part 200A and the second non-movable part 200B may be fixed to the housing 400 in any of the following manners (5) to (8).

(5) The first non-movable part 200A is fixed to the outer face 411b of the first facing portion 411 of the first housing 410, and the second non-movable part 200B is fixed to the outer face 421b of the second facing portion 421 of the second housing 420 (see FIG. 1A to 2B and 6A to 6C). (6) The first non-movable part 200A is fixed to the inner face 411a of the first facing portion 411 of the first housing 410, and the second non-movable part 200B is fixed to the inner face 421a of the second facing portion 421 of the second housing 420. In this case, the first non-movable part 200A and the second non-movable part 200B are also accommodated in the accommodation space of the housing 400. (7) The first non-movable part 200A is embedded in the inner portion 411c of the first facing portion 411 of the first housing 410 by insert molding, and the second non-movable part 200B is embedded in the inner portion 421c of the second facing portion 421 of the second housing 420 by insert molding. (8) The first non-movable part 200A is securely received in a first indentation in the inner portion 411c of the first facing portion 411 of the first housing 410, and the second non-movable part 200B is securely received in a second indentation in the inner portion 421c of the second facing portion 421 of the second housing 420. The first and second indentations are open at least in the Y direction. The first indentation may be open in the Y and Z directions, and the second indentation may be open in the Y and Z' directions.

In the first movement aspect, in a state where the movable part 300 is positioned at the neutral position, the movable part 300 and the first and second non-movable parts 200A, 200B may have either configuration (A) or (B) below and also either configuration (C) or (D) below.

(A) The movable part 300 at the neutral position is disposed such that the first end 311a of the permanent magnet 310 of the movable part 300 is at a relative position in the X-X' direction that substantially coincides with the first end 201A of the first non-movable part 200A, and with the first end 201B of the second non-movable part 200B (see FIG. 6A). In other words, the movable part 300 at the neutral position is disposed such that the first end 311a of the permanent magnet 310 of the movable part 300 is positioned along a first imaginary line L1 extending in the Z-Z' direction along the first end 201A of the first non-movable part 200A, and along the first end 201B of the second non-movable part 200B. As the movable part 300 moves in the X direction from the neutral position, a portion (which may be referred to as a first enlarging portion 3111) of the permanent magnet 310 that is positioned on the X-direction side relative to the first ends 201A, 201B of the first and second non-movable parts 200A, 200B (i.e., relative to the first imaginary line L1) gradually enlarges (see FIG. 6B). In a state where the movable part 300 is positioned at the neutral position, the permanent magnet 310 has no first enlarging portion 3111 (see FIG. 6A). In a state where the movable part 300 has moved from the neutral position to the first position, the first enlarging portion 3111 of the permanent magnet 310 becomes the largest (see FIG. 6B). This largest first enlarging portion 3111 includes a part on the X-direction side of, or the whole of, the first end portion 311 of the permanent magnet 310.

(B) The movable part 300 at the neutral position is disposed such that the first end portion 311 of the permanent magnet 310 of the movable part 300 is positioned, in the X-X' direction, on the X-direction side relative to the first end 201A of the first non-movable part 200A, and relative to the first end 201B of the second non-movable part 200B (see FIG. 2B). In other words, the movable part 300 at the neutral position is disposed such that the first end portion 311 of the permanent magnet 310 of the movable part 300 is positioned on the X-direction side relative to the first imaginary line L1. As the movable part 300 moves in the X direction from the neutral position, the first enlarging portion 3111 of the permanent magnet 310 gradually enlarges (see FIG. 5A). In a state where the movable part 300 is positioned at the neutral position, the first enlarging portion 3111 of the permanent magnet 310 is the smallest, and this smallest first enlarging portion 3111 includes the first end portion 311 of the permanent magnet 310 (see FIG. 2B). In a state where the movable part 300 has moved from the neutral position to the first position, the first enlarging portion 3111 of the permanent magnet 310 becomes the largest (see FIG. 5A). This largest first enlarging portion 3111 includes the entire first end portion 311 of the permanent magnet 310 and a portion on the X'-direction side relative to the first end portion 311 of the permanent magnet 310.

(C) The movable part 300 at the neutral position is disposed such that the second end 312a of the permanent magnet 310 of the movable part 300 is at a relative position in the X-X' direction that substantially coincides with the second end 202A of the first non-movable part 200A, and with the second end 202B of the second non-movable part 200B (see FIG. 6A). In other words, the movable part 300 at the neutral position is disposed such that the second end 312a of the permanent magnet 310 of the movable part 300 is positioned along a second imaginary line L2 extending in the Z-Z' direction along the second end 202A of the first non-movable part 200A, and along the second end 202B of the second non-movable part 200B. As the movable part 300 moves in the X' direction from the neutral position, a portion (which may be referred to as a second enlarging portion 3121) of the permanent magnet 310 that is positioned on the X'-direction side relative to the second ends 202A, 202B of the first and second non-movable parts 200A, 200B (i.e., relative to the second imaginary line L2) gradually enlarges (see FIG. 6C). In a state where the movable part 300 is positioned at the neutral position, the permanent magnet 310 has no second enlarging portion 3121 (see FIG. 6A). In a state where the movable part 300 has moved from the neutral position to the second position, the second enlarging portion 3121 of the permanent magnet 310 becomes the largest (see FIG. 6C). This largest second enlarging portion 3121 includes a part on the X'-direction side of, or the whole of, the second end portion 312 of the permanent magnet 310.

(D) The movable part 300 at the neutral position is disposed such that the second end portion 312 of the permanent magnet 310 of the movable part 300 is positioned, in the X-X' direction, on the X'-direction side relative to the second end 202A of the first non-movable part 200A, and relative to the first end 201B of the second non-movable part 200B (see FIG. 2B). In other words, the movable part 300 at the neutral position is disposed such that the second end portion 312 of the permanent magnet 310 of the movable part 300 is positioned on the X'-direction side relative to the second imaginary line L2. As the movable part 300 moves in the X' direction from the neutral position, the second enlarging portion 3121 of the permanent magnet 310 gradually enlarges (see FIG. 5B). In a state where the movable part 300 is positioned at the neutral position, the second enlarging portion 3121 of the permanent magnet 310 is the smallest, and this smallest second enlarging portion 3121 includes the second end portion 312 of the permanent magnet 310 (see FIG. 2B). In a state where the movable part 300 has moved from the neutral position to the second position, the second enlarging portion 3121 of the permanent magnet 310 becomes the largest (see FIG. 5B). This largest second enlarging portion 3121 includes the entire second end portion 312 of the permanent magnet 310 and a portion on the X-direction side relative to the second end portion 312 of the permanent magnet 310.

Whether the movable part 300 and the first and second non-movable parts 200A, 200B have configuration (A) or (B) above, the first enlarging portion 3111 of the permanent magnet 310 is magnetically attracted toward the first non-movable part 200A in a diagonal direction including components of the X' and Z directions (this diagonal direction may be referred to as an X'Z direction), and the first enlarging portion 3111 of the permanent magnet 310 is magnetically attracted toward the second non-movable part 200B in a diagonal direction including components of the X' and Z' directions (this diagonal direction may be referred to as an X'Z' direction) (see FIGS. 5A and 6B). For convenience in description, the former magnetic attraction force in the X'Z direction may be referred to as a first magnetic attraction force, and the latter magnetic attraction force in the X'Z' direction may be referred to as a second magnetic attraction force. The first enlarging portion 3111 thus magnetically attracts the first non-movable part 200A and the second non-movable part 200B. Since the first and second non-movable parts 200A, 200B are fixed to the housing 400, the magnetic attraction forces in the X' direction included in the first and second magnetic attraction forces exerted by the first enlarging portion 3111 of the permanent magnet 310 act as forces to move the movable part 300 relatively in the X' direction relative to the first and second non-movable parts 200A, 200B.

Where the movable part 300 and the first and second non-movable parts 200A, 200B have configuration (A) above, in a state where the movable part 300 is positioned at the neutral position, the permanent magnet 310 has no first enlarging portion 3111, and therefore the first and second magnetic attraction forces will not be generated. Where the movable part 300 and the first and second non-movable parts 200A, 200B have configuration (B) above, in a state where the movable part 300 is positioned at the neutral position, the first enlarging portion 3111 of the permanent magnet 310 includes the first end portion 311 of the permanent magnet 310, and therefore the first and second magnetic attraction forces are the smallest. On the other hand, whether the movable part 300 and the first and second non-movable parts 200A, 200B have configuration (A) or (B) above, as the first enlarging portion 3111 of the permanent magnet 310 enlarges, the first and second magnetic attraction forces become larger, and become the largest in a state where the movable part 300 has moved to the first position.

Whether the movable part 300 and the first and second non-movable parts 200A, 200B have configuration (C) or (D) above, the second enlarging portion 3121 of the permanent magnet 310 is magnetically attracted toward the first non-movable part 200A in a diagonal direction including components of the X and Z directions (this diagonal direction may be referred to as an XZ direction), and the second enlarging portion 3121 of the permanent magnet 310 is magnetically attracted toward the second non-movable part 200B in a diagonal direction including components of the X and Z' directions (this diagonal direction may be referred to as an XZ' direction) (see FIGS. 5B and 6C). For convenience in description, the former magnetic attraction force in the XZ direction may be referred to as a third magnetic attraction force, and the latter magnetic attraction force in the XZ' direction may be referred to as a fourth magnetic attraction force. The second enlarging portion 3121 thus magnetically attracts the first non-movable part 200A and the second non-movable part 200B. Since the first and second non-movable parts 200A, 200B are fixed to the housing 400, the magnetic attraction forces in the X direction included in the third and fourth magnetic attraction forces exerted by the second enlarging portion 3121 of the permanent magnet 310 act as forces to move the movable part 300 relatively in the X direction relative to the first and second non-movable parts 200A, 200B.

Where the movable part 300 and the first and second non-movable parts 200A, 200B have configuration (C) above, in a state where the movable part 300 is positioned at the neutral position, the permanent magnet 310 has no second enlarging portion 3121, and therefore the third and fourth magnetic attraction forces will not be generated. Where the movable part 300 and the first and second non-movable parts 200A, 200B have configuration (D) above, in a state where the movable part 300 is positioned at the neutral position, the second enlarging portion 3121 of the permanent magnet 310 includes the second end portion 312 of the permanent magnet 310, and therefore the third and fourth magnetic attraction forces are the smallest. On the other hand, whether the movable part 300 and the first and second non-movable parts 200A, 200B have configuration (C) or (D) above, as the second enlarging portion 3121 of the permanent magnet 310 enlarges, the third and fourth magnetic attraction forces become larger, and become the largest in a state where the movable part 300 has moved to the second position.

The first coil 100A is disposed in the Z-Z' direction between, and in spaced relation to, the movable part 300 and the first non-movable part 200A. The first coil 100A is, for example, a spiral coil disposed in the first magnetic field between the permanent magnet 310 of the movable part 300 and the first non-movable part 200A such that the wire of the first coil 100A traverses the first magnetic field. The second coil 100B is disposed in the Z-Z' direction between, and in spaced relation to, the permanent magnet 310 of the movable part 300 and the second non-movable part 200B. The second coil 100B is, for example, a spiral coil disposed in the second magnetic field between the movable part 300 and the second non-movable part 200B such that the wire of the second coil 100B traverses the second magnetic field. The first coil 100A and the second coil 100B may be wound in a same direction, or in opposite directions.

The actuator A1 may further include a circuit board 600. The circuit board 600 may be fixed to the housing 400 and connected to the first coil 100A and the second coil 100B.

The first coil 100A and the second coil 100B may be electrically connected to first and second oscillation circuits, respectively, provided externally of the vibration generator B1. In this case, the circuit board 600 can be omitted. The first and second oscillation circuits may be provided in the actuator A1 of the vibration generator B1, rather than externally of the vibration generator B1. In this case, the first and second oscillation circuits may be mounted on the circuit board 600. The first and second oscillation circuits of either aspect is configured to apply square-wave or sine-wave currents in the same direction to the first coil 100A and second coil 100B, respectively.

In the first movement aspect, the current applied to the first coil 100A is reversed in polarity repeatedly at predetermined intervals, and the current applied to the second coil 100B is reversed in polarity repeatedly at predetermined intervals. The application of such current to the first coil 100A alternately generates a first driving force (Lorentz force) to move the permanent magnet 310 in the X direction and a third driving force (Lorentz force) to move the permanent magnet 310 in the X' direction. Specifically, the first driving force (Lorentz force) to move the permanent magnet 310 in the X direction and the third driving force (Lorentz force) to move the permanent magnet 310 in the X' direction are alternately generated by an electromagnetic interaction between the first magnetic field and the current flowing through the first coil 100A such as to traverse the first magnetic field. The application of the current to the second coil 100B alternately generates a second driving force (Lorentz force) to move the permanent magnet 310 in the X direction and a fourth driving force (Lorentz force) to move the permanent magnet 310 in the X' direction. Specifically, the second driving force (Lorentz force) to move the permanent magnet 310 in the X direction and the fourth driving force (Lorentz force) to move the permanent magnet 310 in the X' direction are alternately generated by an electromagnetic interaction between the second magnetic field and the current flowing through the second coil 100B such as to traverse the second magnetic field. The first and second driving forces and the third and fourth driving forces alternately generated cause the movable part 300 to alternately repeat a relative and linear movement from the second position to the first position and a relative and linear movement from the first position to the second position, relative to the first coil 100A, the second coil 100B, the first non-movable part 200A, and the second non-movable part 200B. Such alternately repeated linear movements of the movable part 300, from the second position to the first position and vice versa, result in generation of vibration.

The sum of the first and second driving forces (i.e., the total driving force to move the movable part 300 in the X direction) is larger than the sum of the magnetic attraction force in the X' direction included in the largest first magnetic attraction force and the magnetic attraction force in the X' direction included in the largest second magnetic attraction force (i.e., the total magnetic attraction force to move the movable part 300 in the X' direction). Therefore, the first and second driving forces move the movable part 300 linearly from the second position to the first position, against the sum force of the above-described two magnetic attraction forces in the X' direction. The sum of the third and fourth driving forces (i.e., the total driving force to move the movable part 300 in the X' direction) is larger than the sum of the magnetic attraction force in the X direction included in the largest third magnetic attraction force and the magnetic attraction force in the X direction included in the largest fourth magnetic attraction force (i.e., the total magnetic attraction force to move the movable part 300 in the X direction). Therefore, the third and fourth driving forces move the movable part 300 linearly from the first position to the second position, against the sum force of the above-described two magnetic attraction forces in the X direction. In the movement of the movable part 300 from the first position to the second position, during the movement of the movable part 300 from the first position to the neutral position, the movable part 300 is biased by the first and second magnetic attraction forces. In the movement of the movable part 300 from the second position to the first position, during the movement of the movable part 300 from the second position to the neutral position, the movable part 300 is biased by the third and fourth magnetic attraction forces.

On the other hand, in the second movement aspect, the movable part 300 and the first and second non-movable parts 200A, 200B have configuration (A) or (B) above, with configurations (C) and (D) above omitted. The current to be applied to the first coil 100A is of either a positive polarity or negative polarity, and the current to be applied to the second coil 100B is of either a positive or negative polarity. A current of either a positive or negative polarity is intermittently applied to the first and second coils 100A, 100B. The application of a current to the first coil 100A intermittently generates a first driving force (Lorentz force) to move the permanent magnet 310 in the X direction. Specifically, the first driving force (Lorentz force) to move the permanent magnet 310 in the X direction is intermittently generated by an electromagnetic interaction between the first magnetic field and the current flowing through the first coil 100A such as to traverse the first magnetic field. The application of a current to the second coil 100B intermittently generates a second driving force (Lorentz force) to move the permanent magnet 310 in the X direction. Specifically, the second driving force (Lorentz force) to move the permanent magnet 310 in the X direction is intermittently generated by an electromagnetic interaction between the second magnetic field and the current flowing through the second coil 100B such as to traverse the second magnetic field. The first and second driving forces cause the movable part 300 to intermittently move relatively and linearly from the neutral position to the first position, relative to the first coil 100A, the second coil 100B, the first non-movable part 200A, and the second non-movable part 200B. While the application of the currents to the first coil 100A and the second coil 100B is intermittently paused, the first and second magnetic attraction forces bias the permanent magnet 310 of the movable part 300 to intermittently move from the first position toward the neutral position. In short, the movable part 300 alternately repeats the linear movement in the X direction from the neutral position to the first position, caused by the first and second driving forces, and the linear movement from the first position to the neutral position, caused by the first and second magnetic attraction forces, so that vibration is generated.

The actuator A1 and the vibration generator B1 described above provides the following technical features and effects.

Technical Feature and Effect (1)

In the first movement aspect, the first and second driving forces in the X direction acting on the permanent magnet 310 of the movable part 300 moves the movable part 300 from the second position to the first position. Accordingly, the first enlarging portion 3111 of the permanent magnet 310 of the movable part 300 enlarges. Then the first enlarging portion 3111 is magnetically attracted toward the first and second non-movable parts 200A, 200B, and the third and fourth driving forces in the X' direction acting on the permanent magnet 310 of the movable part 300 moves the movable part 300 in a non-contact manner in the X' direction from the first position. The third and fourth driving forces in the X' direction acting on the permanent magnet 310 of the movable part 300 moves the movable part 300 from the first position to the second position. Accordingly, the second enlarging portion 3121 of the permanent magnet 310 of the movable part 300 enlarges. Then the second enlarging portion 3121 is magnetically attracted toward the first and second non-movable parts 200A, 200B, and the first and second driving forces acting on the permanent magnet 310 of the movable part 300 moves the movable part 300 moves in the X direction from the second position in a non-contact manner. The actuator A1 and the vibration generator B1 of this aspect apply driving forces in the X' and X directions in a non-contact manner to the movable part 300 moving alternately in the X and X' directions, respectively.

In the second movement aspect, the first and second driving forces acting on the permanent magnet 310 of the movable part 300 moves the movable part 300 from the neutral position to the first position. Accordingly, the first enlarging portion 3111 of the permanent magnet 310 of the movable part 300 enlarges. Then the first enlarging portion 3111 is magnetically attracted toward the first and second non-movable parts 200A, 200B, so that the movable part 300 moves in the X' direction from the first position in a non-contact manner. The actuator A1 and the vibration generator B1 of this aspect intermittently apply the driving forces in the X' direction in a non-contact manner to the movable part 300 moving intermittently in the X direction.

Technical Feature and Effect (2)

In the first movement aspect, the actuator A1 and the vibration generator B1 is configured to apply the driving forces in the X' and X directions in a non-contact manner to the movable part 300 moving alternately in the X and X' directions, respectively, by using the permanent magnet 310 of the movable part 300 and the first and second non-movable parts 200A, 200B (yokes). This configuration reduces the number of parts of the actuator A1 and the vibration generator B1, compared to conventional devices configured to apply the driving forces with springs or the like means.

In the second movement aspect, the actuator A1 and the vibration generator B1 are configured to intermittently apply the driving forces in the X' direction in a non-contact manner to the movable part 300 moving intermittently in the X direction by using the permanent magnet 310 of the movable part 300 and the first and second non-movable parts 200A, 200B (yokes). This configuration also reduces the number of parts of the actuator A1 and the vibration generator B1, compared to the conventional devices.

Technical Feature and Effect (3)

In the first movement aspect, the first and second driving forces (i.e., two driving forces) in the X direction acting on the permanent magnet 310 of the movable part 300 move the movable part 300 from the second position to the first position. The third and fourth driving forces (i.e., two driving forces) in the X' direction acting on the permanent magnet 310 of the movable part 300 move the movable part 300 from the first position to the second position. It is therefore possible to maximize the vibration generated by the movable part 300 moving alternately in the X and X' directions.

Technical Feature and Effect (4)

Where the first distance D1 is substantially equal to the second distance D2, the magnetic attraction force to attract the permanent magnet 310 in the Z direction toward the first non-movable part 200A is cancelled by the magnetic attraction force to attract the permanent magnet 310 in the Z' direction toward the second non-movable part 200B. It is therefore possible to reduce friction between the movable part 300 and the guide.

Technical Feature and Effect (5)

In the first movement aspect, the guide is provided separately and independently from the arrangement in which the first enlarging portion 3111 of the permanent magnet 310 of the movable part 300 is magnetically attracted toward the first and second non-movable parts 200A, 200B, and from the arrangement in which the second enlarging portion 3121 of the permanent magnet 310 of the movable part 300 is magnetically attracted toward the first and second non-movable parts 200A, 200B. Therefore, these arrangements can be designed and adjusted with increased flexibility.

In the second movement aspect, the guide is provided separately and independently from the arrangement in which the first enlarging portion 3111 of the permanent magnet 310 of the movable part 300 is magnetically attracted toward the first and second non-movable parts 200A, 200B. Therefore, this arrangement can be designed and adjusted with increased flexibility.

Second Embodiment

Hereinafter described is a vibration generator B2 according to a plurality of embodiments, including the second embodiment and modifications thereof, of the invention, with reference to FIGS. 7A to 11B. FIGS. 7A to 11B illustrate the vibration generator B2 according to the second embodiment. FIGS. 8B to 11B show the X-X' direction in a similar manner to FIGS. 2B to 5B. FIGS. 8A to 8B and 9 to 11B show the Z-Z' direction in a similar manner to FIGS. 2A, 2B and 3 to 5B. FIGS. 8A, and 8C to 10B show the Y-Y' direction in a similar manner to FIGS. 2A, and 2C to 4B.

The vibration generator B2 includes an electromagnetic actuator A2 (which may be referred to simply as an actuator A2). The actuator A2 has a similar configuration to that of the actuator A1, but is different in that the actuator A2 further includes at least one support C1. The actuator A2 will now be described focusing on the differences from the actuator A1 and omitting overlapping descriptions.

Where the guide and the movable part 300 have configuration (1) above, the pair of first support recesses 412 and the pair of second support recesses 412 of the first housing 410 may be omitted, and instead, the portions on the Y-direction side of the walls on the X- and X' direction sides of the second housing 420 may be provided with a pair of first support recesses 423 to receive and support the first and second ends of the first guide rail 500, and the portions on the Y'-direction side of the walls on the X- and X' direction sides of the second housing 420 may be provided with a pair of second support recesses 423 to receive and support the first and second ends of the second guide rail 500. Alternatively, the actuator A2 may be provided with the pair of first support recesses 412 and the pair of second support recesses 412, rather than the pair of first support recesses 423 and the pair of second support recesses 423. Likewise, the actuator A1 may be provided with the pair of first support recesses 423 and the pair of second support recesses 423, rather than the pair of first support recesses 412 and the pair of second support recesses 412.

Each of the first and second non-movable parts 200A, 200B further includes a third end portion on the Y-direction side and a fourth end portion on the Y'-direction side.

The at least one support C1 may be a single support C1 or a plurality of supports C1. The or each support C1 is a plate or a column having a circular or polygonal section and extends in the X-X' direction. The or each support C1 is provided between the first non-movable part 200A and the second non-movable part 200B in the X-X' direction, and is configured to support the first and second non-movable parts 200A, 200B. The or each support C1 may be integral with, or separate from, the first and second non-movable parts 200A, 200B. The or each support C1 includes a first end portion on the Z-direction side and a second end portion on the Z'-direction side.

Where a single support C1 is provided integrally with the first and second non-movable parts 200A, 200B, the support C1 extends from the third end portion of the first non-movable part 200A to the third end portion of the second non-movable part 200B. The first end portion of the support C1 is integral and contiguous with the third end portion of the first non-movable part, and the second end portion of the support C1 is integral and contiguous with the third end portion of the second non-movable part. In this case, the support C1, the first non-movable part 200A, and the second non-movable part 200B form a clamp C having a substantially U-shape, and the support C1 elastically supports the first and second non-movable parts 200A, 200B so as to maintain the direct distance (shortest distance) in the Z-Z' direction from the first non-movable part 200A to the second non-movable part 200B at a predetermined distance (see FIGS. 7A to 11B). The first and second non-movable parts 200A, 200B of the clamp C are fixed to the first facing portion 411 of the first housing 410 and the second facing portion 421 of the second housing 420 in any of manners (5) to (8) described above.

Where two supports C1 (first and second supports C1) are provided, with the first support C1 integral with the first non-movable part 200A and the second support C1 integral with the second non-movable part 200B, the first support C1 extends in the Z' direction from the third end portion of the first non-movable part 200A, and the second support C1 extends in the Z' direction from the fourth end portion of the second non-movable part 200B. The first end portion of the first support C1 is integral and contiguous with the third end portion of the first non-movable part, the second end portion of the second support C1 is integral and contiguous with the fourth end portion of the second non-movable part, one of the second end portion of the first support C1 and the third end portion of the second non-movable part is provided with a first engagement protrusion and the other is provided with a first engagement recess, one of the first end portion of the second support C1 and the fourth end portion of the first non-movable part is provided with a second engagement protrusion and the other is provided with a second engagement recess. The first engagement protrusion fits in the first engagement recess, so that the second end portion of the first support C1 is fixed to the third end portion of the second non-movable part. The second engagement protrusion fits in the second engagement recess, so that the first end portion of the second support C1 is fixed to the fourth end portion of the first non-movable part. In this case, the first and second supports C1 and the first and second non-movable parts 200A, 200B form a clamp C having a substantially O-shape, and the first and second supports C1 support the first and second non-movable parts 200A, 200B so as to maintain the direct distance (shortest distance) in the Z-Z' direction from the first non-movable part 200A to the second non-movable part 200B at a predetermined distance (not illustrated). The first and second non-movable parts 200A, 200B of this clamp C are fixed to the first facing portion 411 of the first housing 410 and the second facing portion 421 of the second housing 420 in any of manners (5) to (8) described above.

Where two supports C1 (first and second supports C1) are provided integrally with the first and second non-movable parts 200A, 200B, respectively, the first support C1 extends from the third end portion of the first non-movable part 200A to the third end portion of the second non-movable part 200B, and the second support C1 extends from the fourth end portion of the first non-movable part 200A to the fourth end portion of the second non-movable part 200B. The first end portion of the first support C1 is integral and contiguous with the third end portion of the first non-movable part 200A, the second end portion of the first support C1 is integral and contiguous with the third end portion of the second non-movable part 200B, the first end portion of the second support C1 is integral and contiguous with the fourth end portion of the first non-movable part 200A, and the second end portion of the second support C1 is integral and contiguous with the fourth end portion of the second non-movable part 200B. In this case, the first and second supports C1 and the first and second non-movable parts 200A, 200B form a clamp C having a substantially O-shape, and the first and second supports C1 support the first and second non-movable parts 200A, 200B so as to maintain the direct distance (shortest distance) in the Z-Z' direction from the first non-movable part 200A to the second non-movable part 200B at a predetermined distance (not illustrated). The first and second non-movable parts 200A, 200B of this clamp C are fixed to the first facing portion 411 of the first housing 410 and the second facing portion 421 of the second housing 420 in manner (5) described above.

Where a single support C1 is provided separately from the first and second non-movable parts 200A, 200B, one of the first end portion of the support C1 and the third end portion of the first non-movable part 200A is provided with a first engagement protrusion and the other is provided with a first engagement recess, one of the second end portion of the support C1 and the third end portion of the second non-movable part 200B is provided with a second engagement protrusion and the other is provided with a second engagement recess. The first engagement protrusion fits in the first engagement recess, and the second engagement protrusion fits in the second engagement recess, so that the first end portion of one support C1 is fixed to the third end portion of the first non-movable part 200A and the second end portion of one support C1 is fixed to the third end portion of the second non-movable part 200B. In this case, the support C1, the first non-movable part 200A, and the second non-movable part 200B form a clamp C having a substantially U-shape, and the support C1 elastically supports the first and second non-movable parts 200A, 200B so as to maintain the direct distance (shortest distance) in the Z-Z' direction from the first non-movable part 200A to the second non-movable part 200B at a predetermined distance (not illustrated). The first and second non-movable parts 200A, 200B of the clamp C are fixed to the first facing portion 411 of the first housing 410 and the second facing portion 421 of the second housing 420 in any of manners (5) to (8) described above.

Where two supports C1 (first and second supports C1) are provided separately from the first and second non-movable parts 200A, 200B, one of the first end portion of the first support C1 and the third end portion of the first non-movable part 200A is provided with a first engagement protrusion and the other is provided with a first engagement recess, one of the second end portion of the first support C1 and the third end portion of the second non-movable part 200B is provided with a second engagement protrusion and the other is provided with a second engagement recess, one of the first end portion of the second support C1 and the fourth end portion of the first non-movable part 200A is provided with a third engagement protrusion and the other is provided with a third engagement recess, one of the second end portion of the second support C1 and the fourth end portion of the second non-movable part 200B is provided with a fourth engagement protrusion and the other is provided with a fourth engagement recess. The first engagement protrusion fits in the first engagement recess, and the second engagement protrusion fits in the second engagement recess, so that the first end portion of the first support C1 is fixed to the third end portion of the first non-movable part 200A, and the second end portion of the first support C1 is fixed to the third end portion of the second non-movable part 200B. The third engagement protrusion fits in the third engagement recess, and the fourth engagement protrusion fits in the fourth engagement recess, so that the first end portion of the second support C1 is fixed to the fourth end portion of the first non-movable part 200A, and the second end portion of the second support C1 is fixed to the fourth end portion of the second non-movable part 200B. In this case, the first and second supports C1 and the first and second non-movable parts 200A, 200B form a clamp C having a substantially O-shape, and the first and second supports C1 support the first and second non-movable parts 200A, 200B so as to maintain the direct distance (shortest distance) in the Z-Z' direction from the first non-movable part 200A to the second non-movable part 200B at a predetermined distance (not illustrated). The first and second non-movable parts 200A, 200B of this clamp C are fixed to the first facing portion 411 of the first housing 410 and the second facing portion 421 of the second housing 420 in any of manners (5) to (8) described above.

The above-mentioned predetermined distance is defined as a direct distance (shortest distance) in the Z-Z' direction from the first non-movable part 200A to the second non-movable part 200B in a state before the first and second non-movable parts 200A, 200B are magnetically attracted in the Z and Z' directions, respectively, by the permanent magnet 310. The predetermined distance may be set in any manner and may be set as follows, for example.

Where the first and second non-movable parts 200A, 200B are fixed to the outer face 411$b$ of the first facing portion 411 of the first housing 410 and the outer face 421$b$ of the second facing portion 421 of the second housing 420 in manner (5) described above, the predetermined distance may be substantially equal to, slightly smaller than, or slightly larger than, the direct distance (shortest distance) in the Z-Z' direction from the outer face 411$b$ to the outer face 421$b$.

The first and second non-movable parts 200A, 200B are embedded in the inner portion 411$c$ of the first facing portion 411 of the first housing 410 and the inner portion 421$c$ of the second facing portion 421 of the second housing 420 in manner (7) described above, the predetermined distance may be substantially equal to, slightly smaller than, or slightly larger than, the direct distance (shortest distance) in the Z-Z' direction from an interface on the Z'-direction side between the inner portion 411$c$ and the first non-movable part 200A to an interface on the Z-direction side between the inner portion 421$c$ and the second non-movable part 200B.

Where the first non-movable part 200A is securely received in a first indentation 411$d$ of the first facing portion 411 of the first housing 410 and the second non-movable part 200B is securely received in a second indentation 421$d$ of the inner portion 421$c$ of the second facing portion 421 of the second housing 420 in manner (8) described above, the predetermined distance may be substantially equal to, slightly smaller than, or slightly larger than, the direct distance (shortest distance) in the Z-Z' direction from the bottom of the first indentation 411$d$ to the bottom of the second indentation 421$d$.

The actuator A2 and the vibration generator B2 described above provides the same technical features and effects as those of the actuator A1 and the vibration generator B1. Further, the actuator A2 and the vibration generator B2 are configured to maintain the direct distance (shortest distance) in the Z-Z' direction from the first non-movable part 200A to the second non-movable part 200B as before the permanent magnet 310 exerts the magnetic attraction force in the Z direction on the first non-movable part 200A, and exerts the magnetic attraction force in the Z' direction on the second non-movable part 200B (i.e., at the predetermined distance described above is maintained). The maintenance of the direct distance is not affected by the magnetic attraction forces in the Z and Z' directions of the permanent magnet 310 acting on the first and second non-movable parts 200A, 200B because the at least one support C1 is interposed between the first non-movable part 200A and the second non-movable part 200B in the X-X' direction in any of the aspects described above. This arrangement reduces the possibility that due to the magnetic attraction forces in the Z and Z' directions of the permanent magnet 310 acting on the first and second non-movable parts 200A, 200B, the direct distance (shortest distance) in the Z-Z' direction from the first non-movable part 200A to the second non-movable part 200B becomes smaller than the predetermined distance and thereby magnetic characteristics of the actuator A2 are affected. Also, where the first and second non-movable parts 200A, 200B of the clamp C hold therebetween the first and second housings 410 and 420 in the Z-Z' direction, this arrangement prevents or reduces the separation of the first and second housings 410 and 420 in the Z-Z' direction.

Third Embodiment

Hereinafter described is a vibration generator B3 according to a plurality of embodiments, including the third embodiment and modifications thereof, of the invention, with reference to FIGS. 12A to 16B. FIGS. 12A to 16B illustrate the vibration generator B3 of the third embodiment. The vibration generator B3 includes an electromagnetic actuator A3 (which may be referred to simply as an actuator A3). The actuator A3 includes a first coil 100A, a second coil 100B, a first non-movable part 200A', a second non-movable part 200B', and a movable part 300. FIGS. 13B to 16B show an X-X' direction, which is a moving direction of the movable part 300 and corresponds to a first direction. The X-X' direction includes an X direction, which corresponds to one side in the first direction, and an X' direction, which corresponds to the other side in the first direction. FIGS. 13A to 13B and 14A to 16B show a Z-Z' direction, which is substantially orthogonal to the X-X' direction and corresponds to a second direction. The Z-Z' direction includes a Z direction, which corresponds to one side in the second direction, and a Z' direction, which corresponds to the other side in the second direction. FIGS. 13A and 13C to 15B show a Y-Y' direction, which is substantially orthogonal to the X-X' and Z-Z' directions and corresponds to a third direction.

Each of the first and second non-movable parts 200A', 200B' is a plate extending in the X-X' direction and is constituted by a magnetic substance, such as soft iron (a yoke). The first non-movable part 200A' may have an opening 210A' extending therethrough in the Z-Z' direction, and the second non-movable part 200B' may have an opening 210B' extending therethrough in the Z-Z' direction. The openings 210A', 210B' of the first and second non-movable parts 200A', 200B' may be polygonal (e.g., rectangular as shown in FIGS. 12A to 16B), circular, or of any other shape. The openings 210A', 210B' of the first and second non-movable parts 200A', 200B' may be of the same shape or different shapes. The position in the X-X' and/or Y-Y' direction of the opening 210A' of the first non-movable part 200A' may be the same as, or different from, that of the opening 210B' of the second non-movable part 200B'. The first non-movable part 200A' further includes a first edge portion 211A' on the X-direction side of the opening 210A' and a second edge portion 212A' on the X'-direction side of the opening 210A'. The second non-movable part 200B' further includes a first edge portion 211B' on the X-direction side of the opening 210B' and a second edge portion 212B' on the X'-direction side of the opening 210B'. The first edge portion 211A' includes a first edge 211Aa' on the X-direction side of the opening 210A'. The second edge portion 212A' includes a second edge 212Aa' on the X'-direction side of the opening 210A'. The first edge portion 211B' includes a first edge 211Ba' on the X-direction side of the opening 210B'. The second edge portion 212B' includes a second edge 212Ba' on the X'-direction side of the opening 210B'.

The first non-movable part 200A' is disposed on the Z-direction side relative to the first coil 100A, and the second non-movable part 200B' is disposed on the Z'-direction side relative to the second coil 100B. There may or may not be a clearance between the first non-movable part 200A' and the first coil 100A. There may or may not be a clearance between the second non-movable part 200B' and the second coil 100B. Where there is no clearance, the first non-movable part 200A' may be fixed to the first coil 100A with an adhesive or other means, and the second non-movable part 200B' may be fixed to the second coil 100B with an adhesive or other means. The first non-movable part 200A' is disposed on the Z-direction side, and in spaced relation to, the movable part 300, and the distance from the first non-movable part 200A' to the movable part 300 is larger than the distance from the first non-movable part 200A' to the first coil 100A. The second non-movable part 200B' is disposed on the Z'-direction side, and in spaced relation to, the movable part 300, and the distance from the second non-movable part 200B' to the movable part 300 is larger than the distance from the second non-movable part 200B' to the second coil 100B. A first magnetic field is generated between the first non-movable part 200A' and the permanent magnet 310 of the movable part 300. A second magnetic field is generated between the second non-movable part 200B' and the permanent magnet 310 of the movable part 300.

Figure 13A:
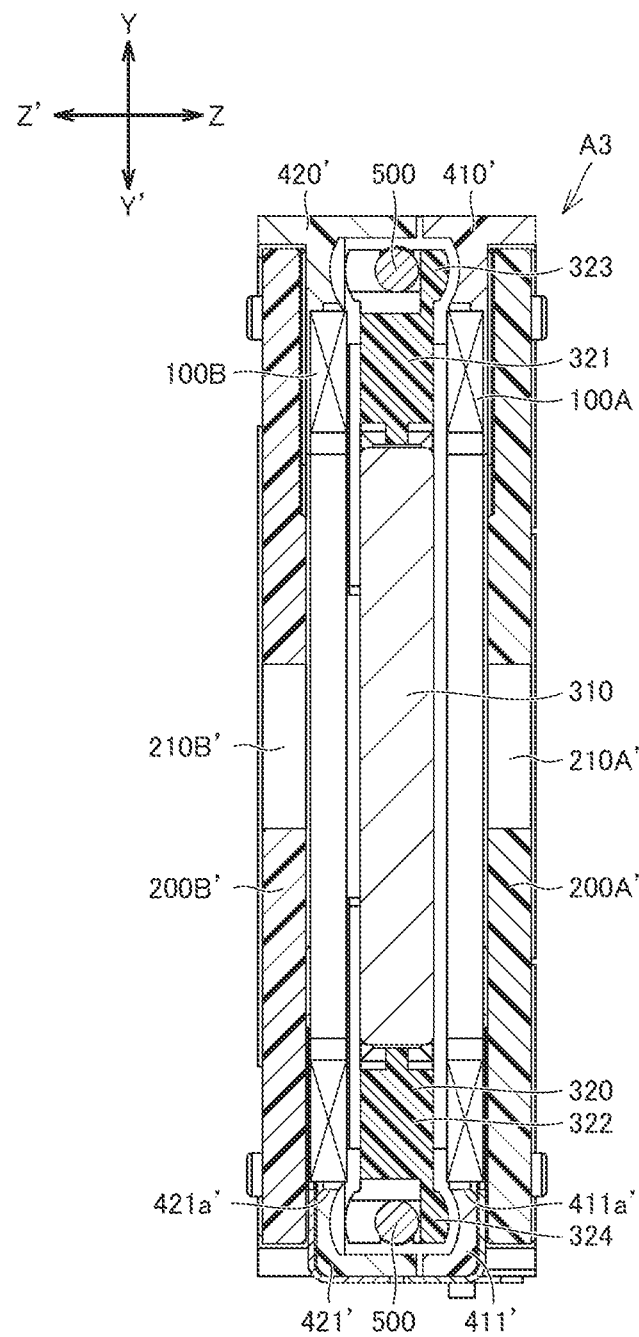
FIG. 13A is a cross-sectional view of the vibration generator of the third embodiment, taken along line 13A-13A in FIG. 12A, with a movable part of the vibration generator positioned at a neutral position.
Figure 13B:
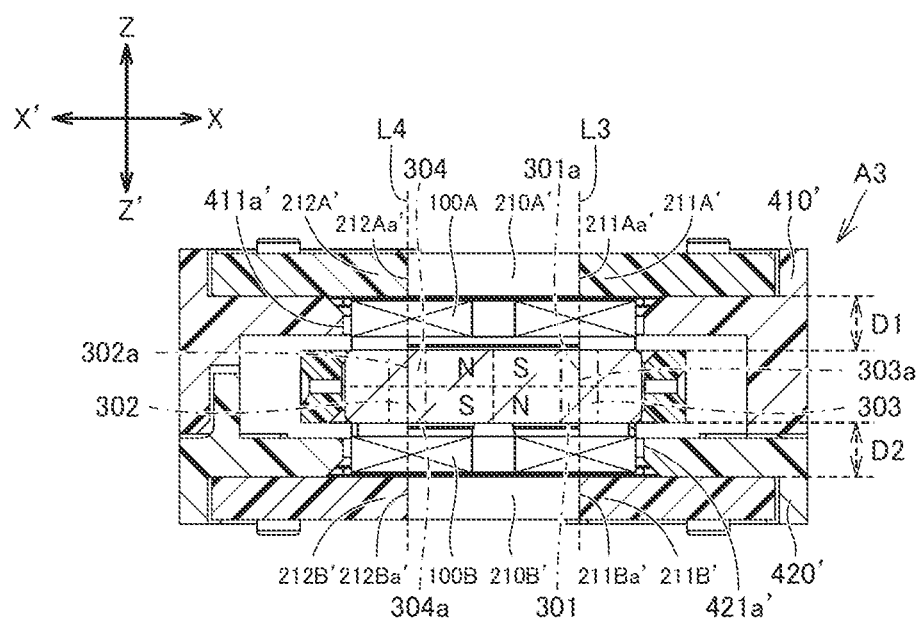
FIG. 13B is a cross-sectional view of the vibration generator of the third embodiment, taken along line 13B-13B in FIG. 12A, with the movable part of the vibration generator positioned at the neutral position.
Figure 13C:
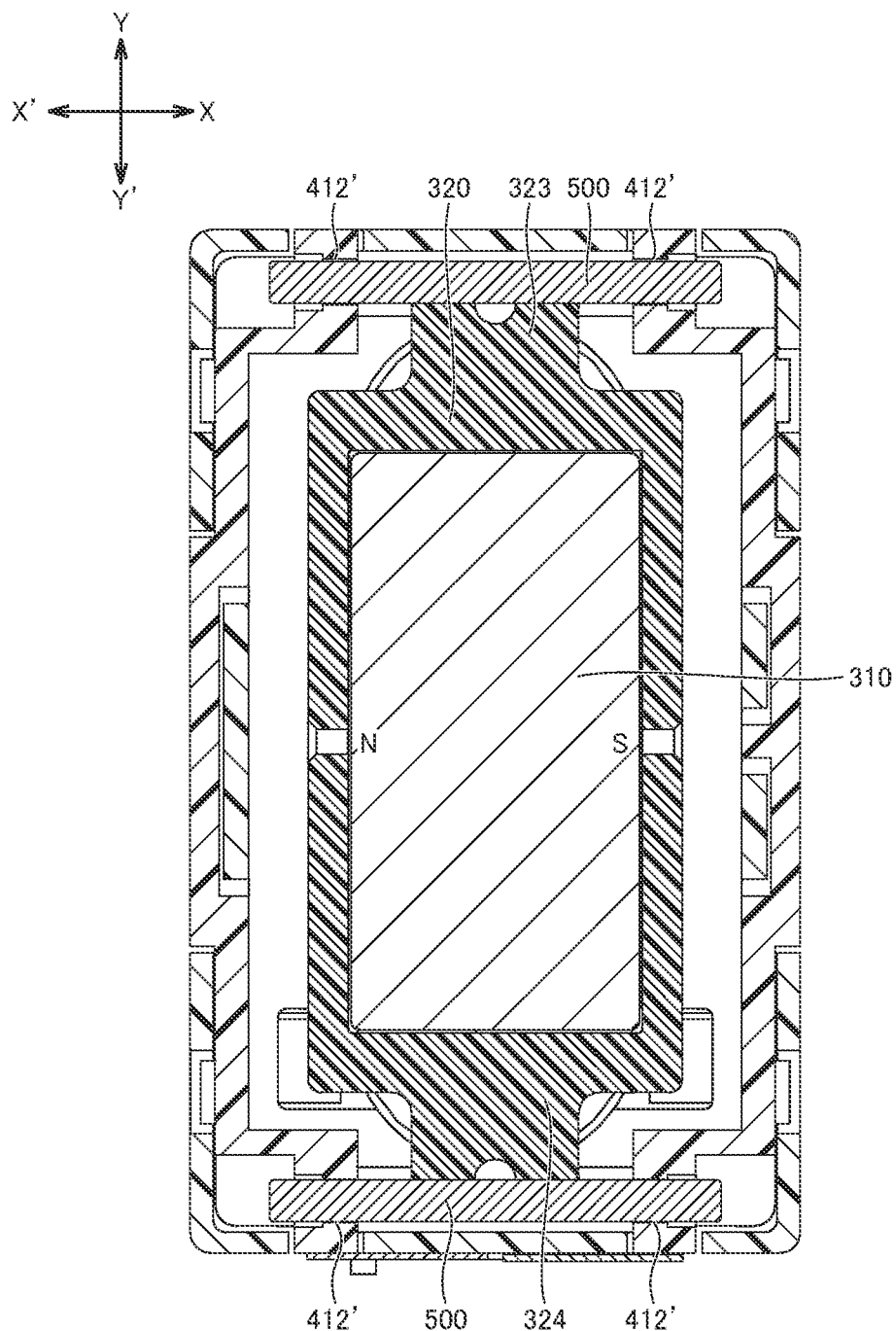
FIG. 13C is a cross-sectional view of the vibration generator of the third embodiment, taken along line 13C-13C in FIG. 12A, with the movable part of the vibration generator positioned at the neutral position.
Figure 14A:
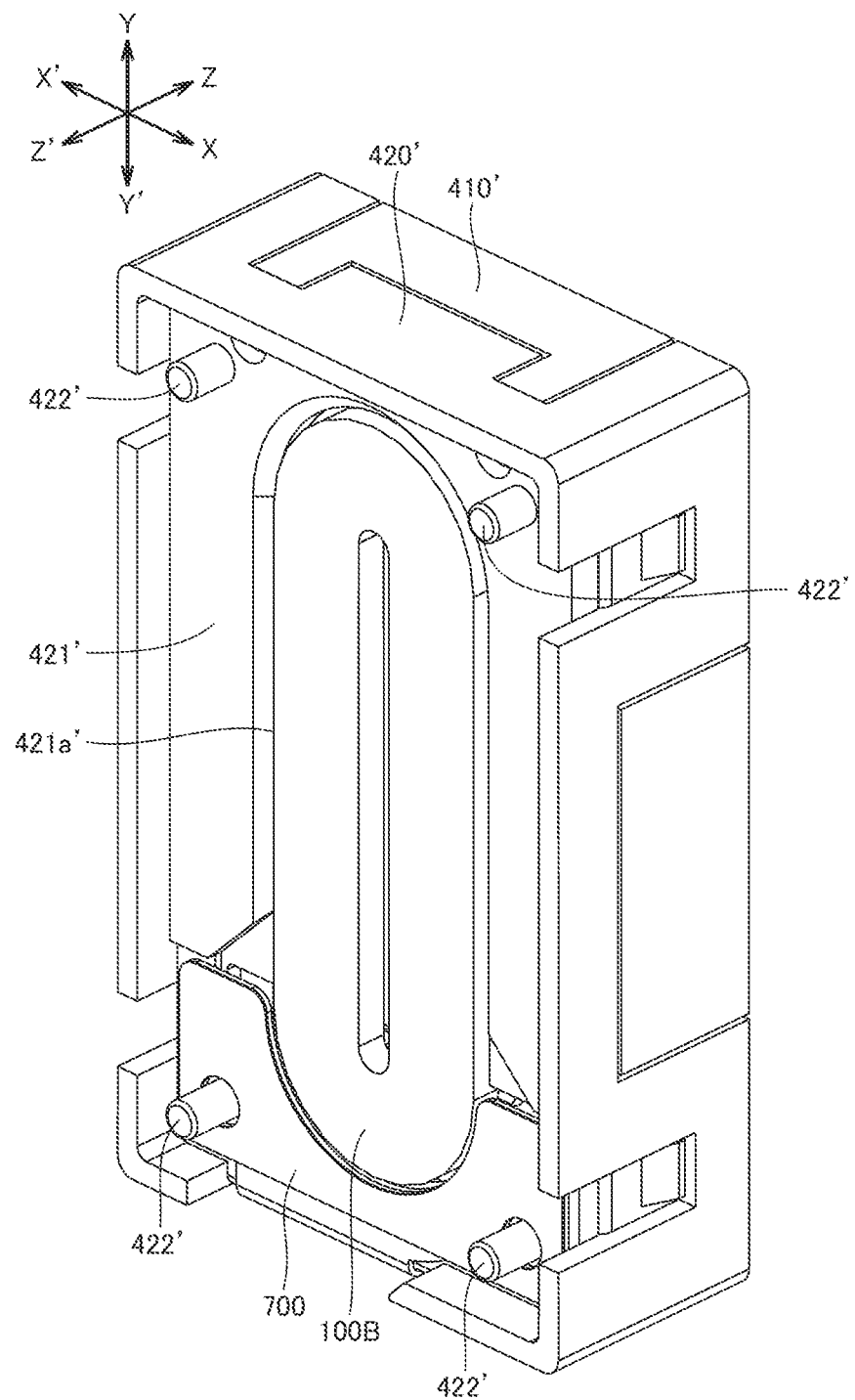
FIG. 14A is a front, top, right side perspective view of the vibration generator of the third embodiment, with a second non-movable part removed.
Figure 14B:
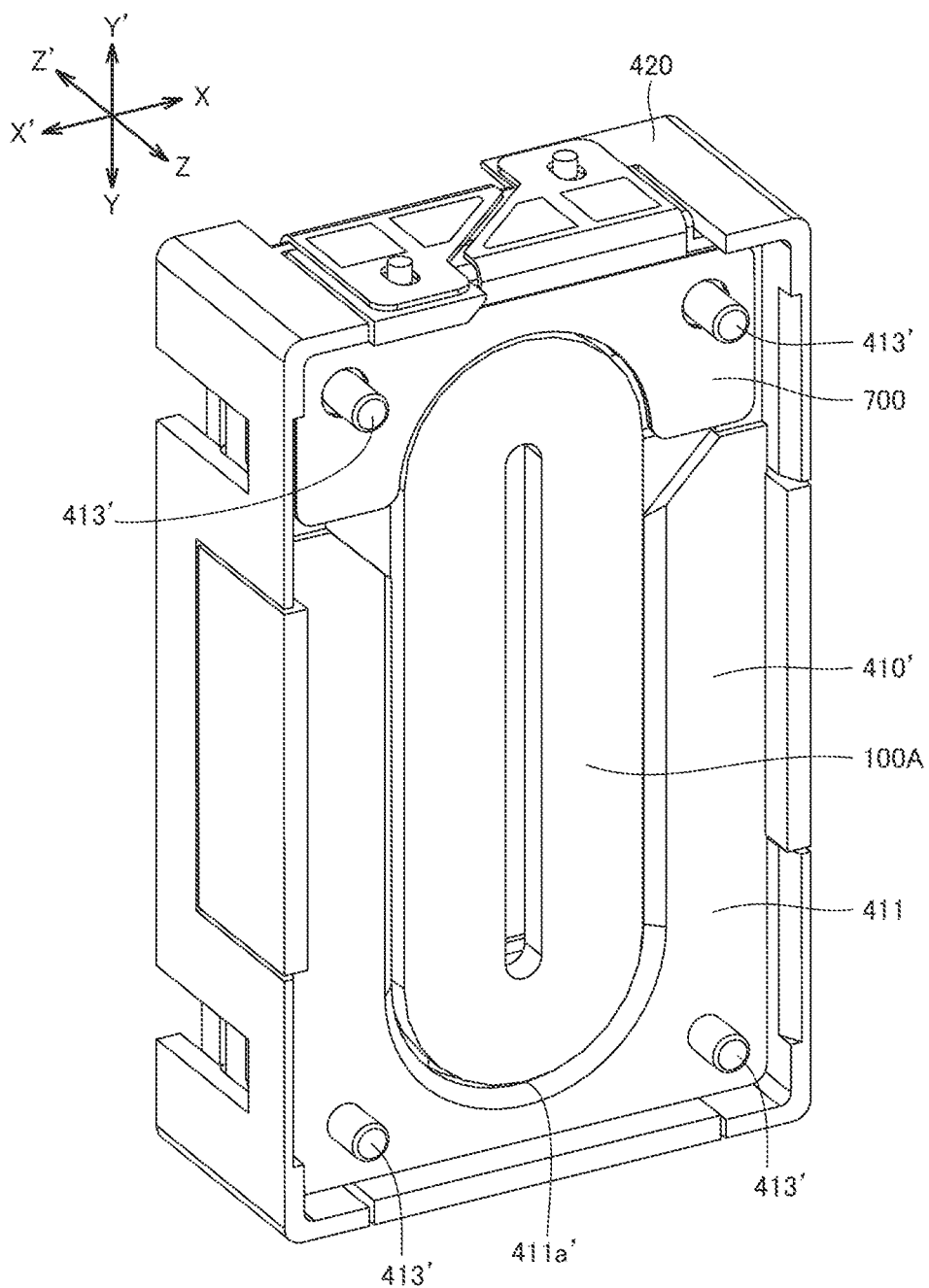
FIG. 14B is a rear, bottom, left side perspective view of the vibration generator of the third embodiment, with a first non-movable part and the second non-movable part removed.
Figure 14C:
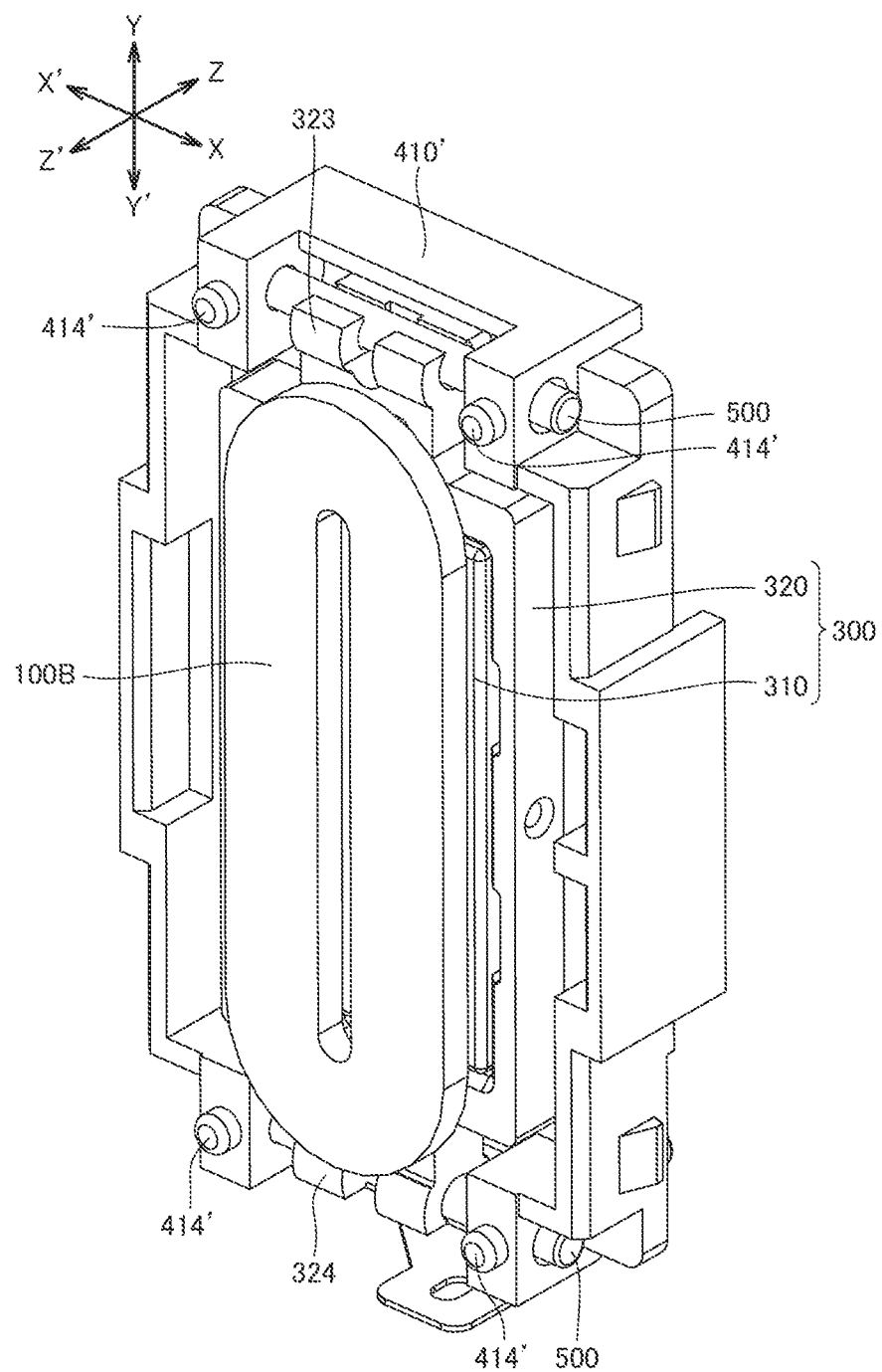
FIG. 14C is a front, top, right side perspective view of the vibration generator of the third embodiment, with the first and second non-movable parts and a second housing removed.
Figure 15A:
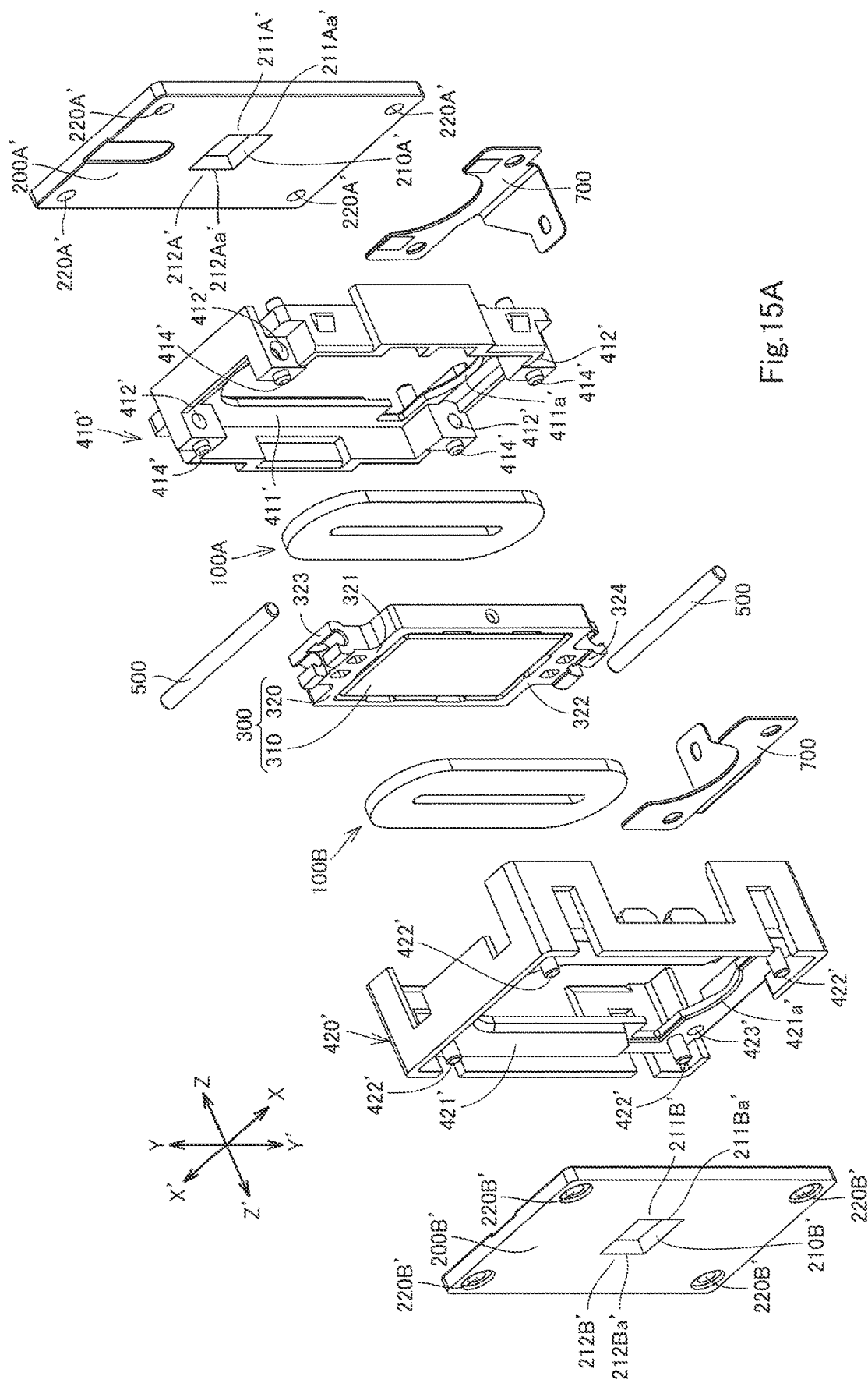
FIG. 15A is an exploded, front, top, right side perspective view of the vibration generator of the third embodiment.
Figure 15B:
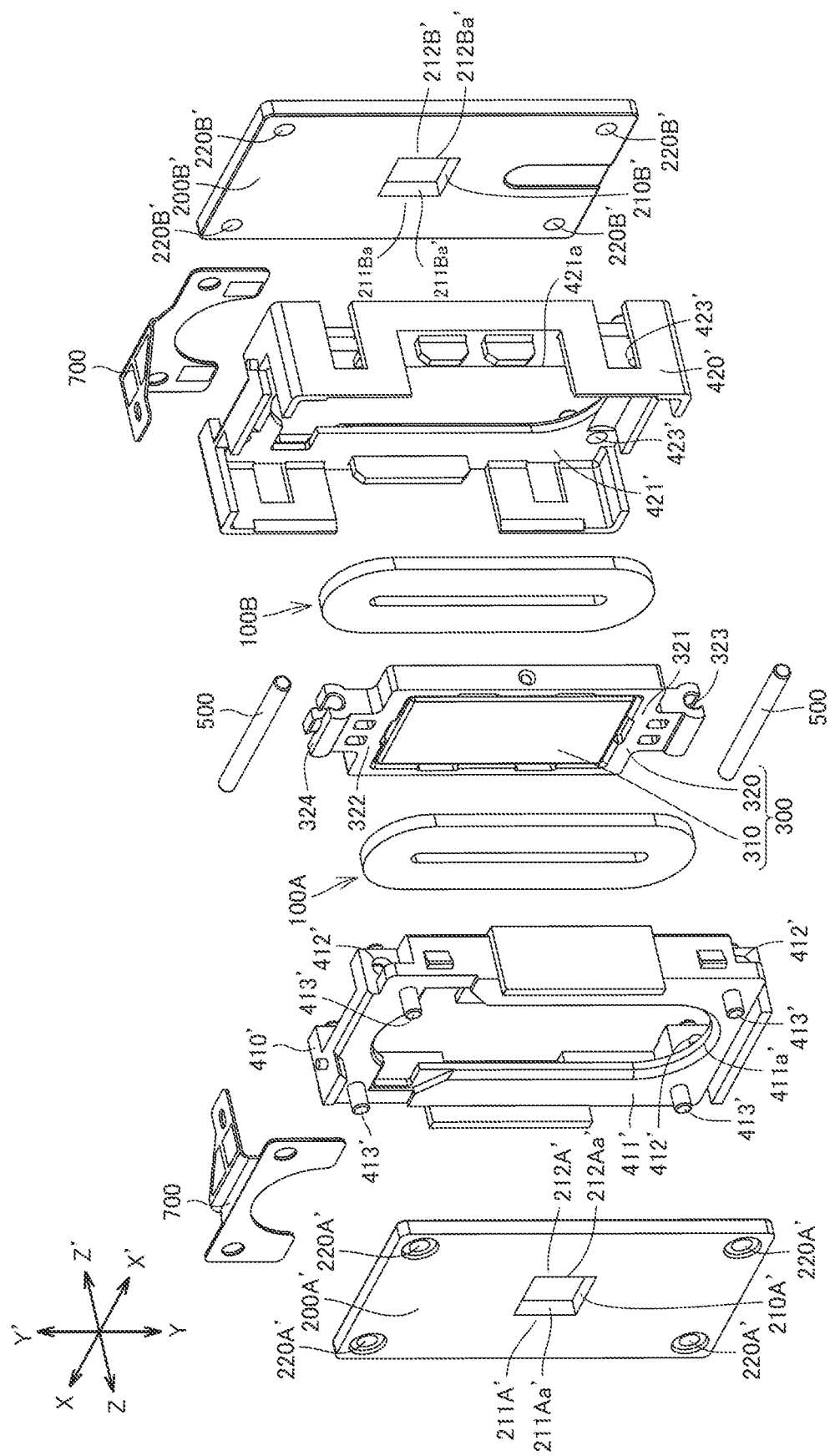
FIG. 15B is an exploded, rear, bottom, right side perspective view of the vibration generator of the third embodiment.

A first distance D1 in the Z-Z' direction from the first non-movable part 200A' to the permanent magnet 310 of the movable part 300 may be substantially equal to a second distance D2 in the Z-Z' direction from the second non-movable part 200B' to the permanent magnet 310 of the movable part 300 (see FIG. 13B). In this case, a magnetic attraction force to attract the permanent magnet 310 in the Z direction toward the first non-movable part 200A' is cancelled by a magnetic attraction force to attract the permanent magnet 310 in the Z' direction toward the second non-movable part 200B'. The first and second distances D1 and D2 may be different from each other.

The actuator A3 may further include the at least one support C1 of any of the above aspects. The at least one support C1 can be omitted.

The movable part 300 is disposed in the Z-Z' direction between, and in spaced relation to, the first coil 100A and the second coil 100B. The movable part 300 includes a permanent magnet 310 extending in the X-X' direction. The permanent magnet 310 is a plate or a column having a circular or polygonal section. The permanent magnet 310 includes a portion on the Z-direction side and a portion on the Z'-direction side. The permanent magnet 310 may be constituted by a single permanent magnet. In this case, the portion on the Z-direction side of the permanent magnet 310 is the half on the Z-direction side of the single permanent magnet, and the portion on the Z'-direction side of the permanent magnet 310 is the other half on the Z'-direction side of the single permanent magnet. Alternatively, the permanent magnet 310 may be constituted by two separate permanent magnets bonded together in the Z-Z' direction. In this case, the portion on the Z-direction side of the permanent magnet 310 is constituted by one of the two permanent magnets, and the portion on the Z'-direction side of the permanent magnet 310 is constituted by the other permanent magnet. In either case, the X- and X'-direction sides of the portion on the Z-direction side of the permanent magnet 310 are so magnetized as to form south and north poles, respectively; and the X- and X'-direction sides of the portion on the Z'-direction side of the permanent magnet 310 are so magnetized as to form the north and south poles, respectively. For the sake of convenience in description, the portions forming the south and north poles, respectively, of the portion on the Z-direction side of the permanent magnet 310 will be referred to as a first magnetic pole portion and a second magnetic pole portion, respectively; and the portions forming the north and south poles, respectively, of the portion on the Z'-direction side of the permanent magnet 310 will be referred to as a third magnetic pole portion and a fourth magnetic pole portion, respectively. The permanent magnet 310 may be modified such that the first and second magnetic pole portions form north and south poles, respectively, and the third and fourth magnetic pole portions form the south and north poles, respectively.

The permanent magnet 310 has a dimension in the X-X' direction that may or may not be substantially equal to, or larger than, that of each of the first coil 100A and the second coil 100B. The dimension in the X-X' direction of the permanent magnet 310 may be smaller than, substantially equal to, or larger than, that of each of the first and second non-movable parts 200A', 200B'.

The permanent magnet 310 is disposed in the Z-Z' direction between, and in spaced relation to, the first coil 100A and the second coil 100B. In other words, the permanent magnet 310 is disposed in spaced relation to the first coil 100A on the Z'-direction side, and in spaced relation to the second coil 100B on the Z-direction side.

Figure 16A:
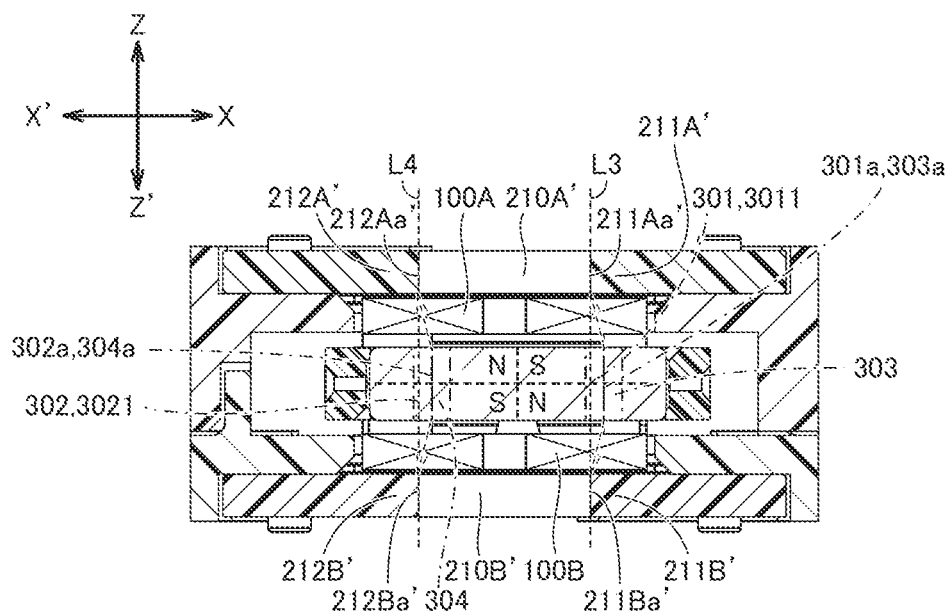
FIG. 16A is a cross-sectional view of the vibration generator of the third embodiment corresponding to FIG. 13B, with the movable part of the vibration generator positioned at a first position.

The movable part 300 is linearly movable at least between a neutral position (see FIGS. 13A to 13C) and a first position (see FIG. 16A). The first position is positioned on the X-direction side relative to the neutral position. The movable part 300 may be linearly movable between the first position and a second position (see FIG. 16B). The second position is positioned on the X'-direction side relative to the neutral position, and the neutral position is between the first and second positions in the X-X' direction. In this case, the movable part 300 passes through the neutral position in order to move from the first position to the second position, and from the second position to the first position. Hereinafter, for convenience in description, a "first movement aspect" refers to an aspect in which the movable part 300 moves between the first position and the second position, and a "second movement aspect" refers to an aspect in which the movable part 300 moves between the neutral position and the first position.

Figure 16B:
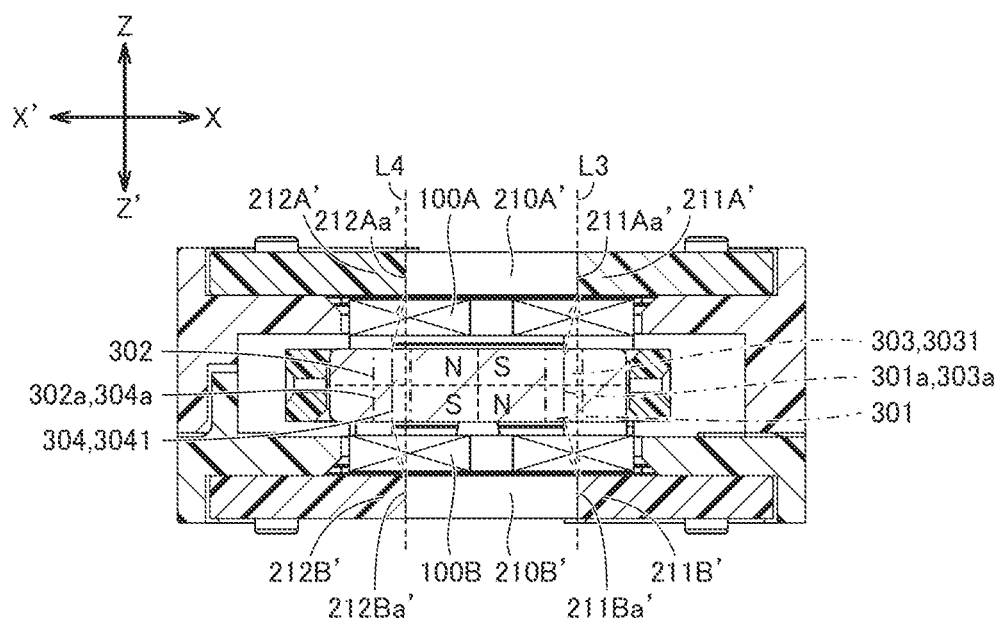
FIG. 16B is a cross-sectional view of the vibration generator of the third embodiment corresponding to FIG. 13B, with the movable part of the vibration generator positioned at a second position.

In the first movement aspect, the permanent magnet 310 includes a first portion 301, a second portion 302, a third portion 303, and a fourth portion 304, which are referred to with dash-dotted lines in FIGS. 13B and 16A to 16B. Each of the first portions 301 and the third portions 303 is provided in the first and third magnetic pole portions. Each of the second portions 302 and the fourth portions 304 is provided on the second and fourth magnetic pole portions.

In a state where the movable part 300 is positioned at the neutral position, the first portion 301 is a portion of the permanent magnet 310 that is positioned on the Z'-direction side relative to, and in spaced relation to, the opening 210A' of the first non-movable part 200A' and positioned on the Z-direction side relative to, and in spaced relation to, the opening 210B' of the second non-movable part 200B'. The first portion 301 includes an end 301a on the X-direction side, which substantially coincides, in the X-X' direction, with the first edge 211Aa' of the opening 210A' of the first non-movable part 200A' and the first edge 211Ba' of the opening 210B' of the second non-movable part 200B'. In other words, at the neutral position, the end 301a on the X-direction side of the first portion 301 is positioned along a third imaginary line L3 extending in the Z-Z' direction along the first edge 211Aa' of the opening 210A' of the first non-movable part 200A' and the first edge 211Ba' of the opening 210B' of the second non-movable part 200B'.

The second portion 302 is a portion of the permanent magnet 310 that is positioned on the X'-direction side relative to the first portion 301. In a state where the movable part 300 is positioned at the neutral position, the second portion 302 is positioned on the Z'-direction side relative to, and in spaced relation to, the second edge portion 212A' of the opening 210A' of the first non-movable part 200A' and positioned on the Z-direction side relative to, and in spaced relation to, the second edge portion 212B' of the opening 210B' of the second non-movable part 200B'. The second portion 302 includes an end 302a on the X-direction side, which substantially coincides, in the X-X' direction, with the second edge 212Aa' of the opening 210A' of the first non-movable part 200A' and the second edge 212Ba' of the opening 210B' of the second non-movable part 200B'. In other words, at the neutral position, the end 302a on the X-direction side of the second portion 302 is positioned along a fourth imaginary line L4 extending in the Z-Z' direction along the second edge 212Aa' of the opening 210A' of the first non-movable part 200A' and the second edge 212Ba' of the opening 210B' of the second non-movable part 200B'.

The third portion 303 is a portion of the permanent magnet 310 that is positioned next to, and on the X-direction side relative to, the first portion 301. In a state where the movable part 300 is positioned at the neutral position, the third portion 303 is positioned on the Z'-direction side relative to, and in spaced relation to, the first edge portion 211A' of the opening 210A' of the first non-movable part 200A' and positioned on the Z-direction side relative to, and in spaced relation to, the first edge 211B' of the opening 210B' of the second non-movable part 200B'. The third end 303 includes an end 303a on the X'-direction side, which substantially coincides, in the X-X' direction, with the first edge 211Aa' of the opening 210A' of the first non-movable part 200A' and the first edge 211Ba' of the opening 210B' of the second non-movable part 200B'. The end 303a on the X'-direction side of the third portion 303 overlaps the end 301a on the X-direction side of the first portion 301 (see FIGS. 13A and 13B). In other words, at the neutral position, the end 301a on the X-direction side of the first portion 301 and the end 303a on the X'-direction side of the third portion 303 are positioned along the third imaginary line L3.

The fourth portion 304 is a portion of the permanent magnet 310 that is positioned in the X-X' direction between the first portion 301 and the second portion 302, and positioned next to, and on the X-direction side relative to, the second portion 302 of the permanent magnet 310. In a state where the movable part 300 is positioned at the neutral position, the fourth portion 304 is positioned on the Z'-direction side relative to, and in spaced relation to, the opening 210A' of the first non-movable part 200A' and positioned on the Z-direction side relative to, and in spaced relation to, the opening 210B' of the second non-movable part 200B'. The fourth portion 304 includes an end 304a on the X'-direction side, which substantially coincides, in the X-X' direction, with the second edge 212Aa' of the opening 210A' of the first non-movable part 200A' and the second edge 212Ba' of the opening 210B' of the second non-movable part 200B'. The end 304a on the X'-direction side of the fourth portion 304 overlaps the end 302a on the X-direction side of the second portion 302 (see FIGS. 13A and 13B). In other words, at the neutral position, the end 302a on the X-direction side of the second portion 302 and the end 304a on the X'-direction side of the fourth portion 304 are positioned along the fourth imaginary line L4.

In the second movement aspect, the permanent magnet 310 includes the first portion 301 and the second portion 302 described above, with the third portion 303 and the fourth portion 304 omitted. In a state where the movable part 300 is positioned at the neutral position, the first portion 301 and the second portion 302 are positioned as described above.

It should be appreciated that the above-described end 301a on the X-direction side of the first portion 301 is not a physical end but just a portion of the permanent magnet 310 that substantially coincides, in the X-X' direction, with the first edge 211Aa' of the first non-movable part 200A' and the first edge 211Ba' of the second non-movable part 200B' at the neutral position; the above-described end 302a on the X-direction side of the second portion 302 is not a physical end but just a portion of the permanent magnet 310 that substantially coincides, in the X-X' direction, with the second edge 212Aa' of the first non-movable part 200A' and the second edge 212Ba' of the second non-movable part 200B' at the neutral position; the above-describe end 303a on the X'-direction side of the third portion 303 described above is not a physical end but just a portion of the permanent magnet 310 that substantially coincides, in the X-X' direction, with the first edge 211Aa' of the first non-movable part 200A' and the first edge 211Ba' of the second non-movable part 200B' at the neutral position; and the above-describe end 304a on the X'-direction side of the fourth portion 304 is not a physical end but just a portion of the permanent magnet 310 that substantially coincides, in the X-X' direction, with the second edge 212Aa' of the first non-movable part 200A' and the second edge 212Ba' of the second non-movable part 200B' at the neutral position.

As the movable part 300 moves in the X direction from the neutral position, the first portion 301 of the permanent magnet 310 moves in the X direction past the first edges 211Aa', 211Ba' of the openings 210A', 210B' of the first and second non-movable parts 200A', 200B' (i.e., past the third imaginary line L3). Accordingly, a portion (which may be referred to as a first enlarging portion 3011) of the first portion 301 of the permanent magnet 310 that is positioned on the X-direction side relative to the first edges 211Aa', 211Ba' of the first and second non-movable parts 200A', 200B' (i.e., relative to the third imaginary line L3) gradually enlarges. In a state where the movable part 300 is positioned at the neutral position, the first portion 301 of the permanent magnet 310 has no first enlarging portion 3011 (see FIG. 13B). On the other hand, in a state where the movable part 300 has moved from the neutral position to the first position, the first enlarging portion 3011 of the permanent magnet 310 becomes the largest (see FIG. 16A).

In a state where the first enlarging portion 3011 has occurred in the first portion 301 of the permanent magnet 310, the first enlarging portion 3011 is magnetically attracted toward the first edge 211Aa' of the first non-movable part 200A', in a diagonal direction including components of the X' and Z directions (this diagonal direction may be referred to as an X'Z direction), and is also magnetically attracted toward the first edge 211Ba' of the second non-movable part 200B', in a diagonal direction including components of the X' and Z' directions (this diagonal direction may be referred to as an X'Z' direction). For convenience in description, the former magnetic attraction force in the X'Z direction may be referred to as a first magnetic attraction force, and the latter magnetic attraction force in the X'Z' direction may be referred to as a second magnetic attraction force. The first enlarging portion 3011 thus magnetically attracts the first edge 211Aa' of the first non-movable part 200A' and the first edge 211Ba' of the second non-movable part 200B'. Since the first and second non-movable parts 200A', 200B' are fixed in position in a manner to be described, the magnetic attraction forces in the X' direction included in the first and second magnetic attraction forces exerted by the first enlarging portion 3011 of the permanent magnet 310 act as forces to move the movable part 300 relatively in the X' direction relative to the first and second non-movable parts 200A', 200B'. In a state where the movable part 300 is positioned at the neutral position, the permanent magnet 310 has no first enlarging portion 3011, and therefore the first and second magnetic attraction forces will not be generated. On the other hand, as the first enlarging portion 3011 of the permanent magnet 310 enlarges, the first and second magnetic attraction forces become stronger, and become the strongest in a state where the movable part 300 has moved to the first position.

As the movable part 300 moves in the X direction from the neutral position, the second portion 302 of the permanent magnet 310 moves in the X direction past the second edges 212Aa', 212Ba' of the openings 210A', 210B' of the first and second non-movable parts 200A', 200B' (i.e., past the fourth imaginary line L4). Accordingly, a portion (which may be referred to as a second enlarging portion 3021) of the second portion 302 of the permanent magnet 310 that is positioned on the X-direction side relative to the second edges 212Aa', 212Ba' of the first and second non-movable parts 200A', 200B' (i.e., relative to the fourth imaginary line L4) gradually enlarges. In a state where the movable part 300 is positioned at the neutral position, the second portion 302 of the permanent magnet 310 has no second enlarging portion 3021 (see FIG. 13B). On the other hand, in a state where the movable part 300 has moved from the neutral position to the first position, the second enlarging portion 3021 of the permanent magnet 310 becomes the largest (see FIG. 16B).

In a state where the second enlarging portion 3021 has occurred in the second portion 302 of the permanent magnet 310, the second enlarging portion 3021 is magnetically attracted toward the second edge 212Aa' of the first non-movable part 200A' in the X'Z direction, and is also magnetically attracted toward the second edge 212Ba' of the second non-movable part 200B' in the X'Z' direction. For convenience in description, the former magnetic attraction force in the X'Z direction may be referred to as a third magnetic attraction force, and the latter magnetic attraction force in the X'Z' direction may be referred to as a fourth magnetic attraction force. The second enlarging portion 3021 thus magnetically attracts the second edge 212Aa' of the first non-movable part 200A' and the second edge 212Ba' of the second non-movable part 200B'. Since the first and second non-movable parts 200A', 200B' are fixed in position in a manner to be described, the magnetic attraction forces in the X' direction included in the third and fourth magnetic attraction forces exerted by the second enlarging portion 3021 of the permanent magnet 310 act as forces to move the movable part 300 relatively in the X' direction relative to the first and second non-movable parts 200A', 200B'. In a state where the movable part 300 is positioned at the neutral position, the permanent magnet 310 has no second enlarging portion 3021, and therefore the third and fourth magnetic attraction forces will not be generated. On the other hand, as the second enlarging portion 3021 of the permanent magnet 310 enlarges, the third and fourth magnetic attraction forces become stronger, and become the strongest in a state where the movable part 300 has moved to the first position.

Suppose, in a state where the movable part 300 has moved to the first position, the first portion 301 of the permanent magnet 310 is positioned on the Z'-direction side, and in spaced relation to, the first edge portion 211A' of the first non-movable part 200A' and positioned on the Z-direction side, and in spaced relation to, the first edge portion 211B' of the opening 210B' of the second non-movable part 200B', the first enlarging portion 3011 of the first portion 301 of the permanent magnet 310 is not magnetically attracted in the X'Z direction toward the first edge 211Aa' of the first non-movable part 200A' nor in the X'Z' direction toward the first edge 211Ba' of the second non-movable part 200B', but instead the second magnetic pole portion of the permanent magnet 310 of the movable part 300 approaches, and is magnetically attracted in the XZ direction toward, the first edge 211aA' of the first non-movable part 200A', and the fourth magnetic pole portion of the permanent magnet 310 of the movable part 300 approaches, and is magnetically attracted in the XZ' direction toward, the first edge 211Ba' of the second non-movable part 200B'. In this case, the magnetic attraction force in the XZ direction of the second magnetic pole portion of the permanent magnet 310 of the movable part 300 and the magnetic attraction force in the XZ' direction of the fourth magnetic pole portion of the permanent magnet 310 of the movable part 300 would be balanced with the magnetic attraction force in the X'Z direction of the first enlarging portion 3011 of the first portion 301 of the permanent magnet 310 and the magnetic attraction force in the X'Z' direction of the second enlarging portion 3021 of the second portion 302 of the permanent magnet 310, resulting in that the neutral position of the movable part 300 would shift. In view of this, the first position of the movable part 300 should be a position at which the second magnetic pole portion of the permanent magnet 310 of the movable part 300 will not be magnetically attracted in the XZ direction toward the first edge 211Aa' of the first non-movable part 200A' and the fourth magnetic pole portion of the permanent magnet 310 of the movable part 300 will not be magnetically attracted in the XZ' direction toward the first edge 211Ba' of the second non-movable part 200B'. For this purpose, it is possible to adjust the dimensions in the X-X' direction of the openings 210A', 210B, the distance from the second magnetic pole portion of the permanent magnet 310 at the first position to the first edge 211Aa' of the first non-movable part 200A', and the distance from the fourth magnetic pole portion of the permanent magnet 310 at the first position to the first edge 211Ba' of the second non-movable part 200B'.

Where the permanent magnet 310 is provided with the third portion 303, as the movable part 300 moves in the X' direction from the neutral position, the third portion 303 of the permanent magnet 310 moves in the X' direction past the first edges 211Aa', 211Ba' of the openings 210A', 210B' of the first and second non-movable parts 200A', 200B' (i.e., past the third imaginary line L3). Accordingly, a portion (which may be referred to as a third enlarging portion 3031) of the third portion 303 of the permanent magnet 310 that is positioned on the X'-direction side relative to the first edges 211Aa', 211Ba' of the first and second non-movable parts 200A', 200B' (i.e., relative to the third imaginary line L3) gradually enlarges. In a state where the movable part 300 is positioned at the neutral position, the third portion 303 of the permanent magnet 310 has no third enlarging portion 3031 (see FIG. 13B). On the other hand, in a state where the movable part 300 has moved from the neutral position to the second position, the third enlarging portion 3031 of the permanent magnet 310 becomes the largest (see FIG. 16B).

In a state where the third enlarging portion 3031 has occurred in the third portion 303 of the permanent magnet 310, the third enlarging portion 3031 is magnetically attracted toward the first edge 211Aa' of the first non-movable part 200A' in a diagonal direction including components of the X and Z directions (this diagonal direction may be referred to as an XZ direction), and is also magnetically attracted toward the first edge 211Ba' of the second non-movable part 200B', in a diagonal direction including components of the X and Z' directions (this diagonal direction may be referred to as an XZ' direction). For convenience in description, the former magnetic attraction force in the XZ direction may be referred to as a fifth magnetic attraction force, and the latter magnetic attraction force in the XZ' direction may be referred to as a sixth magnetic attraction force. The third enlarging portion 3031 thus magnetically attracts the first edge 211Aa' of the first non-movable part 200A' and the first edge 211Ba' of the second non-movable part 200B'. Since the first and second non-movable parts 200A', 200B' are fixed in position in a manner to be described, the magnetic attraction forces in the X direction included in the fifth and sixth magnetic attraction forces exerted by the third enlarging portion 3031 of the permanent magnet 310 act as forces to move the movable part 300 relatively in the X direction relative to the first and second non-movable parts 200A', 200B'. In a state where the movable part 300 is positioned at the neutral position, the permanent magnet 310 has no third enlarging portion 3031, and therefore the fifth and sixth magnetic attraction forces will not be generated. On the other hand, as the third enlarging portion 3031 of the permanent magnet 310 enlarges, the fifth and sixth magnetic attraction forces become stronger, and become the strongest in a state where the movable part 300 has moved to the second position.

Where the permanent magnet 310 is provided with the fourth portion 304 of the permanent magnet 310, as the movable part 300 moves in the X' direction from the neutral position, the fourth portion 304 of the permanent magnet 310 moves in the X' direction past the second edges 212Aa', 212Ba' of the openings 210A', 210B' of the first and second non-movable parts 200A', 200B' (i.e., past fourth imaginary line L4). Accordingly, a portion (which may be referred to as a fourth enlarging portion 3041) of the fourth portion 304 of the permanent magnet 310 that is positioned on the X'-direction side relative to the second edges 212Aa', 212Ba' of the first and second non-movable parts 200A', 200B' (i.e., relative to the fourth imaginary line L4) gradually enlarges. In a state where the movable part 300 is positioned at the neutral position, the fourth portion 304 of the permanent magnet 310 has no fourth enlarging portion 3041 (see FIG. 13B). On the other hand, in a state where the movable part 300 has moved from the neutral position to the second position, the fourth enlarging portion 3041 of the permanent magnet 310 becomes the largest (see FIG. 16B).

In a state where the fourth enlarging portion 3041 has occurred in the fourth portion 304 of the permanent magnet 310, the fourth enlarging portion 3041 is magnetically attracted in the XZ direction toward the second edge 212Aa' of the first non-movable part 200A', and also magnetically attracted in the XZ' direction toward the second edge 212Ba' of the second non-movable part 200B'. For convenience in description, the former magnetic attraction force in the XZ direction may be referred to as a seventh magnetic attraction force, and the latter magnetic attraction force in the XZ' direction may be referred to as an eighth magnetic attraction force. The fourth enlarging portion 3041 thus magnetically attracts the second edge 212Aa' of the first non-movable part 200A' and the second edge 212Ba' of the second non-movable part 200B'. Since the first and second non-movable parts 200A', 200B' are fixed in position in a manner to be described, the magnetic attraction forces in the X direction of the seventh and eighth magnetic attraction forces exerted by the fourth enlarging portion 3041 of the permanent magnet 310 act as forces to move the movable part 300 relatively in the X direction relative to the first and second non-movable parts 200A', 200B'. In a state where the movable part 300 is positioned at the neutral position, the permanent magnet 310 has no fourth enlarging portion 3041, and therefore the seventh and eighth magnetic attraction forces will not be generated. On the other hand, as the fourth enlarging portion 3041 of the permanent magnet 310 enlarges, the seventh and eighth magnetic attraction forces become stronger, and become the strongest in a state where the movable part 300 has moved to the second position.

Suppose, in a state where the movable part 300 has moved to the second position, the fourth portion 304 of the permanent magnet 310 is positioned on the Z'-direction side, and in spaced relation to, the second edge portion 212A' of the first non-movable part 200A' and positioned on the Z-direction side, and in spaced relation to, the second edge portion 212B' of the opening 210B' of the second non-movable part 200B', the fourth enlarging portion 3041 of the fourth portion 304 of the permanent magnet 310 is not magnetically attracted in the XZ direction toward the second edge 212Aa' of the first non-movable part 200A' nor in the XZ' direction toward the second edge 212Ba' of the second non-movable part 200B', but instead the first magnetic pole portion of the permanent magnet 310 of the movable part 300 approaches, and is magnetically attracted in the X'Z direction toward, the second edge 212Aa' of the first non-movable part 200A', and the third magnetic pole portion of the permanent magnet 310 of the movable part 300 approaches, and is magnetically attracted in the X'Z' direction toward, the second edge 212Ba' of the second non-movable part 200B'. In this case, the magnetic attraction force in the X'Z direction of the first magnetic pole portion of the permanent magnet 310 of the movable part 300 and the magnetic attraction force in the X'Z' direction of the third magnetic pole portion of the permanent magnet 310 of the movable part 300 would be balanced with the magnetic attraction force in the XZ direction of the third enlarging portion 3031 of the third portion 303 of the permanent magnet 310 and the magnetic attraction force in the XZ' direction of the fourth enlarging portion 3041 of the fourth portion 304 of the permanent magnet 310, resulting in that the neutral position of the movable part 300 would shift. In view of this, the second position of the movable part 300 should be a position at which the first magnetic pole portion of the permanent magnet 310 of the movable part 300 will not be magnetically attracted in the X'Z direction toward the second edge 212Aa' of the first non-movable part 200A' and the third magnetic pole portion of the permanent magnet 310 of the movable part 300 will not be magnetically attracted in the X'Z' direction toward the second edge 212Ba' of the second non-movable part 200B'. For this purpose, it is possible to adjust the dimensions of the openings 210A', 210B' in the X-X' direction, the distance from the first magnetic pole portion of the permanent magnet 310 at the second position to the second edge 212Aa' of the first non-movable part 200A', and the distance from the third magnetic pole portion of the permanent magnet 310 at the second position to the second edge 212Ba' of the second non-movable part 200B'.

In the first movement aspect, the movable part 300 and the first and second non-movable parts 200A', 200B' may further have configuration (A) or (B) above and configuration (C) or (D) above. In the second movement aspect, the movable part 300 and the first and second non-movable parts 200A', 200B' may further have configuration (A) or (B) above.

The movable part 300 may further include a holder 320. The holder 320 is constituted by a non-magnetic substance, such as synthetic resin, and holds the permanent magnet 310. For example, the holder 320 may be an annular body (see FIGS. 13B to 15B) fitting around the permanent magnet 310, a block of any shape with the permanent magnet 310 insert-molded therein, or a box housing the permanent magnet 310. The holder 320 includes a first end portion 321 on the Y-direction side and a second end portion 322 on the Y'-direction. The holder 320 can be omitted.

The first coil 100A is disposed in the Z-Z' direction between the movable part 300 and the first non-movable part 200A'. The first coil 100A is, for example, a spiral coil disposed in the first magnetic field between the permanent magnet 310 of the movable part 300 and the first non-movable part 200A' such that the wire of the first coil 100A traverses the first magnetic field. The second coil 100B is disposed in the Z-Z' direction between the permanent magnet 310 of the movable part 300 and the second non-movable part 200B'. The second coil 100B is, for example, a spiral coil disposed in the second magnetic field between the movable part 300 and the second non-movable part 200B' such that the wire of the second coil 100B traverses the second magnetic field. The first coil 100A and the second coil 100B may be wound in a same direction, or in opposite directions.

The first coil 100A and the second coil 100B is electrically connected to first and second oscillation circuits, respectively, provided externally of the vibration generator B3. The first and second oscillation circuits may be provided in the actuator A3 of the vibration generator B3, rather than externally of the vibration generator B3. In this case, the first and second oscillation circuits may be mounted on a circuit board (not illustrated) of the actuator A3. The first and second oscillation circuits of either aspect is configured to apply square-wave or sine-wave currents in the same direction to the first coil 100A and the second coil 100B, respectively.

In the first movement aspect, the current applied to the first coil 100A is reversed in polarity repeatedly at predetermined intervals, and the current applied to the second coil 100B is reversed in polarity repeatedly at predetermined intervals. The application of a current to the first coil 100A alternately generates a first driving force (Lorentz force) to move the permanent magnet 310 in the X direction and a third driving force (Lorentz force) to move the permanent magnet 310 in the X' direction. Specifically, the first driving force (Lorentz force) to move the permanent magnet 310 in the X direction and the third driving force (Lorentz force) to move the permanent magnet 310 in the X' direction are alternately generated by an electromagnetic interaction between the first magnetic field and the current flowing through the first coil 100A such as to traverse the first magnetic field. The application of a current to the second coil 100B alternately generates a second driving force (Lorentz force) to move the permanent magnet 310 in the X direction and a fourth driving force (Lorentz force) to move the permanent magnet 310 in the X' direction. Specifically, the second driving force (Lorentz force) to move the permanent magnet 310 in the X direction and the fourth driving force (Lorentz force) to move the permanent magnet 310 in the X' direction are alternately generated by an electromagnetic interaction between the second magnetic field and the current flowing through the second coil 100B such as to traverse the second magnetic field. The first and second driving forces and the third and fourth driving forces alternately generated causes the movable part 300 to alternately repeats a relative and linear movement from the second position to the first position and a relative and linear movement from the first position to the second position, relative to the first coil 100A, the second coil 100B, the first non-movable part 200A', and the second non-movable part 200B'. Such alternately repeated linear movements of the movable part 300, from the second position to the first position and vice versa, result in generation of vibration.

The sum of the first and second driving forces (i.e., the total driving force to move the movable part 300 in the X direction) is larger than the sum of the magnetic attraction force in the X' direction included in the largest first magnetic attraction force, and the magnetic attraction force in the X' direction included in the largest second magnetic attraction force, the magnetic attraction force in the X' direction included in the largest third magnetic attraction force, and the magnetic attraction force in the X' direction included in the largest fourth magnetic attraction force (i.e., the total magnetic attraction force to move the movable part 300 in the X' direction). Therefore, the first and second driving forces move the movable part 300 linearly from the second position to the first position, against the sum force of the above-described four magnetic attraction forces in the X' direction. The sum of the third and fourth driving forces (i.e., the total driving force to move the movable part 300 in the X' direction) is larger than the sum of the magnetic attraction force in the X direction included in the largest fifth magnetic attraction force, the magnetic attraction force in the X direction included in the largest sixth magnetic attraction force, the magnetic attraction force in the X direction included in the largest seventh magnetic attraction force, and the magnetic attraction force in the X direction included in the largest eighth magnetic attraction force (i.e., the total magnetic attraction force to move the movable part 300 in the X direction). Therefore, the third and fourth driving forces move the movable part 300 linearly from the first position to the second position, against the sum force of the above-described four magnetic attraction forces in the X direction. In the movement of the movable part 300 from the first position to the second position, during the movement of the movable part 300 from the first position to the neutral position, the first portion 301 of the movable part 300 is biased by the first and second magnetic attraction forces, and the second portion 302 of the movable part 300 is biased by the third and fourth magnetic attraction forces. In the movement of the movable part 300 from the second position to the first position, during the movement of the movable part 300 from the second position to the neutral position, the third portion 303 of the movable part 300 is biased by the fifth and sixth magnetic attraction forces, and the fourth portion 304 of the movable part 300 is biased by the seventh and eighth magnetic attraction forces.

On the other hand, in the second movement aspect, the current to be applied to the first coil 100A is of either a positive polarity or negative polarity, and the current to be applied to the second coil 100B is of either a positive or negative polarity. A current of either a positive or negative polarity is intermittently applied to the first coil 100A and the second coil 100B. The application of a current to the first coil 100A intermittently generates a first driving force (Lorentz force) to move the permanent magnet 310 in the X direction. Specifically, the first driving force (Lorentz force) to move the permanent magnet 310 in the X direction is intermittently generated by an electromagnetic interaction between the first magnetic field and the current flowing through the first coil 100A such as to traverse the first magnetic field. The application of a current to the second coil 100B intermittently generates a second driving force (Lorentz force) to move the permanent magnet 310 in the X direction. Specifically, the second driving force (Lorentz force) to move the permanent magnet 310 in the X direction is intermittently generated by an electromagnetic interaction between the second magnetic field and the current flowing through the second coil 100B such as to traverse the second magnetic field. The first and second driving forces causes the movable part 300 to intermittently move relatively and linearly from the neutral position to the first position, relative to the first coil 100A, the second coil 100B, the first non-movable part 200A', and the second non-movable part 200B'. While the application of the currents to the first coil 100A and the second coil 100B is intermittently paused, the first to fourth magnetic attraction forces bias the permanent magnet 310 of the movable part 300 to intermittently move from the first position toward the neutral position. In short, the movable part 300 alternately repeats the linear movement in the X direction from the neutral position to the first position, caused by the first to fourth driving forces, and the linear movement from the first position to the neutral position, caused by the first and second magnetic attraction forces, so that vibration is generated.

The actuator A3 may further include a housing 400'. The housing 400' includes a first housing 410' and a second housing 420'. The first housing 410' and the second housing 420' are each constituted by a non-magnetic substance, such as synthetic resin. The first housing 410' may be provided with an accommodation recess. With the first housing 410' combined with the second housing 420', the accommodation recess is closed by the second housing 420' to form an accommodation space of the housing 400'. Alternatively, the first housing 410' and the second housing 420' are each provided with an accommodation recess. With the first housing 410' combined with the second housing 420', the accommodation recesses of the first housing 410' and the second housing 420' in combination form an accommodation space of the housing 400'. In either case, the accommodation space of the housing 400' accommodates at least the movable part 300 such that the movable part 300 is movable in the first or second movement aspect. The first housing 410' and the second housing 420' may be, but is not required to be, configured as shown in FIGS. 12A to 15B. More particularly, the first housing 410' may be provided with a plurality of engagement protrusions 414' protruding in the Z' direction, the second housing 420' may be provided with a plurality of engagement holes 423', the engagement protrusions 414' may fit in the corresponding engagement holes 423', so that the first housing 410' may be combined to the second housing 420'. Alternatively, the first housing 410' may be provided with a plurality of engagement holes 423', and the second housing 420' may be provided with a plurality of engagement protrusions 414' protruding in the Z direction.

The first housing 410' may include walls on the X- and X'-direction sides of the accommodation recess. Each of the walls on the X- and X'-direction sides include a portion on the Y-direction side and a portion on the Y'-direction side.

The first housing 410' includes a first wall 411' positioned on the Z-direction side relative to the movable part 300 inside the accommodation space. The second housing 420' includes a second wall 421' positioned on the Z'-direction side relative to the movable part 300 inside the accommodation space. The first wall 411' may be a bottom of the accommodation recess of the first housing 410'. The first wall 411' is provided with a first accommodation hole 411a'. The first accommodation hole 411a' has a shape and size corresponding to the outer shape and size of the first coil 100A. The first coil 100A is securely accommodated in the first accommodation hole 411a'. The first accommodation hole 411a may be a through hole extending through the first wall 411' in the Z-Z' direction, or may be a blind hole opening only in the Z' direction. The second wall 421' is provided with a second accommodation hole 421a'. The second accommodation hole 421a' has a shape and size corresponding to the outer shape and size of the second coil 100B. The second coil 100B is securely accommodated in the second accommodation hole 421a'. The second accommodation hole 421a' may be a through hole extending through the second wall 421' in the Z-Z' direction, or may be a blind hole opening only in the Z direction. Where the second housing 420' includes the accommodation recess, the second wall 421' may form a bottom face of the accommodation recess of the second housing 420'.

The inner face of the first wall 411' may be provided with, not the first accommodation hole 411a', but a holding portion 413 to hold the first coil 100A; and the inner face of the second wall 421' may be provided with, not the second accommodation hole 421a', but a holding portion 422 to hold the second coil 100B. Alternatively, the first wall 411' may be provided without the first accommodation hole 411a' and configured to bond thereon the first coil 100A; and the second wall 421' may be provided without the second accommodation hole 421a' and configured to bond thereon the second coil 100B. In these cases, the accommodation space of the housing 400' accommodate not only the movable part 300 but also the first coil 100A and the second coil 100B.

The actuator A3 may further include a guide. The guide is configured to guide the movable part 300 movably in the X-X' direction. For example, the guide and the movable part 300 may have any of the following configurations (1) to (4).

(1) The guide includes first and second guide rails 500 (see FIGS. 13A to 15B). The first and second guide rails 500 are shafts or the like members provided separately from the housing 400' and attached to the first housing 410' of the housing 400'. Each of the first and second guide rails 500 extends in the X-X' direction and include a first end on the X-direction side and a second end on the X'-direction side. The portions on the Y-direction side of the walls on the X- and X' direction sides of the first housing 410 are provided with a pair of first support holes 412' to receive and support the first and second ends of the first guide rail 500. The portions on the Y'-direction side of the walls on the X- and X' direction sides of the first housing 410 are provided with a pair of second support holes 412' to receive and support the first and second ends of the second guide rail 500. The movable part 300 includes at least one first runner 323 and at least one second runner 324. Where the holder 320 is provided, the at least one first runner 323 and the at least one second runner 324 are provided on the first end portion 321 and the second end portion 322, respectively, of the holder 320 (see FIGS. 13A, 13C, and FIG. 14A to 15B). Where the holder 320 is omitted, the at least one first runner 323 and the at least one second runner 324 are provided on the end portions on the Y- and Y-direction sides, respectively, of the permanent magnet 310. In either case, the at least one first runner 323 has a dimension in the X-X' direction that is smaller than that of the first guide rail 500, and the at least one second runner 324 has a dimension in the X-X' direction that is smaller than that of the second guide rail 500. The or each first runner 323 has a groove or hole extending in the X-X' direction through the or each first runner 323 and receiving the first guide rail 500, so that the or each first runner 323 is movable in the X-X' direction along the first guide rail 500. Likewise, the or each second runner 324 has a groove or hole extending in the X-X' direction through the or each second runner 324 and receiving the second guide rail 500, so that the or each second runner 324 is movable in the X-X' direction along the second guide rail 500.

(2) The first and second guide rails 500 have a configuration similar to that of configuration (1) above, but different in that the first and second guide rails 500 of configuration (2) are ridges (not illustrated) being provided in the first housing 410, protruding toward the at least one first runner 323 side and the at least one second runner 324, respectively, of the movable part 300, and extending in the X-X' direction. The at least one first runner 323 and the at least one second runner 324 of configuration (2) is similar to those of configuration (1) above, but different in that the or each first runner 323 has a groove extending in the X-X' direction through the or each first runner 323, opening toward the first guide rail 500, and receiving the first guide rail 500, so that the or each first runner 323 is movable in the X-X' direction along the first guide rail 500. Likewise, the or each second runner 324 has a groove extending in the X-X' direction through the or each second runner 324, opening toward the second guide rail 500, and receiving the second guide rail 500, so that the or each second runner 324 is movable in the X-X' direction along the second guide rail 500.

(3) The guide includes first and second guide grooves (not illustrated). The first and second guide grooves are provided in the first housing 410, open toward the at least one first runner 323 and the at least one second runner 324, respectively, of the movable part 300, and extend in the X-X' direction. The at least one first runner 323 of configuration (2) is similar to that of configuration (1) above, but different in that the or each first runner 323 protrudes toward the first guide groove, is received in the first guide groove, and is movable in the X-X' direction along the first guide groove. The at least one second runner 324 of configuration (2) is similar to that of configuration (1) above, but different in that the or each second runner 324 protrudes toward the second guide groove side, is received in the second guide groove, and is movable in the X-X' direction along the second guide groove.

Configurations (1) and (2) above may be modified such that only one of the first and second guide rails 500 is provided, with the other omitted, and only either of the at least one first runner 323 or the at least one second runner 324 is provided, with the other omitted. Configuration (3) above may be modified such that, only one of the first and second guide grooves is provided, with the other omitted, only one of the at least one first runner 323 and the at least one second runner 324 is provided, with the other omitted.

(4) The guide includes a groove in the first housing 410' or a pair of ridges on the first housing 410. The groove or the pair of ridges extends in the X-X' direction. The groove or the pair of ridges has a dimension in the X-X' direction that is larger than that of the movable part 300. The movable part 300 is received in the groove and movable in the X-X' direction, or alternatively the movable part 300 is provided between the ridges and movable in the X-X' direction. In either case, the first and second runners 323 and 324 of the movable part 300 are omitted.

The first and second non-movable parts 200A', 200B' are fixed to the housing 400. For example, the first and second non-movable parts 200A', 200B' may be fixed to the housing 400 in any of the following manners (5) to (8).

(5) The first non-movable part 200A' is fixed to the outer face of the first wall 411' of the first housing 410', and the second non-movable part 200B' is fixed to the outer face of the second wall 421' of the second housing 420' in one of the following manners (5-1) to (5-3), for example. (5-1) The outer face of the first wall 411' is provided with a plurality of engagement protrusions 413', the outer face of the second wall 421' of the second housing 420' is provided with a plurality of engagement recesses 422', and each of the first and second non-movable parts 200A', 200B' is provided with a plurality of engagement holes 220'. In this case, the engagement protrusions 413' fit in the corresponding engagement holes 220' of the first non-movable part 200A' and the engagement protrusions 422' fit in the engagement holes 220' of the second non-movable part 200B', so that the first non-movable part 200A' is fixed to the outer face of the first wall 411' of the first housing 410' and the second non-movable part 200B' is fixed to the outer face of the second wall 421' of the second housing 420' (see FIGS. 12A to 15B). (5-2) The outer face of the first wall 411' of the first housing 410' is provided with a plurality of engagement holes 220', the outer face of the second wall 421' of the second housing 420' is provided with a plurality of engagement holes 220', and each of the first and second non-movable parts 200A', 200B' is provided with a plurality of engagement protrusions 422' to fit in the engagement holes 220'. (5-3) The first non-movable part 200A' is bonded and thereby fixed to the outer face of the first wall 411' of the first housing 410', and the second non-movable part 200B' is bonded and thereby fixed to the outer face of the second wall 421' of the second housing 420. (6) The first non-movable part 200A' is fixed to the inner face of the first wall 411' of the first housing 410', and the second non-movable part 200B' is fixed to the inner face of the second wall 421' of the second housing 420. In this case, the first and second non-movable parts 200A', 200B' are also accommodated in the accommodation space of the housing 400. (7) The first non-movable part 200A' is embedded in the inner portion 411*c* of the first wall 411' of the first housing 410' by insert molding, and the second non-movable part 200B' is embedded in the inner portion 421*c* of the second wall 421' of the second housing 420' by insert molding. (8) The first non-movable part 200A' is securely received in a first indentation in the inner portion 411*c* of the first wall 411' of the first housing 410, and the second non-movable part 200B' is securely received in a second indentation in the inner portion 421*c* of the second wall 421' of the second housing 420'. The first and second indentations are open at least in the Y direction. The first indentation may be open in the Y and Z directions, and the second indentation may be open in the Y and Z' directions. The first and second non-movable parts 200A', 200B' are fixed to the housing 400' in any of the above manners and thereby fixed in position.

The actuator A3 may further include first and second fixing members 700, each of which generally L-shape in sectional view in the Y-Y' direction and including a first plate and a second plate. The first plate of the first fixing member 700 is provided with two first engagement holes to receive two of the engagement protrusions 413' on the Y'-direction side of the first housing 410'. The second plate of the first fixing member 700 is provided with a second engagement hole to receive an engagement protrusion protruding in the Y' direction of the second housing 420'. The first plate of the second fixing member 700 is provided with two first engagement holes to receive two of the engagement protrusions 422' on the Y'-direction side of the second housing 420'. The second plate of the second fixing member 700 is provided with a second engagement hole to receive an engagement protrusion protruding in the Y' direction of the first housing 410'. In a state where the first housing 410' is combined to the second housings 420' in a manner described above, the two first engagement holes of the first fixing member 700 receive the above two engagement protrusions 413' of the first housing 410', the second engagement hole of the first fixing member 700 receives the engagement protrusion of the second housing 420', the two first engagement holes of the second fixing member 700 receive the above two engagement protrusions 422' of the second housing 420', and the second engagement hole of the second fixing member 700 receives the engagement protrusion of the first housing 410'. The first housing 410' is thus securely combined to the second housings 420' in a manner described above. In this case, as described for configuration (5) above, the first non-movable part 200A' is fixed to the outer face 411*b* of the first facing portion 411 of the first housing 410, and the second non-movable part 200B' is fixed to the outer face 421*b* of the second facing portion 421 of the second housing 420. The first and second fixing members 700 can be omitted.

The actuator A3 and the vibration generator B3 described above provide the following technical features and effects.

Technical Feature and Effect (1)

In the first movement aspect, the first and second driving forces in the X direction acting on the permanent magnet 310 of the movable part 300 moves the movable part 300 from the second position to the first position. Accordingly, the first enlarging portion 3011 and the second enlarging portion 3021 of the permanent magnet 310 of the movable part 300 enlarge. Then the first and second enlarging portions 3011, 3021 are magnetically attracted toward the first and second non-movable parts 200A', 200B', and the third and fourth driving forces in the X' direction acting on the permanent magnet 310 of the movable part 300 moves the movable part 300 in a non-contact manner in the X' direction from the first position. The third and fourth driving forces in the X' direction acting on the permanent magnet 310 of the movable part 300 moves the movable part 300 from the first position to the second position. Accordingly, the third enlarging portion 3031 and the fourth enlarging portion 3041 of the permanent magnet 310 of the movable part 300 enlarge. Then the third and fourth enlarging portions 3031, 3041 are magnetically attracted toward the first and second non-movable parts 200A', 200B', and the first and second driving forces acting on the permanent magnet 310 of the movable part 300 moves the movable part 300 moves in the X direction from the second position in a non-contact manner. The actuator A3 and the vibration generator B3 of this aspect apply driving forces in the X' and X directions in a non-contact manner to the movable part 300 moving alternately in the X and X' directions, respectively.

In the second movement aspect, the first and second driving forces acting on the permanent magnet 310 of the movable part 300 moves the movable part 300 from the neutral position to the first position. Accordingly, the first enlarging portion 3011 and the second enlarging portion 3021 of the permanent magnet 310 of the movable part 300 enlarge. Then first and second enlarging portions 3011, 3021 are magnetically attracted toward the first and second non-movable parts 200A', 200B', so that the movable part 300 moves in the X' direction from the first position in a non-contact manner. The actuator A3 and the vibration generator B3 of this aspect intermittently apply the driving forces in the X' direction in a non-contact manner to the movable part 300 moving intermittently in the X direction.

Technical Feature and Effect (2)

In the first movement aspect, the actuator A3 and the vibration generator B3 is configured to apply the driving forces in the X' and X directions in a non-contact manner to the movable part 300 moving alternately in the X and X' directions, respectively, by using the permanent magnet 310 of the movable part 300 and the first and second non-movable parts 200A', 200B' (yokes). This configuration reduces the number of parts of the actuator A3 and the vibration generator B3, compared to conventional devices configured to apply the driving forces with springs or the like means.

In the second movement aspect, the actuator A3 and the vibration generator B3 is configured to intermittently apply the driving forces in the X' direction in a non-contact manner to the movable part 300 moving intermittently in the X direction by using the permanent magnet 310 of the movable part 300 and the first and second non-movable parts 200A', 200B' (yokes). This configuration also reduces the number of parts of the actuator A3 and the vibration generator B3, compared to the conventional devices.

Technical Feature and Effect (3)

In the first movement aspect, the first and second driving forces (i.e., two driving forces) in the X direction acting on the permanent magnet 310 of the movable part 300 move the movable part 300 from the second position to the first position. The third and fourth driving forces (i.e., two driving forces) in the X' direction acting on the permanent magnet 310 of the movable part 300 move the movable part 300 from the first position to the second position. It is therefore possible to maximize the vibration generated by the movable part 300 moving alternately in the X and X' directions.

Technical Feature and Effect (4)

Where the first distance D1 is substantially equal to the second distance D2, the magnetic attraction force to attract the permanent magnet 310 in the Z direction toward the first non-movable part 200A' is cancelled by the magnetic attraction force to attract the permanent magnet 310 in the Z' direction toward the second non-movable part 200B'. It is therefore possible to reduce friction between the movable part 300 and the guide.

Technical Feature and Effect (5)

In the first movement aspect, the guide is provided separately and independently from the arrangement in which the first enlarging portion 3011 of the permanent magnet 310 of the movable part 300 is magnetically attracted toward the first and second non-movable parts 200A', 200B', from the arrangement in which the second enlarging portion 3021 of the permanent magnet 310 of the movable part 300 is magnetically attracted toward the first and second non-movable parts 200A', 200B', from the arrangement in which the third enlarging portion 3031 of the permanent magnet 310 of the movable part 300 is magnetically attracted toward the first and second non-movable parts 200A', 200B', and from the arrangement in which the fourth enlarging portion 3041 of the permanent magnet 310 of the movable part 300 is magnetically attracted toward the first and second non-movable parts 200A', 200B'. Therefore, these arrangements can be designed and adjusted with increased flexibility.

In the second movement aspect, the guide is provided separately and independently from the arrangement in which the first enlarging portion 3011 of the permanent magnet 310 of the movable part 300 is magnetically attracted toward the first and second non-movable parts 200A', 200B', and from the arrangement in which the second enlarging portion 3021 of the permanent magnet 310 of the movable part 300 is magnetically attracted toward the first and second non-movable parts 200A', 200B'. Therefore, these arrangements can be designed and adjusted with increased flexibility.

Technical Feature and Effect (6)

The first non-movable part 200A' is provided with the opening 210A', and the second non-movable part 200B' is provided with the opening 210B'. It is possible to adjust a resonance frequency of the vibration generator B3 by changing the area of each opening 210A', 210B', i.e., by changing only the configurations of the first and second non-movable parts 200A', 200B' of the actuator A3. For example, a decreased dimension in the X-X' direction of each opening 210A', 210B' results in a decreased resonance frequency of the vibration generator B3, while an increased dimension in the X-X' direction of each opening 210A', 210B' results in an increased resonance frequency of the vibration generator B3.

Fourth Embodiment

Figure 17A:
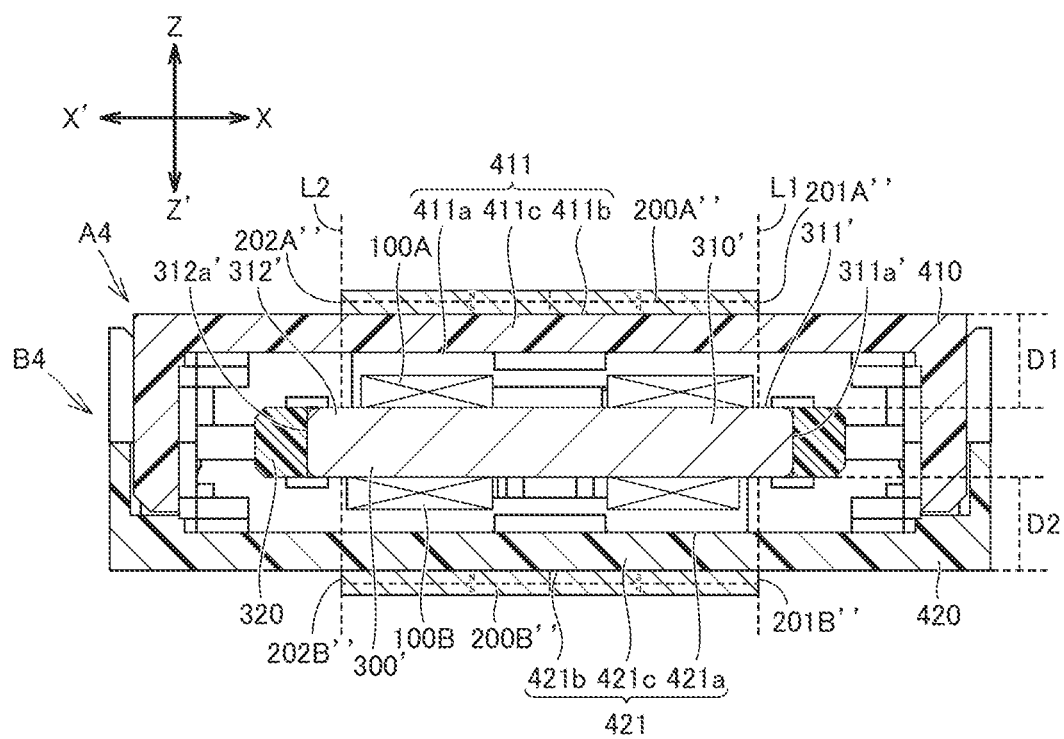
FIG. 17A is a cross-sectional view of a vibration generator according to a fourth embodiment of the invention corresponding to FIG. 2B, with a movable part of the vibration generator positioned at a neutral position.
Figure 17B:
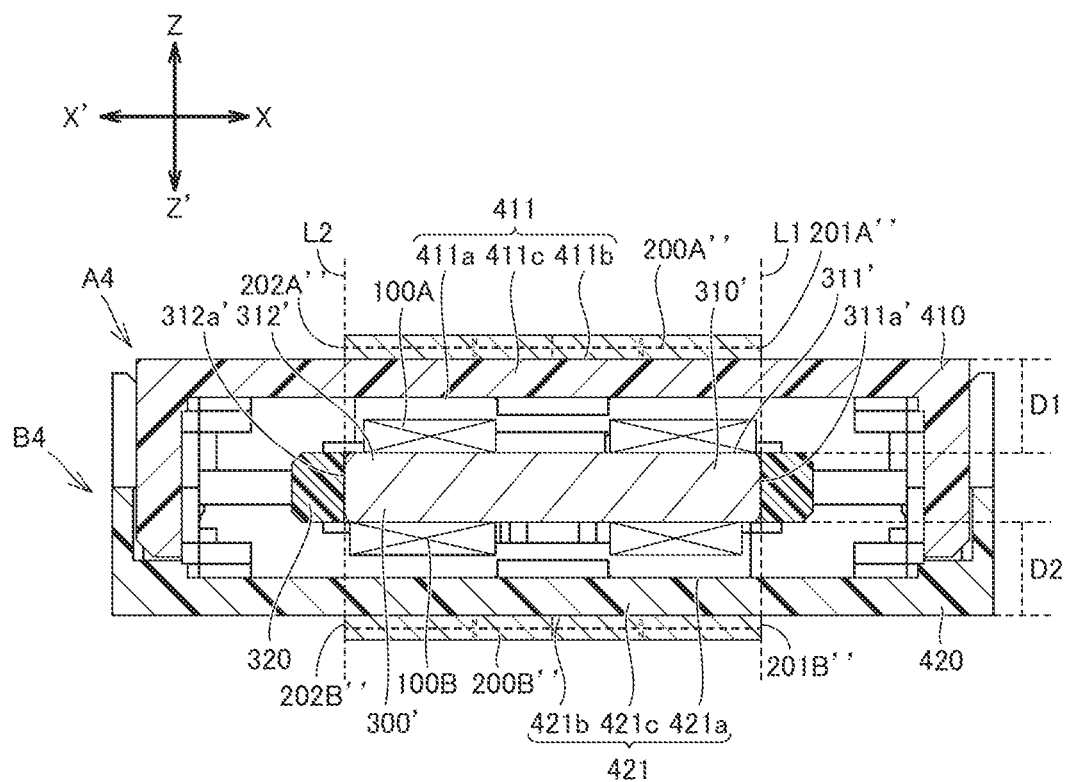
FIG. 17B is a cross-sectional view of a first variant of the vibration generator of the fourth embodiment corresponding to FIG. 2B, with a movable part of the vibration generator positioned at a neutral position.

Hereinafter described is a vibration generator B4 according to a plurality of embodiments, including the fourth embodiment and modifications thereof, of the invention, with reference to FIGS. 17A and 17B. FIG. 17A illustrates the vibration generator B4 of the fourth embodiment. FIG. 17B illustrates a first variant of the vibration generator B4 of the fourth embodiment. FIGS. 17A and 17B show the X-X' and Z-Z' directions in a similar manner to FIG. 2B.

The vibration generator B4 includes an electromagnetic actuator A4 (which may be referred to simply as an actuator A4). The actuator A4 has a similar configuration to that of the actuator A1, but is different in the following points. First and second non-movable parts 200A", 200B" are constituted by permanent magnets rather than magnetic substances; the movable part 300' includes not the permanent magnet 310 but a magnetic member 310' constituted by a magnetic substance; and the first coil 100A and the second coil 100B are fixed to the movable part 300'. Hereinafter, only the difference will be described in detail, and the description of the actuator A4 that overlaps with the description of the actuator A1 will be omitted.

Similarly to the permanent magnet 310 of any of the above-described aspects of the actuator A1, each of the first and second non-movable parts 200A", 200B" may be constituted by one or two permanent magnets, and includes first to fourth magnetic pole portions. Similarly to the first and second non-movable parts 200A, 200B of the actuator A1, the first and second non-movable parts 200A", 200B" are fixed in position, particularly fixed to the housing 400. The first non-movable part 200A" further includes the first end 201A" and the second end 202A". The second non-movable part 200B" further includes the first end 201B" and the second end 202B".

A first distance D1 in the Z-Z' direction from the first non-movable part 200A" to the magnetic member 310' of the movable part 300' may be substantially equal to a second distance D2 in the Z-Z' direction from the second non-movable part 200B" to the magnetic member 310' of the movable part 300' (see FIGS. 17A and 17B). A magnetic attraction force in the Z direction exerted on the magnetic member 310' of the movable part 300' by the first non-movable part 200A" is cancelled by a magnetic attraction force in the Z' direction exerted on the magnetic member 310' of the movable part 300' by the second non-movable part 200B". The first and second distances D1 and D2 may be different from each other.

The movable part 300' may have a similar configuration as that of the movable part 300 but may be different in that the movable part 300' includes a magnetic member 310' in place of the permanent magnet 310, and that the first coil 100A and the second coil 100B are fixed to the movable part 300'. The first coil 100A and the second coil 100B are fixed to faces on the Z- and Z'-direction sides, respectively, of the magnetic member 310' with an adhesive or other means, and the magnetic member 310' is positioned between the first coil 100A and the second coil 100B in the Z-Z' direction. The first magnetic field is generated between the first non-movable part 200A" and the magnetic member 310' of the movable part 300', and the second magnetic field is generated between the second non-movable part 200B" and the magnetic member 310' of the movable part 300'. The first coil 100A is disposed in the first magnetic field such that the wire of the first coil 100A traverses the first magnetic field between the magnetic member 310' of the movable part 300' and the first non-movable part 200A". The second coil 100B is disposed in the second magnetic field such that the wire of the second coil 100B traverses the second magnetic field between the magnetic member 310' of the movable part 300' and the second non-movable part 200B". Where the movable part 300' is provided with the holder 320, the holder 320 holds the magnetic member 310' similarly to the permanent magnet 310. The magnetic member 310' includes the first end portion 311' and the second end portion 312'.

In the first movement aspect, in a state where the movable part 300' is positioned at the neutral position, the movable part 300' and the first and second non-movable parts 200A", 200B" may have either configuration (A') or (B') and below and also either configuration (C') or (D') below.

(A') The movable part 300' at the neutral position is disposed such that the first end 311a' of the magnetic member 310' of the movable part 300' is at a relative position in the X-X' direction that substantially coincides with the first end 201A" of the first non-movable part 200A", and with the first end 201B" of the second non-movable part 200B" (see FIG. 17B). In other words, the movable part 300' at the neutral position is positioned such that the first end 311a' of the magnetic member 310' of the movable part 300' is positioned along a first imaginary line L1 extending in the Z-Z' direction along the first end 201A" of the first non-movable part 200A", and along the first end 201B" of the second non-movable part 200B". As the movable part 300' moves in the X direction from the neutral position, a portion (which may be referred to as a first enlarging portion) of the magnetic member 310' that is positioned on the X-direction side relative to the first ends 201A", 201B" of the first and second non-movable parts 200A", 200B" (i.e., relative to the first imaginary line L1) gradually enlarges. In a state where the movable part 300' is positioned at the neutral position, the magnetic member 310' has no first enlarging portion (see FIG. 17B). In a state where the movable part 300' has moved from the neutral position to the first position, the first enlarging portion of the magnetic member 310' becomes the largest. This largest first enlarging portion includes a part on the X-direction side of, or the whole of, the first end portion 311' of the magnetic member 310'.

(B') The movable part 300' at the neutral position is disposed such that the first end portion 311' of the magnetic member 310' of the movable part 300' is positioned, in the X-X' direction, on the X-direction side relative to the first end 201A" of the first non-movable part 200A", and relative to the first end 201B" of the second non-movable part 200B" (see FIG. 17A). In other words, the movable part 300' at the neutral position is disposed such that the first end portion 311' of the magnetic member 310' of the movable part 300' is positioned on the X-direction side relative to the first imaginary line L1. As the movable part 300' moves in the X direction from the neutral position, the first enlarging portion of the magnetic member 310' gradually enlarges. In a state where the movable part 300' is positioned at the neutral position, the first enlarging portion of the magnetic member 310' is the smallest, and this smallest first enlarging portion includes the first end portion 311' of the magnetic member 310' (see FIG. 17A). In a state where the movable part 300' has moved from the neutral position to the first position, the first enlarging portion of the magnetic member 310' becomes the largest. This largest first enlarging portion includes the entire first end portion 311' of the magnetic member 310' and a portion on the X'-direction side relative to the first end portion 311' of the magnetic member 310'.

(C') The movable part 300' at the neutral position is disposed such that the second end 312a' of the magnetic member 310' of the movable part 300' is at a relative position in the X-X' direction that substantially coincides with the second end 202A" of the first non-movable part 200A", and with the second end 202B" of the second non-movable part 200B" (see FIG. 17B). In other words, the movable part 300' at the neutral position is disposed such that the second end 312a' of the magnetic member 310' of the movable part 300' is positioned along a second imaginary line L2 extending in the Z-Z' direction along the second end 202A" of the first non-movable part 200A", and along the second end 202B" of the second non-movable part 200B". As the movable part 300' moves in the X' direction from the neutral position, a portion (which may be referred to as a second enlarging portion) of the magnetic member 310' that is positioned on the X-direction side relative to the second ends 202A", 202B" of the first and second non-movable parts 200A", 200B" (i.e., relative to the second imaginary line L2) gradually enlarges. In a state where the movable part 300' is positioned at the neutral position, the magnetic member 310' has no second enlarging portion (see FIG. 17B). In a state where the movable part 300' has moved from the neutral position to the second position, the second enlarging portion of the magnetic member 310' becomes the largest. This largest second enlarging portion includes a part on the X'-direction side of, or the whole of, the second end portion 312' of the magnetic member 310'.

(D') The movable part 300' at the neutral position is disposed such that the second end portion 312' of the magnetic member 310' of the movable part 300' is positioned, in the X-X' direction, on the X'-direction side relative to the second end 202A" of the first non-movable part 200A", and relative to the second end 202B" of the second non-movable part 200B" (see FIG. 17A). In other words, the movable part 300' at the neutral position is disposed such that the second end portion 312' of the magnetic member 310' of the movable part 300' is positioned on the X'-direction side relative to the second imaginary line L2. As the movable part 300' moves in the X' direction from the neutral position, the second enlarging portion of the magnetic member 310' gradually enlarges. In a state where the movable part 300' is positioned at the neutral position, the second enlarging portion of the magnetic member 310' is the smallest, and this smallest second enlarging portion includes the second end portion 312' of the magnetic member 310' (see FIG. 17A). In a state where the movable part 300' has moved from the neutral position to the second position, the second enlarging portion of the magnetic member 310' becomes the largest. This largest second enlarging portion includes the entire second end portion 312' of the magnetic member 310' and a portion on the X-direction side relative to the second end portion 312' of the magnetic member 310'.

Whether the movable part 300' and the first and second non-movable parts 200A", 200B" have configuration (A') and (B') above, since the first and second non-movable parts 200A", 200B" are fixed to the housing 400, the first enlarging portion of the magnetic member 310' is magnetically attracted by the first non-movable part 200A" in a diagonal direction including components of the X' and Z directions (this diagonal direction may be referred to as an X'Z direction), and the first enlarging portion of the magnetic member 310' is magnetically attracted by the second non-movable part 200B" in a diagonal direction including components of the X' and Z' directions (this diagonal direction may be referred to as an X'Z' direction). In other words, the fixed first non-movable part 200A" magnetically attracts the first enlarging portion of the magnetic member 310' in the X'Z direction, and the fixed second non-movable part 200B" magnetically attracts the first enlarging portion of the magnetic member 310' in the X'Z' direction. For convenience in description, the former magnetic attraction force in the X'Z direction may be referred to as a first magnetic attraction force, and the latter magnetic attraction force in the X'Z' direction may be referred to as a second magnetic attraction force. The magnetic attraction force in the X' direction included in the first magnetic attraction force of the first non-movable part 200A" and the magnetic attraction force in the X' direction included in the second magnetic attraction force of the second non-movable part 200B" act as forces to move the movable part 300' relatively in the X' direction relative to the first and second non-movable parts 200A", 200B".

Whether the movable part 300' and the first and second non-movable parts 200A", 200B" have configuration (C') or (D') above, the second enlarging portion of the magnetic member 310' is magnetically attracted by the first non-movable part 200A" in a diagonal direction including components of the X and Z directions (this diagonal direction may be referred to as an XZ direction), and the second enlarging portion of the magnetic member 310' is magnetically attracted by the second non-movable part 200B" in a diagonal direction including components of the X and Z' directions (this diagonal direction may be referred to as an XZ' direction). In other words, the fixed first non-movable part 200A" magnetically attracts the second enlarging portion of the magnetic member 310' in the XZ direction, and the fixed second non-movable part 200B" magnetically attracts the second enlarging portion of the magnetic member 310' in the XZ' direction. For convenience in description, the former magnetic attraction force in the XZ direction may be referred to as a third magnetic attraction force, and the latter magnetic attraction force in the XZ' direction may be referred to as a fourth magnetic attraction force. The magnetic attraction force in the X direction included in the third magnetic attraction force of the first non-movable part 200A" and the magnetic attraction force in the X direction included in the fourth magnetic attraction force of the second non-movable part 200B" act as forces to move the movable part 300' relatively in the X direction relative to the first and second non-movable parts 200A", 200B".

In the first movement aspect, applying a current reversed in polarity repeatedly at predetermined intervals to the first coil 100A alternately generates a first driving force (Lorentz force) to move the magnetic member 310' in the X direction and a third driving force (Lorentz force) to move the body 310' in the X' direction. Specifically, the first driving force (Lorentz force) to move the magnetic member 310' in the X direction and the third driving force (Lorentz force) to move the magnetic member 310' in the X' direction are alternately generated by an electromagnetic interaction between the first magnetic field and the current flowing through the first coil 100A such as to traverse the first magnetic field. Also, applying a current reversed in polarity repeatedly at predetermined intervals to the second coil 100B alternately generates a second driving force (Lorentz force) to move the magnetic member 310' in the X direction and a fourth driving force (Lorentz force) to move the magnetic member 310' in the X' direction. Specifically, the second driving force (Lorentz force) to move the magnetic member 310' in the X direction and the fourth driving force (Lorentz force) to move the magnetic member 310' in the X' direction are alternately generated by an electromagnetic interaction between the second magnetic field and the current flowing through the second coil 100B such as to traverse the second magnetic field. The first and second driving forces and the third and fourth driving forces alternately generated cause the movable part 300' to alternately repeat a relative and linear movement from the second position to the first position and a relative and linear movement from the first position to the second position, relative to the first and second non-movable parts 200A", 200B". Such alternately repeated linear movements of the movable part 300', the first coil 100A, and the second coil 100B, from the second position to the first position and vice versa, result in generation of vibration.

The sum of the first and second driving forces (i.e., the total driving force to move the movable part 300' in the X direction) is larger than the sum of the magnetic attraction force in the X' direction included in the largest first magnetic attraction force and the magnetic attraction force in the X' direction included in the largest second magnetic attraction force (i.e., the total magnetic attraction force to move the movable part 300' in the X' direction). Therefore, the first and second driving forces move the movable part 300' linearly from the second position to the first position, against the sum force of the above-described two magnetic attraction forces in the X' direction. The sum of the third and fourth driving forces (i.e., the total driving force to move the movable part 300' in the X' direction) is larger than the sum of the magnetic attraction force in the X direction included in the largest third magnetic attraction force and the magnetic attraction force in the X direction included in the largest fourth magnetic attraction force (i.e., the total magnetic attraction force to move the movable part 300' in the X direction). Therefore, the third and fourth driving forces move the movable part 300' linearly from the first position to the second position, against the sum force of the above-described two magnetic attraction forces in the X direction. In the movement of the movable part 300' from the first position to the second position, during the movement of the movable part 300' from the first position to the neutral position, the movable part 300' is biased by the first and second magnetic attraction forces. In the movement of the movable part 300' from the second position to the first position, during the movement of the movable part 300' from the second position to the neutral position, the movable part 300' is biased by the third and fourth magnetic attraction forces.

On the other hand, in the second movement aspect, the movable part 300' and the first and second non-movable parts 200A", 200B" have configuration (A') or (B') above, with configurations (C') and (D') above omitted. Intermittently applying a current of either a positive or negative polarity to the first coil 100A intermittently generates a first driving force (Lorentz force) to move the magnetic member 310' in the X direction. Specifically, the first driving force (Lorentz force) to move the magnetic member 310' in the X direction is intermittently generated by an electromagnetic interaction between the first magnetic field and the current flowing through the first coil 100A such as to traverse the first magnetic field. Intermittently applying a current of either a positive or negative polarity to the second coil 100B intermittently generates a second driving force (Lorentz force) to move the magnetic member 310' in the X direction. Specifically, the second driving force (Lorentz force) to move the magnetic member 310' in the X direction is intermittently generated by an electromagnetic interaction between the second magnetic field and the current flowing through the second coil 100B such as to traverse the second magnetic field. The first and second driving forces cause the movable part 300' to intermittently move relatively and linearly from the neutral position to the first position, relative to the first and second non-movable parts 200A", 200B". While the application of the currents to the first coil 100A and the second coil 100B is intermittently paused, the first and second magnetic attraction forces bias the magnetic member 310' of the movable part 300' to intermittently move from the first position to the neutral position. In short, the movable part 300', the first coil 100A, and the second coil 100B repeat alternately the linear movement in the X direction from the neutral position to the first position, caused by the first and second driving forces, and the linear movement from the first position to the neutral position, caused by the first and second magnetic attraction forces, so that vibration is generated.

The actuator A4 may further include at least one support C1. The at least one support C1 may be a single support C1 or two supports C1. The at least one support C1 have a similar configuration to that of the at least one support C1 of the actuator A2, but different in that that the or each support C1 of the actuator A4 is provided in the X-X' direction between, and configured to support, the first non-movable part 200'A' and the second non-movable part 200B". The at least one support C1 can be omitted.

The actuator A4 and the vibration generator B4 described above a provide the following technical features and effects.

Technical Feature and Effect (1)

In the first movement aspect, the first and second driving forces in the X direction acting on the magnetic member 310' of the movable part 300' moves the movable part 300' from the second position to the first position. Accordingly, the first enlarging portion of the magnetic member 310' of the movable part 300' enlarges. Then the first and second non-movable parts 200A", 200B" magnetically attracts the first enlarging portion, and the third and fourth driving forces in the X' direction acting on the magnetic member 310' of the movable part 300' move the movable part 300' in a non-contact manner in the X' direction from the first position. The third and fourth driving forces in the X' direction acting on the magnetic member 310' of the movable part 300' move the movable part 300' from the first position to the second position. Accordingly, the second enlarging portion of the magnetic member 310' of the movable part 300' enlarges. Then the first and second non-movable parts 200A", 200B" magnetically attracts the second enlarging portion, and the first and second driving forces acting on the magnetic member 310' of the movable part 300' move the movable part 300' in the X direction from the second position in a non-contact manner. The actuator A4 and the vibration generator B4 of this aspect apply the driving forces in the X' and X directions in a non-contact manner to the movable part 300' moving alternately in the X and X' directions, respectively.

In the second movement aspect, the first and second driving forces acting on the magnetic member 310' of the movable part 300' move the movable part 300' from the neutral position to the first position. Accordingly, the first enlarging portion of the magnetic member 310' of the movable part 300' enlarges. Then the first and second non-movable parts 200A", 200B" magnetically attracts the first enlarging portion, so that the movable part 300' moves in the X' direction from the first position in a non-contact manner. The actuator A4 and the vibration generator B4 of this aspect intermittently apply the driving forces in the X' direction in a non-contact manner to the movable part 300' moving intermittently in the X direction.

Technical Feature and Effect (2)

In the first movement aspect, the actuator A4 and the vibration generator B4 are configured to apply the driving forces in the X' and X directions in a non-contact manner to the movable part 300' moving alternately in the X and X' directions, respectively, by using the magnetic member 310' of the movable part 300' and the first and second non-movable parts 200A", 200B". This configuration reduces the number of parts of the actuator A4 and the vibration generator B4, compared to conventional devices configured to apply the driving forces with springs or the like means.

In the second movement aspect, the actuator A4 and the vibration generator B4 is configured to intermittently apply the driving forces in the X' direction in a non-contact manner to the movable part 300' moving intermittently in the X direction by using the magnetic member 310' of the movable part 300' and the first and second non-movable parts 200A", 200B". This configuration also reduces the number of parts of the actuator A4 and the vibration generator B4, compared to the conventional devices.

Technical Feature and Effect (3)

In the first movement aspect, the first and second driving forces (i.e., two driving forces) in the X direction acting on the magnetic member 310' of the movable part 300' move the movable part 300' from the second position to the first position. The third and fourth driving forces (i.e., two driving forces) in the X' direction acting on the magnetic member 310' of the movable part 300' move the movable part 300' from the first position to the second position. It is therefore possible to maximize the vibration generated by the movable part 300' moving alternately in the X and X' directions.

Technical Feature and Effect (4)

Where the first distance D1 is substantially equal to the second distance D2, the magnetic attraction force in the Z direction exerted on the magnetic member 310' of the movable part 300' by the first non-movable part 200A" is cancelled by the magnetic attraction force in the Z' direction exerted on the magnetic member 310' of the movable part 300' by the second non-movable part 200B". It is therefore possible to reduce friction between the movable part 300' and the guide.

Technical Feature and Effect (5)

In the first movement aspect, the guide is provided separately and independently from the arrangement in which the first and second non-movable parts 200A", 200B" magnetically attracts the first enlarging portion of the magnetic member 310' of the movable part 300', and from the arrangement in which the first and second non-movable parts 200A", 200B" magnetically attracts the second enlarging portion of the magnetic member 310' of the movable part 300'. Therefore, these arrangements can be designed and adjusted with increased flexibility.

In the second movement aspect, the guide is provided separately and independently from the arrangement in which the first and second non-movable parts 200A", 200B" magnetically attracts the first enlarging portion of the magnetic member 310' of the movable part 300'. Therefore, this arrangement can be designed and adjusted with increased flexibility.

Fifth Embodiment

Figure 18A:
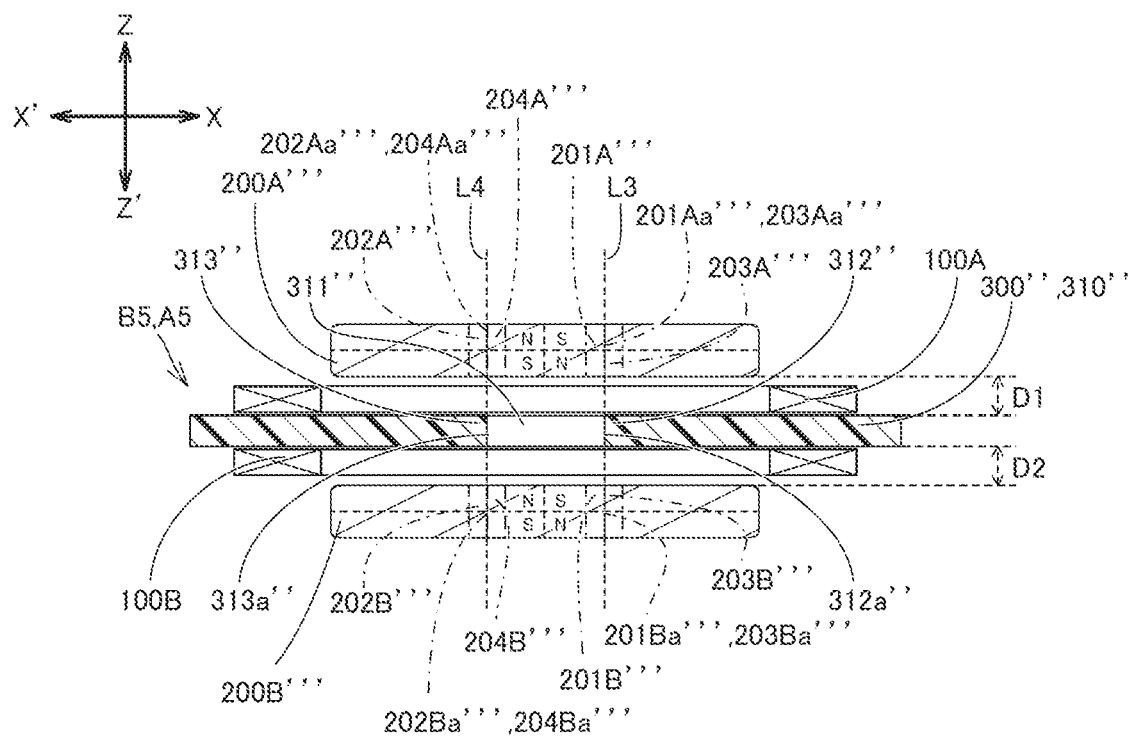
FIG. 18A is a cross-sectional view of a vibration generator according to a fifth embodiment of the invention corresponding to FIG. 13B, with a movable part of the vibration generator positioned at a neutral position.
Figure 18B:
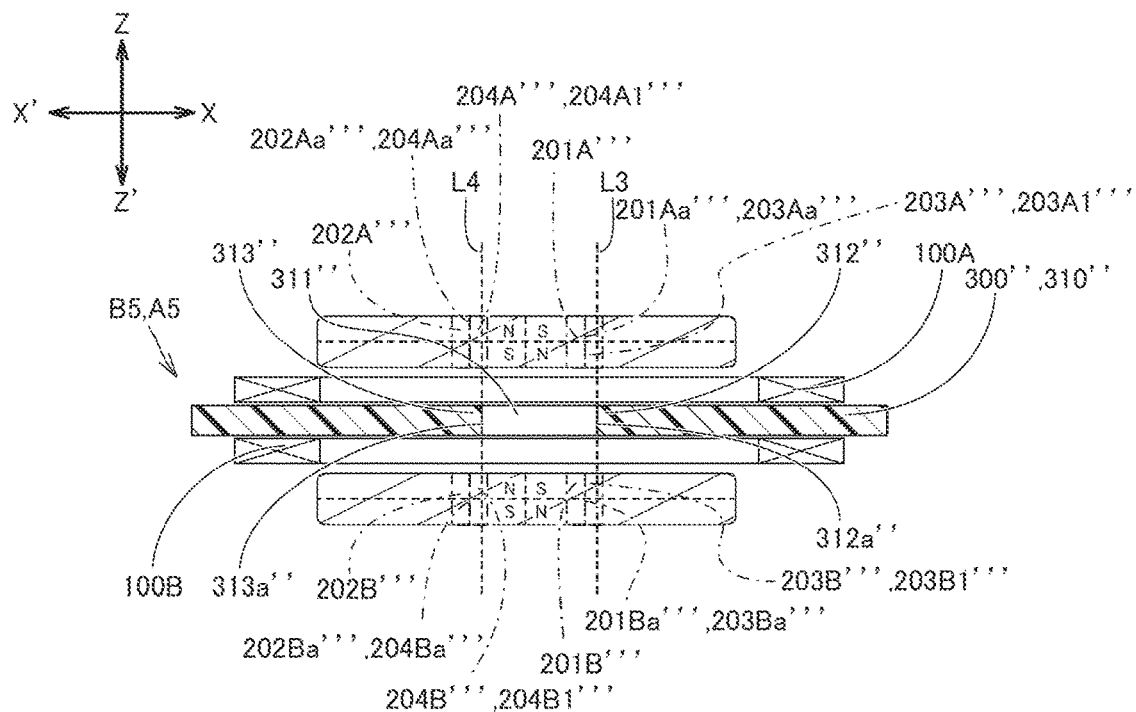
FIG. 18B is a cross-sectional view of the vibration generator of the fifth embodiment corresponding to FIG. 13B, with the movable part of the vibration generator positioned at a first position.
Figure 18C:
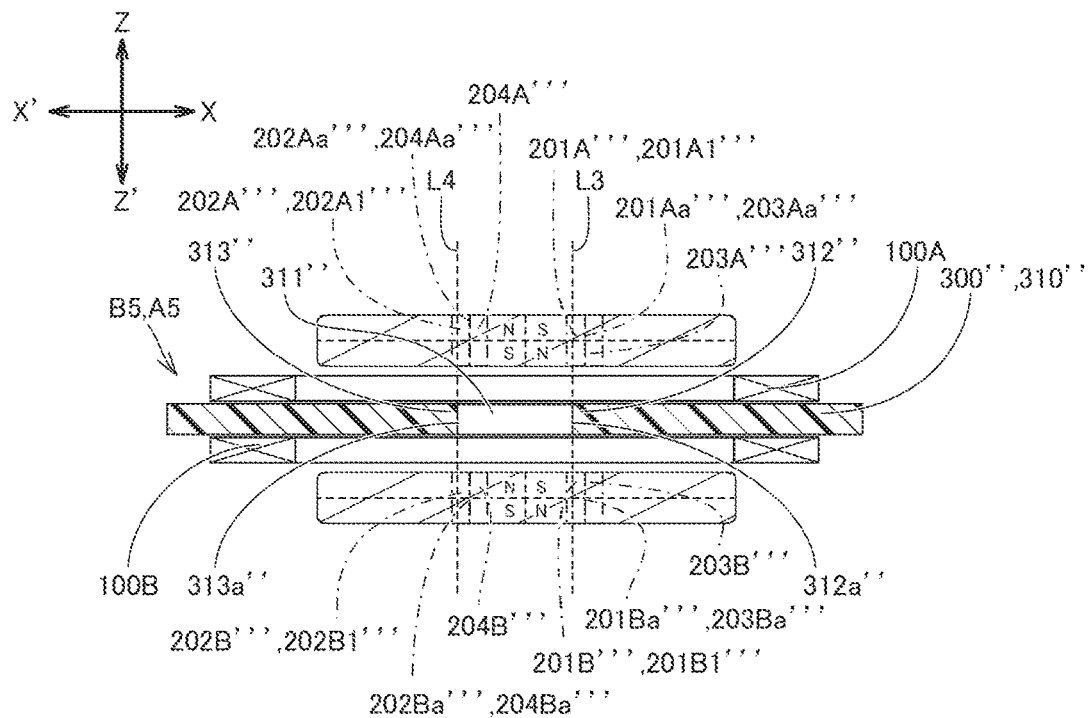
FIG. 18C is a cross-sectional view of the vibration generator of the fifth embodiment corresponding to FIG. 13B, with the movable part of the vibration generator positioned at a second position.

Hereinafter described is a vibration generator B5 according to a plurality of embodiments, including the fifth embodiment and modifications thereof, of the invention, with reference to FIGS. 18A to 18C. FIGS. 18A to 18C illustrate the vibration generator B5 of the fifth embodiment. FIGS. 18A to 18C illustrate the X-X' direction and the Z-Z' direction in a similar manner to FIG. 2B.

The vibration generator B5 includes an electromagnetic actuator A5 (which may be referred to simply as an actuator A5). The actuator A5 has a similar configuration to that of the actuator A3, but is different in the following points. First and second non-movable parts 200A''', 200B''' are constituted not by magnetic substance but by permanent magnet; a movable part 300" includes not the permanent magnet 310 but a magnetic member 310" constituted by a magnetic substance; and the first coil 100A and the second coil 100B are fixed to the movable part 300". Hereinafter, only the difference will be described in detail, and the description of the actuator A5 that overlaps with the description of the actuator A3 will be omitted.

The movable part 300" a similar configuration as that of the movable part 300 but may be different in that the movable part includes the magnetic member 310" in place of the permanent magnet 310, and that the magnetic member 310" includes an opening 311". The first coil 100A and the second coil 100B are fixed to faces on the Z- and Z'-direction sides, respectively, of the magnetic member 310" with an adhesive or other means, and the magnetic member 310" is positioned between the first coil 100A and the second coil 100B in the Z-Z' direction. Where the movable part 300" is provided with the holder 320 (not illustrated in FIGS. 18A to 18C), the holder 320 holds the magnetic member 310" similarly to the permanent magnet 310. The opening 311" of the magnetic member 310" extends in the Z-Z' direction through the magnetic member 310". The opening 311" may be polygonal (e.g., rectangular as shown in FIGS. 18A to 18C), circular, or of any other shape. The magnetic member 310" further includes a first edge portion 312" on the X-direction side of the opening 311" and a second edge portion 313" on the X'-direction side of the opening 311". The first edge portion 312" includes a first edge 312a" on the X-direction side of the opening 311". The second edge portion 313" includes a second edge 313a" on the X'-direction side of the opening 311".

Each of the first and second non-movable parts 200A''', 200B''' are constituted by one or two permanent magnets similarly to the permanent magnet 310 of any of the above-described aspects of the actuator A3. For convenience in description, the portions forming the north and south poles, respectively, of the portion on the Z'-direction side of the first non-movable part 200A''' may be referred to as a first magnetic pole portion and a second magnetic pole portion, respectively; the portions forming the south and north poles, respectively, of the portion on the Z-direction side of the first non-movable part 200A''' may be referred to as a third magnetic pole portion and a fourth magnetic pole portion, respectively; the portions forming the north and south poles, respectively, of the portion on the Z'-direction side of the second non-movable part 200B''' may be referred to as a first magnetic pole portion and a second magnetic pole portion, respectively; and the portions forming the south and north poles, respectively, of the portion on the Z-direction side of the second non-movable part 200B''' may be referred to as a third magnetic pole portion and a fourth magnetic pole portion, respectively. The first non-movable part 200A''' may be modified such that the first and second magnetic pole portions form north and south poles, respectively, and the third and fourth magnetic pole portions form the south and north poles, respectively. Likewise, the second non-movable part 200B''' may be modified such that the first and second magnetic pole portions form north and south poles, respectively, and the third and fourth magnetic pole portions form the south and north poles, respectively. The first and second non-movable parts 200A''', 200B''' are fixed in position, particularly fixed to the housing 400', similarly to the first and second non-movable parts 200A', 200B' of the actuator A3. The housing 400' is not illustrated in FIGS. 18A to 18C. The first magnetic field is generated between the first non-movable part 200A''' and the magnetic member 310" of the movable part 300", and the second magnetic field is generated between the second non-movable part 200B''' and the magnetic member 310" of the movable part 300". The first coil 100A is disposed in the first magnetic field such that the wire of the first coil 100A traverses the first magnetic field between the magnetic member 310" of the movable part 300" and the first non-movable part 200A'''. The second coil 100B is disposed in the second magnetic field such that the wire of the second coil 100B traverses the second magnetic field between the magnetic member 310" of the movable part 300" and the second non-movable part 200B'''.

A first distance D1 in the Z-Z' direction from the first non-movable part 200A''' to the magnetic member 310" of the movable part 300" may be substantially equal to a second distance D2 in the Z-Z' direction from the second non-movable part 200B''' to the magnetic member 310'' of the movable part 300'' (see FIG. 18A). A magnetic attraction force in the Z direction exerted on the magnetic member 310'' of the movable part 300'' by the first non-movable part 200A''' is cancelled by the magnetic attraction force in the Z' direction exerted on the magnetic member 310'' of the movable part 300'' by the second non-movable part 200B'''. The first and second distances D1 and D2 may be different.

In the first movement aspect, the first non-movable part 200A''' includes a first portion 201A''', a second portion 202A''', a third portion 203A''', and a fourth portion 204A''', which are referred to with dash-dotted lines in FIGS. 18A to 18C. The second non-movable part 200B''' includes a first portion 201B''', a second portion 202B''', a third portion 203B''', and a fourth portion 204B''', which are also referred to with dash-dotted lines in FIGS. 18A to 18C. In the first non-movable part 200A''', the first portion 201A''' and the third portion 203A''' are provided in the first and third magnetic pole portions, and the second portion 202A''' and the fourth portion 204A''' are provided in the second and fourth magnetic pole portions. In the second non-movable part 200B''', the first portion 201B''' and the third portion 203B''' are provided in the first and third magnetic pole portions, and the second portion 202 B''' and the fourth portion 204B''' are provided in the second and fourth magnetic pole portions.

In a state where the movable part 300'' at the neutral position, the first portion 201A''' of the first non-movable part 200A''' is positioned on the Z-direction side relative to, and in spaced relation to, the opening 311'' of the magnetic member 310'' of the movable part 300'', and includes an end 201Aa''' on the X-direction side, which substantially coincides, in the X-X' direction, with the first edge 312a'' of the opening 311'' of the magnetic member 310'' of the movable part 300''. Also in a state where the movable part 300'' at the neutral position, the first portion 201B''' of the second non-movable part 200B''' is positioned on the Z'-direction side relative to, and in spaced relation to, the opening 311'' of the magnetic member 310'' of the movable part 300'', and includes an end 201Ba''' on the X-direction side, which substantially coincides, in the X-X' direction, with the first edge 312a'' of the opening 311'' of the magnetic member 310'' of the movable part 300''. At the neutral position, the ends 201Aa''', 201Ba''' on the X-direction side of the first portions 201A''', 201B''' of the first and second non-movable parts 200A''', 200B''' are positioned along a third imaginary line L3 extending in the Z-Z' direction along the first edge 312a'' of the opening 311'' of the magnetic member 310'' of the movable part 300''.

In the first non-movable part 200A''', the second portion 202A''' is a portion that is positioned on the X'-direction side relative to the first portions 201A'''. In the second non-movable part 200B''', the second portion 202B''' is a portion that is positioned on the X'-direction side relative to the first portions 201B'''. In a state where the movable part 300'' is positioned at the neutral position, the second portion 202A''' of the first non-movable part 200A''' is positioned on the Z-direction side relative to, and in spaced relation to, the second edge portion 313'' of the opening 311'' of the magnetic member 310'' of the movable part 300'', and includes an end 202Aa''' on the X-direction side, which substantially coincides, in the X-X' direction, with the second edge 313a'' of the opening 311'' of the magnetic member 310'' of the movable part 300''. Also in a state where the movable part 300'' is positioned at the neutral position, the second portion 202B''' of the second non-movable part 200B''' is positioned on the Z'-direction side relative to, and in spaced relation to, the second edge portion 313'' of the opening 311'' of the magnetic member 310'' of the movable part 300'', and includes an end 202Ba''' on the X-direction side, which substantially coincides, in the X-X' direction, with the second edge 313a'' of the opening 311'' of the magnetic member 310'' of the movable part 300''. At the neutral position, the ends 202Aa''', 202Ba''' on the X-direction side of the second portions 202A''', 202B''' of the first and second non-movable parts 200A''', 200B''' are positioned along a fourth imaginary line L4 extending in the Z-Z' direction along the second edge 313a'' of the opening 311'' of the magnetic member 310'' of the movable part 300''.

In the first non-movable part 200A''', the third portion 203A''' is a portion that is positioned next to, and on the X-direction side relative to, the first portions 201A'''. In the second non-movable part 200B''', the third portion 203B''' is a portion that is positioned next to, and on the X-direction side relative to, the first portions 201B'''. In a state where the movable part 300'' is positioned at the neutral position, the third portion 203A''' of the first non-movable part 200A''' is positioned on the Z-direction side relative to, and in spaced relation to, the first edge portion 312'' of the opening 311'' of the magnetic member 310'' of the movable part 300'', and includes an end 203Aa''' on the X'-direction side, which substantially coincides, in the X-X' direction, with the first edge 312a'' of the opening 311'' of the magnetic member 310'' of the movable part 300''. Also in a state where the movable part 300'' is positioned at the neutral position, the third portion 203B''' of the second non-movable part 200B''' is positioned on the Z'-direction side relative to, and in spaced relation to, the first edge portion 312'' of the opening 311'' of the magnetic member 310'' of the movable part 300'', and includes an end 203Ba''' on the X'-direction side, which substantially coincides, in the X-X' direction, with the first edge 312a'' of the opening 311'' of the magnetic member 310'' of the movable part 300''. The end 203Aa''' on the X'-direction side of the third portion 203A''' of the first non-movable part 200A''' overlaps the end 201Aa''' on the X-direction side of the first portion 201A''' of the first non-movable part 200A''', and the end 203Ba''' on the X'-direction side of the third portion 203B''' of the second non-movable part 200B''' overlaps the end 201Ba''' on the X-direction side of the first portion 201B''' of the second non-movable part 200B''' (See FIG. 18A). At the neutral position, the ends 201Aa''', 201Ba''' on the X-direction side of the first portions 201A''', 201B''' and the ends 203Aa''', 203Ba''' on the X'-direction side of the third portions 203A''', 203B''' of the first and second non-movable parts 200A''', 200B''' are positioned along the third imaginary line L3.

In the first non-movable part 200A''', the fourth portion 204A''' is a portion that is positioned in the X-X' direction between the first portion 201A''' and the second portion 202A''', and positioned next to, and on the X-direction side relative to, the second portion 202A'''. In the second non-movable part 200B''', the fourth portion 204B''' is a portion that is positioned in the X-X' direction between the first portion 201B''' and the second portion 202B''', and positioned next to, and on the X-direction side relative to, the second portion 202B'''. In a state where the movable part 300'' is positioned at the neutral position, the fourth portion 204A''' of the first non-movable part 200A''' is positioned on the Z-direction side relative to, and in spaced relation to, the opening 311'' of the magnetic member 310'' of the movable part 300'', and includes an end 204Aa''' on the X'-direction side, which substantially coincides, in the X-X' direction, with the second edge 313a'' of the opening 311'' of the magnetic member 310'' of the movable part 300''. Also in a state where the movable part 300" is positioned at the neutral position, the fourth portion 204B''' of the second non-movable part 200B''' is positioned on the Z'-direction side relative to, and in spaced relation to, the opening 311" of the magnetic member 310" of the movable part 300", and includes an end 204Ba''' on the X'-direction side, which substantially coincides, in the X-X' direction, with the second edge 313a" of the opening 311" of the magnetic member 310" of the movable part 300". The end 204Aa''' on the X'-direction side of the fourth portion 204A''' of the first non-movable part 200A''' overlaps the end 202Aa''' on the X-direction side of the second portion 202A''' of the first non-movable part 200A''', and the end 204Ba''' on the X'-direction side of the fourth portion 204B''' of the second non-movable part 200B''' overlaps the end 202Ba''' on the X-direction side of the second portion 202B''' of the second non-movable part 200B'''. The ends 202Aa''', 202Ba''' on the X-direction side of the second portions 202A''', 202B''' and the ends 204Aa''', 204Ba''' on the X'-direction side of the fourth portions 204A''', 204B''' of the first and second non-movable parts 200A''', 200B''' are positioned along the fourth imaginary line L4.

In the second movement aspect, the first non-movable part 200A''' includes the third portion 203A''' and the fourth portion 204A''', with the first portion 201A''' and the second portion 202A''' omitted; and the second non-movable part 200B''' includes the third portion 203B''' and the fourth portion 204B''', with the first portion 201B''' and the second portion 202B''' omitted. In a state where the movable part 300" is positioned at the neutral position, the third portions 203A''', 203B''' and the fourth portions 204A''', 204B''' of the first and second non-movable parts 200A''', 200B''' are positioned as described above.

It should be appreciated that the above-described ends 201Aa''', 201Ba''' on the X-direction side of the first portions 201A''', 201B''' of the first and second non-movable parts 200A''', 200B''' are not physical ends but just portions of the first and second non-movable parts 200A''', 200B''' that substantially coincide, in the X-X' direction, with the first edge 312a" of the movable part 300" at the neutral position; the above-described ends 202Aa''', 202Ba''' on the X-direction side of the second portions 202A''', 202B''' of the first and second non-movable parts 200A''', 200B''' are not physical ends but just portions of the first and second non-movable parts 200A''', 200B''' that substantially coincide, in the X-X' direction, with the second edge 313a" of the movable part 300" at the neutral position; the above-described ends 203Aa''', 203Ba''' on the X'-direction side of the third portions 203A''', 203B''' of the first and second non-movable parts 200A''', 200B''' are not physical ends but just portions of the first and second non-movable parts 200A''', 200B''' that substantially coincide, in the X-X' direction, with the first edge 312a" of the movable part 300" at the neutral position; and the above-described ends 204Aa''', 204Ba''' on the X'-direction side of the fourth portions 204A''', 204B''' of the first and second non-movable parts 200A''', 200B''' are not physical ends but just portions of the first and second non-movable parts 200A''', 200B''' that substantially coincide, in the X-X' direction, with the second edge 313a" of the movable part 300" at the neutral position.

As the movable part 300" moves in the X direction from the neutral position, the third portions 203A''', 203B''' of the first and second non-movable parts 200A''', 200B''' move relatively in the X' direction past the first edge 312a" of the opening 311" of the movable part 300" (i.e., past the third imaginary line L3) (see FIG. 18B). Accordingly, portions (which may be referred to as third enlarging portions 203A1''', 203B1''') of the third portions 203A''', 203B''' of the first and second non-movable parts 200A''', 200B''' that are positioned on the X'-direction side relative to the first edge 312a" of the movable part 300" (i.e., relative to the third imaginary line L3) gradually enlarge. In a state where the movable part 300" is positioned at the neutral position, the third portions 203A''', 203B''' of the first and second non-movable parts 200A''', 200B''' have no respective third enlarging portions 203A1''', 203B1''' (see FIG. 18A). On the other hand, when the movable part 300" has moved from the neutral position to the first position, the third enlarging portions 203A1''', 203B1''' of the first and second non-movable parts 200A''', 200B''' become the largest (see FIG. 18B).

In a state where the third enlarging portions 203A1''', 203B1''' have occurred in the respective third portions 203A''', 203B''' of the first and second non-movable parts 200A''', 200B''', the third enlarging portions 203A1''', 203B1''' magnetically attract the first edge 312a" of the movable part 300" in the X'Z and X'Z' directions. For convenience in description, the former magnetic attraction force in the X'Z direction may be referred to as a fifth magnetic attraction force, and the latter magnetic attraction force in the X'Z' direction may be referred to as a sixth magnetic attraction force. Since the first and second non-movable parts 200A''', 200B''' are fixed in a manner described above, the magnetic attraction force in the X' direction included in the fifth magnetic attraction force and the magnetic attraction force in the X' direction included in the sixth magnetic attraction force exerted by the third enlarging portions 203A1''', 203B1''' of the first and second non-movable parts 200A''', 200B''' act as forces to move the movable part 300" relatively in the X' direction relative to the first and second non-movable parts 200A''', 200B'''. In a state where the movable part 300" is positioned at the neutral position, the first and second non-movable parts 200A''', 200B''' have no third enlarging portions 203A1''', 203B1''', and therefore the fifth and sixth magnetic attraction forces will not be generated. On the other hand, as the third enlarging portions 203A1''', 203B1''' of the first and second non-movable parts 200A''', 200B''' enlarge, the fifth and sixth magnetic attraction forces become stronger, and become the strongest in a state where the movable part 300" has moved to the first position.

As the movable part 300" moves in the X direction from the neutral position, the fourth portions 204A''', 204B''' of the first and second non-movable parts 200A''', 200B''' move relatively in the X' direction past the second edge 313a" of the opening 311" of the movable part 300" (i.e., past the fourth imaginary line L4) (see FIG. 18B). Accordingly, portions (which may be referred to as fourth enlarging portions 204A1''', 204B1''') of the fourth portions 204A''', 204B''' of the first and second non-movable parts 200A''', 200B''' that are positioned on the X'-direction side relative to the second edge 313a" of the movable part 300" (i.e., relative to the fourth imaginary line L4) gradually enlarge. In a state where the movable part 300" is positioned at the neutral position, the fourth portions 204A''', 204B''' of the first and second non-movable parts 200A''', 200B''' have no respective fourth enlarging portions 204A1''', 204B1''' (see FIG. 18A). On the other hand, in a state where the movable part 300" has moved from the neutral position to the first position, the fourth enlarging portions 204A1''', 204B1''' of the first and second non-movable parts 200A''', 200B''' become the largest (see FIG. 18B).

In a state where the fourth enlarging portions 204A1''', 204B1''' have occurred in the respective fourth portions 204A''', 204B''' of the first and second non-movable parts 200A''', 200B''', the fourth enlarging portions 204A1''', 204B1''' magnetically attract the second edge 313a'' of the movable part 300'' in the X'Z direction and the X'Z' direction. For convenience in description, the former magnetic attraction force in the X'Z direction may be referred to as a seventh magnetic attraction force, and the latter magnetic attraction force in the X'Z' direction may be referred to as an eighth magnetic attraction force. Since the first and second non-movable parts 200A''', 200B''' are fixed in a manner described above, the magnetic attraction force in the X' direction included in the seventh magnetic attraction force and the magnetic attraction force in the X' direction included in the eighth magnetic attraction force exerted by the fourth enlarging portions 204A1''', 204B1''' of the first and second non-movable parts 200A''', 200B''' act as forces to move the movable part 300'' relatively in the X' direction relative to the first and second non-movable parts 200A''', 200B'''. In a state where the movable part 300'' is positioned at the neutral position, since the first and second non-movable parts 200A''', 200B''' have no fourth enlarging portions 204A1''', 204B1''', and therefore the seventh and eighth magnetic attraction forces will not be generated. On the other hand, as the fourth enlarging portions 204A1''', 204B1''' of the first and second non-movable parts 200A''', 200B''' enlarge, the seventh and eighth magnetic attraction forces become stronger, and become the strongest in a state where the movable part 300'' has moved to the first position.

Suppose, in a state where the movable part 300'' has moved to the first position, the fourth portions 204A''', 204B''' of the first and second non-movable parts 200A''', 200B''' are positioned on the Z- and Z'-direction sides, and in spaced relation to, the second edge portion 313'' of the movable part 300'', the fourth enlarging portions 204A1''', 204B1''' of the fourth portions 204A''', 204B''' of the first and second non-movable parts 200A''', 200B''' do not magnetically attract the second edge 313a'' of the movable part 300'' in the X'Z nor X'Z' directions, but instead the first magnetic pole portions of the first and second non-movable parts 200A''', 200B''' relatively approach the second edge 313a'' of the movable part 300'' and magnetically attract the second edge 313a'' of the movable part 300'' in the XZ and XZ' directions. In this case, the magnetic attraction forces in the XZ and XZ' directions of the first magnetic pole portions of the first and second non-movable parts 200A''', 200B''' would be balanced with the magnetic attraction forces in the X'Z and X'Z' directions of the third enlarging portions 203A1''', 203B1''' of the third portions 203A''', 203B''' of the first and second non-movable parts 200A''', 200B''', resulting in that the neutral position of the movable part 300'' would shift. In view of this, the first position of the movable part 300'' should be a position at which the first magnetic pole portions of the first and second non-movable parts 200A', 200B''' will not magnetically attract the second edge 313a'' of the movable part 300'' in the X'Z and X'Z' directions. For this purpose, it is possible to adjust the dimension in the X-X' direction of the opening 311'' of the movable part 300'' and the distances from the first magnetic pole portions of the first and second non-movable parts 200A''', 200B''' at the first position to the second edge 313a'' of the movable part 300''.

Where the first and second non-movable parts 200A''', 200B''' are provided with the respective first portions 201A''', 201B''', as the movable part 300'' moves in the X' direction from the neutral position, the first portions 201A''', 201B''' of the first and second non-movable parts 200A''', 200B''' move relatively in the X direction past the first edge 312a'' of the opening 311'' of the movable part 300'' (i.e., past the third imaginary line L3) (see FIG. 18C). Accordingly, portions (which may be referred to as first enlarging portions 201A1''', 201B1''') of the first portions 201A''', 201B''' of the first and second non-movable parts 200A''', 200B''' that are positioned on the X-direction side relative to the first edge 312a'' of the movable part 300'' (i.e., relative to the third imaginary line L3) gradually enlarge. In a state where the movable part 300'' is positioned at the neutral position, the first portions 201A''', 201B''' of the first and second non-movable parts 200A''', 200B''' have no first enlarging portions 201A1''', 201B1''' (see FIG. 18A). On the other hand, in a state where the movable part 300'' has moved from the neutral position to the second position, the first enlarging portions 201A1''', 201B1''' of the first and second non-movable parts 200A''', 200B''' become the largest (see FIG. 18C).

In a state where the first enlarging portions 201A1''', 201B1''' have occurred in the respective first portions 201A''', 201B''' of the first and second non-movable parts 200A''', 200B''', the first enlarging portions 201A1''', 201B1''' magnetically attract the first edge 312a'' of the movable part 300'' in the XZ and XZ' directions, respectively. For convenience in description, the former magnetic attraction force in the XZ direction may be referred to as a first magnetic attraction force, and the latter magnetic attraction force in the XZ' direction may be referred to as a second magnetic attraction force. Since the first and second non-movable parts 200A''', 200B''' are fixed in a manner as described above, the magnetic attraction force in the X direction included in the first magnetic attraction forces and the magnetic attraction force in the X direction included in the second magnetic attraction force exerted by the first enlarging portions 201A1''', 201B1'' of the first and second non-movable parts 200A''', 200B''' act as forces to move the movable part 300'' relatively in the X direction relative to the first and second non-movable parts 200A''', 200B'''. In a state where the movable part 300'' is positioned at the neutral position, the first and second non-movable parts 200A''', 200B''' have no first enlarging portions 201A1''', 201B1''', and therefore the first and second magnetic attraction forces will not be generated. On the other hand, as the first enlarging portions 201A1''', 201B1''' of the first and second non-movable parts 200A''', 200B''' enlarge, the first and second magnetic attraction forces become stronger, and become the strongest in a state where the movable part 300'' has moved to the second position.

Where the first and second non-movable parts 200A''', 200B''' are provided with the respective second portions 202A''', 202B''', as the movable part 300'' moves in the X' direction from the neutral position, the second portions 202A''', 202B''' of the first and second non-movable parts 200A''', 200B''' move relatively in the X direction past the second edge 313a'' of the opening 311'' of the movable part 300'' (i.e., past the fourth imaginary line L4) (see FIG. 18C). Accordingly, portions (which may be referred to as second enlarging portions 202A1''', 202B1''') of the second portions 202A''', 202B''' of the first and second non-movable parts 200A''', 200B''' that are positioned on the X-direction side relative to the second edge 313a'' of the movable part 300'' (i.e., relative to the fourth imaginary line L4) gradually enlarge. In a state where the movable part 300'' is positioned at the neutral position, the second portions 202A''', 202B''' of the first and second non-movable parts 200A''', 200B''' have no second enlarging portions 202A1''', 202B1''' of (see FIG. 18A). On the other hand, in a state where the movable part 300'' has moved from the neutral position to the second position, the second enlarging portions 202A1''', 202B1''' of the first and second non-movable parts 200A''', 200B''' become the largest (see FIG. 18C).

In a state where the second enlarging portions 202A1''', 202B1''' have occurred in the respective second portions 202A''', 202B''' of the first and second non-movable parts 200A''', 200B''', the second enlarging portions 202A1''', 202B1''' magnetically attract the second edge 313$a$'' of the movable part 300'' in the XZ and XZ' directions, respectively. For convenience in description, the former magnetic attraction force in the XZ direction may be referred to as a third magnetic attraction force, and the latter magnetic attraction force in the XZ' direction may be referred to as a fourth magnetic attraction force. Since the first and second non-movable parts 200A''', 200B''' are fixed in a manner as described above, the magnetic attraction force in the X direction included in the third magnetic attraction forces and the magnetic attraction force in the X direction included in the fourth magnetic attraction forces of the second enlarging portions 202A1''', 202B1''' of the first and second non-movable parts 200A''', 200B''' act as forces to move the movable part 300'' relatively in the X direction relative to the first and second non-movable parts 200A''', 200B'''. In a state where the movable part 300'' is positioned at the neutral position, the first and second non-movable parts 200A''', 200B''' have no second enlarging portions 202A1''', 202B1''', and therefore the third and fourth magnetic attraction forces will not be generated. On the other hand, as the second enlarging portions 202A1''', 202B1''' of the first and second non-movable parts 200A''', 200B''' enlarge, the third and fourth magnetic attraction forces become stronger, and become the strongest in a state where the movable part 300'' has moved to the second position.

Suppose, in a state where the movable part 300'' moves to the second position, when the first portions 201A''', 201B''' of the first and second non-movable parts 200A''', 200B''' are positioned on the Z- and Z'-direction sides, and in spaced relation to, the first edge portion 312'' of the movable part 300'', the first enlarging portions 201A1''', 201B1''' of the first portions 201A''', 201B''' of the first and second non-movable parts 200A''', 200B''' do not magnetically attract the first edge 312$a$'' of the movable part 300'' in the XZ nor XZ' directions, but instead the second magnetic pole portions of the first and second non-movable parts 200A''', 200B''' relatively approach the first edge 312$a$'' of the movable part 300'' and magnetically attract the first edge 312$a$'' of the movable part 300'' in the X'Z and X'Z' directions. In this case, the magnetic attraction forces in the X'Z and X'Z' directions of the second magnetic pole portions of the first and second non-movable parts 200A''', 200B''' would be balanced with the magnetic attraction forces in the XZ and XZ' directions of the second enlarging portions 202A1''', 202B1''' of the second portions 202A''', 202B''' of the first and second non-movable parts 200A''', 200B''' resulting in that the neutral position of the movable part 300'' would shift. In view of this, the second position of the movable part 300'' should be a position at which the second magnetic pole portions of the first and second non-movable parts 200A''', 200B''' will not magnetically attract the first edge 312$a$'' of the movable part 300'' in the X'Z and X'Z' directions. For this purpose, it is possible to adjust the dimension in the X-X' direction of the opening 311'' of the movable part 300'' and the distances from the second magnetic pole portions of the first and second non-movable parts 200A''', 200B''' at the second position to the first edge 312$a$'' of the movable part 300''.

In the first movement aspect, applying a current reversed in polarity repeatedly at predetermined intervals to the first coil 100A alternately generates a first driving force (Lorentz force) to move the magnetic member 310'' in the X direction and a third driving force (Lorentz force) to move the magnetic member 310'' in the X' direction. Specifically, the first driving force (Lorentz force) to move the magnetic member 310'' in the X direction and the third driving force (Lorentz force) to move the magnetic member 310'' in the X' direction are alternately generated by an electromagnetic interaction between the first magnetic field and the current flowing through the first coil 100A such as to traverse the first magnetic field. Also, applying a current reversed in polarity repeatedly at predetermined intervals to the second coil 100B alternately generates a second driving force (Lorentz force) to move the magnetic member 310'' in the X direction and a fourth driving force (Lorentz force) to move the magnetic member 310'' in the X' direction. Specifically, the second driving force (Lorentz force) to move the magnetic member 310'' in the X direction and the fourth driving force (Lorentz force) to move the magnetic member 310'' in the X' direction are alternately generated by an electromagnetic interaction between the second magnetic field and the current flowing through the second coil 100B such as to traverse the second magnetic field. The first and second driving forces and the third and fourth driving forces alternately generated cause the movable part 300'' to alternately repeat a relative and linear movement from the second position to the first position and a relative and linear movement from the first position to the second position, relative to the first and second non-movable parts 200A''', 200B'''. Such alternately repeated linear movements of the movable part 300'', the first coil 100A, and the second coil 100B, from the second position to the first position and vice versa, result in generation of vibration.

The sum of the first and second driving forces (i.e., the total driving force to move the movable part 300'' in the X direction) is larger than the sum of the magnetic attraction force in the X' direction included in the largest fifth magnetic attraction force, the magnetic attraction force in the X' direction included in the largest sixth magnetic attraction force, the magnetic attraction force in the X' direction included in the largest seventh magnetic attraction force, and the magnetic attraction force in the X' direction included in the largest eighth magnetic attraction force in the X' direction of the largest eighth magnetic attraction force (i.e., the total magnetic attraction force to move the movable part 300'' in the X' direction). Therefore, the first and second driving forces move the movable part 300'' linearly from the second position to the first position, against the sum force of the above-described four magnetic attraction forces in the X' direction. The sum of the third and fourth driving forces (i.e., the total driving force to move the movable part 300'' in the X' direction) is larger than the sum of the magnetic attraction force in the X direction included in the largest first magnetic attraction force, the magnetic attraction force in the X direction included in the largest second magnetic attraction force, the magnetic attraction force in the X direction included in the largest third magnetic attraction force, and the magnetic attraction force in the X direction included in the largest fourth magnetic attraction force (i.e., the total magnetic attraction force to move the movable part 300'' in the X direction). Therefore, the third and fourth driving forces move the movable part 300'' linearly from the first position to the second position, against the sum force of the above-described four magnetic attraction forces in the X direction. In the movement of the movable part 300'', during the movement of the movable part 300" from the first position to the neutral position, the movable part 300" is biased by the fifth to eighth magnetic attraction forces. In the movement of the movable part 300" from the second position to the first position, during the movement of the movable part 300" from the second position to the neutral position, the movable part 300" is biased by the first to fourth magnetic attraction forces.

On the other hand, in the second movement aspect, intermittently applying a current of either a positive or negative polarity to the first coil 100A intermittently generates a first driving force (Lorentz force) to move the magnetic member 310" in the X direction. Specifically, the first driving force (Lorentz force) to move the magnetic member 310" in the X direction is intermittently generated by an electromagnetic interaction between the first magnetic field and the current flowing through the first coil 100A such as to traverse the first magnetic field. Intermittently applying a current of either a positive or negative polarity to the second coil 100B intermittently generates a second driving force (Lorentz force) to move the magnetic member 310" in the X direction. Specifically, the second driving force (Lorentz force) to move the magnetic member 310" in the X direction is intermittently generated by an electromagnetic interaction between the second magnetic field and the current flowing through the second coil 100B such as to traverse the second magnetic field. The first and second driving forces cause the movable part 300" to intermittently move relatively and linearly from the neutral position to the first position, relative to the first and second non-movable parts 200A''', 200B'''. While the application of the currents to the first coil 100A and the second coil 100B is intermittently paused, the fifth to eighth magnetic attraction forces bias the magnetic member 310" of the movable part 300" to intermittently move from the first position to the neutral position. In short, the movable part 300", the first coil 100A, and the second coil 100B repeat alternately the linear movement in the X direction from the neutral position to the first position, caused by the first and second driving forces, and the linear movement from the first position to the neutral position, caused by the fifth to eighth magnetic attraction forces, so that vibration is generated.

In the first movement aspect, the movable part 300" and the first and second non-movable parts 200A''', 200B''' may further have the configuration (A') or (B') above and configuration (C') or (D') above. In the second movement aspect, the movable part 300" and the first and second non-movable parts 200A''', 200B''' may further have configuration (A') or (B') above.

The actuator A5 may further include at least one support C1. The at least one support C1 may be a single support C1 or two supports C1. The at least one support C1 have a similar configuration to that of the at least one support C1 of the actuator A2, but different in that that the or each support C1 of the actuator A5 is provided in the X-X' direction between, and configured to support, the first non-movable part 200A''' and the second non-movable part 200B'''. The at least one support C1 can be omitted.

The actuator A5 and the vibration generator B5 described above provide the following technical features and effects.

Technical Feature and Effect (1)

In the first movement aspect, the first and second driving forces in the X direction acting on the magnetic member 310" of the movable part 300" moves the movable part 300" from the second position to the first position. Accordingly, the third enlarging portions 203A1''', 203B1''' and the fourth enlarging portions 204A1''', 204B1''' of each of the first and second non-movable parts 200A''', 200B''' enlarge. Then the third enlarging portions 203A1''', 203B1''' and the fourth enlarging portions 204A1''', 204B1''' magnetically attract the magnetic member 310" of the movable part 300", and the third and fourth driving forces in the X' direction acting on the magnetic member 310" of the movable part 300" move the movable part 300" in a non-contact manner in the X' direction from the first position. The third and fourth driving forces in the X' direction acting on the magnetic member 310" of the movable part 300" move the movable part 300" from the first position to the second position. Accordingly, the first enlarging portions 201A1''', 201B1''' and the second enlarging portions 202A1''', 202B1''' of the first and second non-movable parts 200A''', 200B''' enlarge. Then first enlarging portions 201A1''', 201B1''' and the second enlarging portions 202A1''', 202B1''' magnetically attract the magnetic member 310" of the movable part 300", and the first and second driving forces acting on the magnetic member 310" of the movable part 300" move the movable part 300" in the X direction from the second position in a non-contact manner. The actuator A5 and the vibration generator B5 of this aspect apply the driving forces in the X' and X directions in a non-contact manner to the movable part 300" moving alternately in the X and X' directions, respectively.

In the second movement aspect, the first and second driving forces acting on the magnetic member 310" of the movable part 300" move the movable part 300" from the neutral position to the first position. Accordingly, the third enlarging portions 203A1''', 203B1''' and the fourth enlarging portions 204A1''', 204B1''' of the first and second non-movable parts 200A''', 200B''' enlarge. Then the third enlarging portions 203A1''', 203B1''' and the fourth enlarging portions 204A1''', 204B1''' magnetically attract the magnetic member 310" of the movable part 300", so that the movable part 300" moves in the X' direction from the first position in a non-contact manner. The actuator A5 and the vibration generator B5 of this aspect intermittently apply the driving forces in the X' direction in a non-contact manner to the movable part 300" moving intermittently in the X direction.

Technical Feature and Effect (2)

In the first movement aspect, the actuator A5 and the vibration generator B5 are configured to apply the driving forces in the X and X' directions in a non-contact manner to the movable part 300" moving alternately in the X and X' directions, respectively, by using the magnetic member 310" of the movable part 300" and the first and second non-movable parts 200A''', 200B'''. This configuration reduces the number of parts of the actuator A5 and the vibration generator B5, compared to conventional devices configured to apply the driving forces with springs or the like means.

In the second movement aspect, the actuator A5 and the vibration generator B5 are configured to intermittently apply the driving forces in the X' direction in a non-contact manner to the movable part 300" moving intermittently in the X direction by using the magnetic member 310" of the movable part 300" and the first and second non-movable parts 200A''', 200B'''. This configuration also reduces the number of parts of the actuator A5 and the vibration generator B5, compared to the conventional devices.

Technical Feature and Effect (3)

In the first movement aspect, the first and second driving forces (i.e., two driving forces) in the X direction acting on the magnetic member 310" of the movable part 300" move the movable part 300" from the second position to the first position. The third and fourth driving forces (i.e., two driving forces) in the X' direction acting on the magnetic member 310" of the movable part 300" move the movable part 300" from the first position to the second position. It is therefore possible to maximize the vibration generated by the movable part 300 moving alternately in the X and X' directions.

Technical Feature and Effect (4)

Where the first distance D1 is substantially equal to the second distance D2, the magnetic attraction force in the Z direction exerted on the magnetic member 310" of the movable part 300" by the first non-movable part 200A''' is cancelled by the magnetic attraction force in the Z' direction exerted on the magnetic member 310" of the movable part 300" by the second non-movable part 200B'''. It is therefore possible to reduce friction between the movable part 300" and the guide.

Technical Feature and Effect (5)

In the first movement aspect, the guide is provided separately and independently from the arrangement in which the third enlarging portions 203A1''', 203B1''' and the fourth enlarging portions 204A1''', 204B1''' of the first and second non-movable parts 200A''', 200B''' magnetically attract the movable part 300", and from the arrangement in which the first enlarging portions 201A1''', 201B1''' and the second enlarging portions 202A1''', 202B1''' of the first and second non-movable parts 200A''', 200B''' magnetically attract the movable part 300". Therefore, these arrangements can be designed and adjusted with increased flexibility.

In the second movement aspect, the guide is provided separately and independently from the arrangement in which the third enlarging portions 203A1''', 203B1''' and the fourth enlarging portions 204A1''', 204B1''' of the first and second non-movable parts 200A''', 200B''' magnetically attract the movable part 300". Therefore, this arrangement can be designed and adjusted with increased flexibility.

Figure 19:
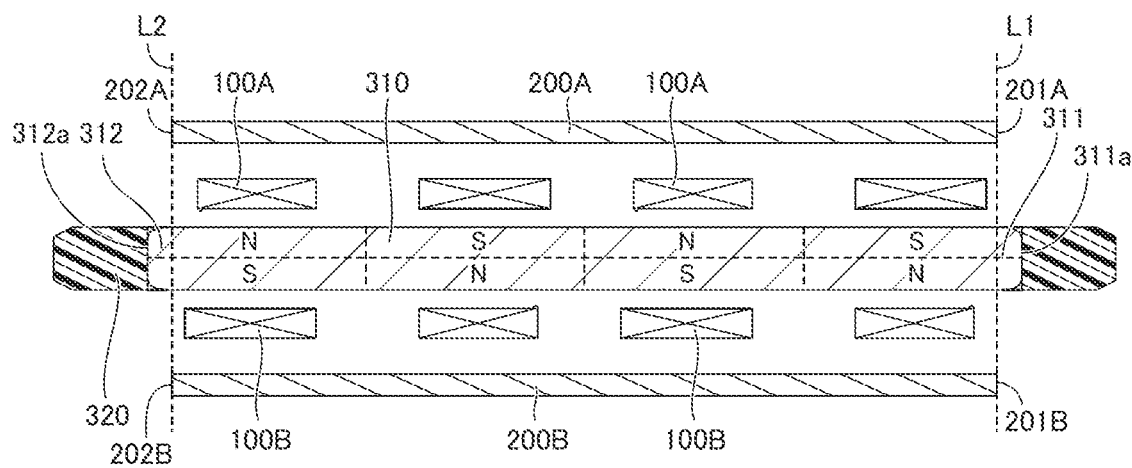
FIG. 19 is a schematic diagram illustrating a positional relationship between a movable part, first and second coils, and first and second non-movable parts of a second variant of the vibration generator of the first embodiment, with a movable part of the vibration generator positioned at a neutral position.

The electromagnetic actuators and the vibration generators of the invention are not limited to the embodiments described above, but may be modified as appropriate within the scope of the claims. Some examples of modification are described below. FIG. 19 illustrates another variant of the vibration generator B1 of the first embodiment.

One of, or each of, the first and second non-movable parts of any of the above aspects of the actuator A1, A2, or A4 of any of the above aspects may be provided with a cut-out opening in the X direction and extending through the corresponding non-movable part in the Z-Z' direction. In this case, in one of, or each of, the first and second non-movable parts, the first end portion on the X-direction side may be an edge portion on the X'-direction side of the cut-out. In this case, in one of, or each of, the first and second non-movable parts, the first end on the X-direction side may be an end of the edge portion of the cut-out. One of, or each of, the first and second non-movable part of any of the above aspects of the actuator A1, A2, or A4 of any of the above aspects may be provided with a cut-out opening in the X' direction and extending through the or each non-movable part in the Z-Z' direction. In this case, in one of, or each of, the first and second non-movable part, the second end portion on the X'-direction side may be an edge portion on the X-direction side of the cut-out. In this case, in one of, or each of, the first and second non-movable parts, the second end portion on the X'-direction side may be an end of the edge portion of the cut-out.

In the actuators A1, A2, or A3 of any of the above aspects, the permanent magnet 310 may include, in place of the first to fourth magnetic pole portions, a plurality of sets of first to fourth magnetic pole portions (see FIG. 19). The sets are arranged side by side along the X-X' direction in the permanent magnet 310. In this case, in accordance with the number of the sets in the permanent magnet 310, there are provided a plurality of first coils 100A and a plurality of second coils 100B. Each of the first coils 100A is disposed on the Z-direction side relative to, and in spaced relation to, the first and second magnetic pole portions of the corresponding set of the permanent magnet 310. Each of the second coils 100B is disposed on the Z'-direction side relative to, and in spaced relation to, the third and fourth magnetic pole portions of the corresponding set of the permanent magnet 310.

In the actuator A4 or A5 of any of the above aspects, each of the first and second non-movable parts 200A", 200B"; or 200A''', 200B''' may include, in place of the first to fourth magnetic pole portions, a plurality of sets of first to fourth magnetic pole portions. The sets are arranged side by side along the X-X' direction in each of the first and second non-movable parts 200A", 200B"; or 200A''', 200B'''. In this case, in accordance with the number of the sets in each of the first and second non-movable parts 200A", 200B"; or 200A''', 200B''', there are provided a plurality of first coils 100A and a plurality of second coils 100B. Each of the first coils 100A is disposed on the Z'-direction side relative to, and in spaced relation to, the first and second magnetic pole portions of the corresponding set of the first non-movable part 200A" or 200A'''. Each of the second coils 100B is disposed on the Z-direction side relative to, and in spaced relation to, the first and second magnetic pole portions of the corresponding set of the second non-movable part 200B" or 200B'''.

The or each first coil of any of the above aspects may be any coil configured such that applying a current to the first coil generates a first driving force to move a permanent magnet or magnetic member of the movable part of any of the above aspects in the X direction. For example, the or each first coil 100A may be constituted by a tubular solenoid coil extending in the X-X' direction. In this case, the or each first coil may be configured such that applying a current to the or each first coil generates a first driving force to move a permanent magnet or magnetic member of the movable part of any of the above aspects in the X direction, that intermittently applying a current of either a positive or negative polarity to the or each first coil 100A intermittently generates a first driving force (Lorentz force) to move the permanent magnet 310 or the magnetic member 310' in the X direction, or that applying a current reversed in polarity repeatedly at predetermined intervals to the or each first coil 100A alternately generates a first driving force (Lorentz force) to move the permanent magnet 310 or the magnetic member 310' in the X direction and a third driving force (Lorentz force) to move the permanent magnet 310 or the magnetic member 310' in the X' direction.

The or each second coil of any of the above aspects may be any coil configured such that applying a current to the second coil generates a second driving force to move a permanent magnet or magnetic member of the movable part of any of the above aspects in the X direction. For example, the or each second coil 100B may be constituted by a solenoid coil extending in the X-X' direction. In this case, the or each second coil may be configured such that applying a current to the or each second coil 100B generates a second driving force to move a permanent magnet or magnetic member of the movable part of any of the above aspects in the X direction, that intermittently applying a current of either a positive or negative polarity to the or each second coil 100B intermittently generates a second driving force (Lorentz force) to move the permanent magnet 310 or the magnetic member 310' in the X direction, or applying a current reversed in polarity repeatedly at predetermined intervals to the or each second coil 100B alternately generates a second driving force (Lorentz force) to move the permanent magnet 310 or the magnetic member 310' in the X direction and a fourth driving force (Lorentz force) to move the permanent magnet 310 or the magnetic member 310' in the X' direction.

The second coil of any of the above aspects and/or the second non-movable part of any of the above aspects can be omitted. Where both the second coil and the second non-movable part are omitted, the or each first coil and the movable part of any of the above aspects may have configuration (I) or (II) below.

(I) Applying a current reversed in polarity repeatedly at predetermined intervals to the or each first coil 100A alternately generates a first driving force (Lorentz force) to move the permanent magnet or magnetic member of the movable part of any of the above aspects in the X direction and a third driving force (Lorentz force) to move the permanent magnet or magnetic member of the movable part of any of the above aspects in the X' direction. The first and third driving forces alternately generated cause the permanent magnet or magnetic member of the movable part of any of the above aspects to alternately repeat a relative and linear movement from the second position to the first position and a relative and linear movement from the first position to the second position, relative to the or each first coil 100A and the first non-movable part, or relative to the first non-movable part. In the actuator A1, A2, or A4, as the movable part 300 or 300' moves in the X and X' directions from the neutral position, the first and second enlarging portions of the permanent magnet 310 or the magnetic member 310' gradually enlarge. The first enlarging portion of the permanent magnet 310 is magnetically attracted toward the first non-movable part 200A, or alternatively the first enlarging portion of the magnetic member 310' is magnetically attracted by the first non-movable part 200A", and the magnetic attraction causes the movable part 300 to move in the X' direction. The second enlarging portion of the permanent magnet 310 is magnetically attracted toward the first non-movable part 200A, or alternatively the second enlarging portion of the magnetic member 310' is magnetically attracted by the first non-movable part 200A", and the magnetic attraction causes the movable part 300 to move in the X direction. In the actuator A3, as the movable part 300 moves in the X direction from the neutral position, the first and second enlarging portions of the permanent magnet 310 gradually enlarge. The first and second enlarging portions of the permanent magnet 310 are magnetically attracted toward the first non-movable part 200A', and the magnetic attractions cause the movable part 300 to move in the X' direction. As the movable part 300 moves in the X' direction from the neutral position, the third and fourth enlarging portions of the permanent magnet 310 gradually enlarge. The third and fourth enlarging portions of the permanent magnet 310 are magnetically attracted toward the first non-movable part 200A', and the magnetic attractions cause the movable part 300 to move in the X direction. In the case of the actuator A5, as the movable part 300" moves in the X direction from the neutral position, the third and fourth enlarging portions of the first non-movable part 200A''' gradually enlarge. The third and fourth enlarging portions magnetically attract the magnetic member 310", and the magnetic attractions cause the movable part 300" to move in the X' direction. As the movable part 300" moves in the X' direction from the neutral position, the first and second enlarging portions of the first non-movable part 200A''' gradually enlarge. The first and second enlarging portions magnetically attract the magnetic member 310", and the magnetic attractions cause the movable part 300" to move in the X direction.

(II) Intermittently applying a current of either a positive or negative polarity to the or each first coil 100A intermittently generates intermittently generates a first driving force (Lorentz force) to move the permanent magnet or magnetic member of the movable part of any of the above aspects in the X direction, and the first driving force causes the permanent magnet or magnetic member of the movable part of any of the above aspects to intermittently move relatively and linearly from the neutral position to the first position relative to the or each first coil and the first non-movable part, or relative to the first non-movable part. In the actuator A1, A2, or A4, the first enlarging portion of the permanent magnet 310 or the magnetic member 310' gradually enlarges. The first enlarging portion of the permanent magnet 310 is magnetically attracted toward the first non-movable part 200A, or alternatively the first enlarging portion of the magnetic member 310' is magnetically attracted by and toward the first non-movable part 200A", and the magnetic attraction causes the movable part 300 or 300' to move in the X' direction. In the actuator A3, as the movable part 300 moves in the X direction from the neutral position, the first and second enlarging portions of the permanent magnet 310 gradually enlarge. The first and second enlarging portions of the permanent magnet 310 are magnetically attracted toward the first non-movable part 200A', and the magnetic attraction causes the movable part 300 to move in the X' direction. In the actuator A5, as the movable part 300" moves in the X direction from the neutral position, the third and fourth enlarging portions of the first non-movable part 200A''' gradually enlarge. The third and fourth enlarging portions magnetically attract the magnetic member 310", and the magnetic attraction causes the movable part 300" to move in the X' direction.

In the actuator A4 of any of the above aspects, the second coil 100B and the second non-movable part 200B" may be omitted and instead two movable parts 300', two first coils 100A, and two guides may be provided. In this case, the actuator A4 of any of the above aspects has similar configuration to that of the actuator A4 of any of the above aspects but are different in the following points. For convenience of description, one of the two movable parts 300' may be referred to as "one movable part 300'," the other one may be referred to as "the other movable part 300';" one of the two first coils 100A may be referred to as "one first coil 100A," the other one may be referred to as "the other first coil 100A;" one of the two guides may be referred to as "one guide," and the other may be referred to as "the other guide." The one movable part 300' is positioned on the Z-direction side relative to, and in spaced relation to, the first non-movable part 200A", and the other movable part 300' is positioned on the Z'-direction side relative to, and in spaced relation to, the first non-movable part 200A". The one first coil 100A is fixed to the one movable part 300' and positioned between the one movable part 300' and the first non-movable part 200A", and the other first coil 100A is fixed to the other movable part 300' and is positioned between the other movable part 300' and the first non-movable part 200A". The one guide and the one movable part 300' have any of configurations (1) to (4) described above, and the other guide and the other movable part 300' have any of configurations (1) to (4) described above. In the first movement aspect, applying a current reversed in polarity repeatedly at predetermined intervals to the one first coil 100A alternately generates a first driving force (Lorentz force) to move the magnetic member 310' of one movable part 300' in the X direction and a third driving force (Lorentz force) to move the magnetic member 310' of the one movable part 300' in the X' direction. Also, applying a current reversed in polarity repeatedly at predetermined intervals to the other first coil 100A alternately generates a first driving force (Lorentz force) to move the magnetic member 310' of the other movable part 300' in the X direction and a third driving force (Lorentz force) to move the magnetic member 310' of the other movable part 300' in the X' direction. In this first movement aspect, the one movable part 300' and the first non-movable part 200A" have configuration (A') or (B') above and configuration (C') or (D') above, and the other movable part 300' and the first non-movable part 200A" have configuration (A') or (B') above and configuration (C') or (D') above. On the other hand, in the second movement aspect, intermittently applying a current of either a positive or negative polarity to the one first coil 100A intermittently generates a first driving force (Lorentz force) to move the magnetic member 310' of one movable part 300' in the X direction, and intermittently applying a current of either a positive or negative polarity to the other first coil 100A intermittently generates a first driving force (Lorentz force) to move the magnetic member 310' of the other movable part 300' in the X direction. In the second movement aspect, the movable part 300' and the first non-movable part 200A" have configuration (A') or (B') above.

In the actuator A5 of any of the above aspects, the second coil 100B and the second non-movable part 200B''' may be omitted and instead two movable parts 300", two first coils 100A, and two guides may be provided. In this case, the actuator A5 of any of the above aspects has similar configuration to that of the actuator A5 of any of the above aspects but are different in the following points. For convenience of description, one of the two movable parts 300" may be referred to as "one movable part 300"," the other one may be referred to as "the other movable part 300";" one of the two first coils 100A may be referred to as "one first coil 100A," the other one may be referred to as "the other first coil 100A;" one of the two guides may be referred to as "one guide," and the other may be referred to as "the other guide." The one movable part 300" is positioned on the Z-direction side relative to, and in spaced relation to, the first non-movable part 200A''', and the other movable part 300" is positioned on the Z'-direction side relative to, and in spaced relation to, the first non-movable part 200A'''. The one first coil 100A is fixed to the one movable part 300" and positioned between the one movable part 300" and the first non-movable part 200A''', and the other first coil 100A is fixed to the other movable part 300" and is positioned between the other movable part 300" and the first non-movable part 200A'''. The one guide and the one movable part 300" have any of configurations (1) to (4) described above, and the other guide and the other movable part 300" have any of configurations (1) to (4) described above. In the first movement aspect, applying a current reversed in polarity repeatedly at predetermined intervals to the one first coil 100A alternately generates a first driving force (Lorentz force) to move the magnetic member 310" of one movable part 300" in the X direction and a third driving force (Lorentz force) to move the magnetic member 310" of the one movable part 300" in the X' direction. Also, applying a current reversed in polarity repeatedly at predetermined intervals to the other first coil 100A alternately generates a first driving force (Lorentz force) to move the magnetic member 310" of the other movable part 300" in the X direction and a third driving force (Lorentz force) to move the magnetic member 310" of the other movable part 300" in the X' direction. In this first movement aspect, the first non-movable part 200A''' includes the first portion 201A''', the second portion 202A''', the third portion 203A''', and the fourth portion 204A'''. On the other hand, in the second movement aspect, intermittently applying a current of either a positive or negative polarity to the one first coil 100A intermittently generates a first driving force (Lorentz force) to move the magnetic member 310" of one movable part 300" in the X direction, and intermittently applying a current of either a positive or negative polarity to the other first coil 100A intermittently generates a first driving force (Lorentz force) to move the magnetic member 310" of the other movable part 300" in the X direction. In the second movement aspect, the first non-movable part 200A''' includes the third portion 203A''' and the fourth portion 204A'''.

In any of the above cases, the permanent magnet 310, the first and second non-movable parts 200A", 200B"; or 200A''', 200B''' may be magnetized as described above or magnetized such that the X- and X'-direction sides thereof form the north and south poles, respectively.

The current to be applied to the first coil of any of the above aspects may be any current that can be applied to the first coil and thereby provide a driving force to move a permanent magnet at least from the neutral position to the first position. The current to be applied to the second coil of any of the above aspects may be any current that can be applied to the second coil and thereby provide a driving force to move a permanent magnet at least from the neutral position to the first position.

The housing of any of the above aspects may include only the first housing. Where the second coil and the second non-movable part are omitted, the first housing may be configured to hold the first coil and the first non-movable part of any of the above aspects. Where the second coil and the second non-movable part are provided, the first housing may be configured to hold the first and second coils and the first and second non-movable parts of any of the above aspects. In any of these cases, the accommodation recess may be omitted from the first housing.

The electromagnetic actuator of any of the above aspects may further include a first biasing member and/or a second biasing member. The first biasing member may be a spring or a member constituted by an elastic substance, such as rubber, and may be configured to directly or indirectly bias in the X' direction the movable part of any of the above aspects positioned at the first position. For example, the housing may be provided with a first receiving portion on the X-direction side relative to the movable part of any of the above aspects, and the first biasing member may be interposed between the movable part and the first receiving portion and configured to bias in the X' direction the movable part positioned at the first position. The second biasing member may be a spring or a member constituted by an elastic substance, such as rubber, and may be configured to directly or indirectly bias in the X direction the movable part of any of the above aspects positioned at the second position. For example, the housing may be provided with a second receiving portion on the X'-direction side relative to the movable part of any of the above aspects, and the second biasing member may be interposed between the movable part and the second receiving portion and configured to bias in the X direction the movable part positioned at the second position. In short, the invention is not limited to the configuration in which a driving force in the direction opposite to the moving direction of the movable part is applied to the movable part in a non-contact manner only.

The electromagnetic actuator of any of the above aspects is applicable to devices other than vibration generators. For example, the electromagnetic actuator of the invention is applicable to a solenoid valve or the like that opens and closes a solenoid or a valve by moving a movable part.

REFERENCE SIGNS LIST

B1: vibration generator
A1: electromagnetic actuator
100A: first coil; 100B: second coil
200A, 200A', 200A", 200A'": first non-movable part; 200B, 200B', 200B", 200B'": second non-movable part
201A, 201B, 201A", 201B": first end; 202A, 202B, 202A", 202B": second end
300, 300': movable part
310: permanent magnet; 310': magnetic member
311, 311': first end portion; 311a, 311a': first end
312, 312': second end portion; 312a, 312a': second end
320: holder
321: first end portion; 322: second end portion
323: first runner; 324: second runner
400: housing
410: first housing
411: first facing portion
411a: inner face; 411b: outer face; 411c: inner portion
412: first and second support recesses
413: holding portion
420: second housing
421: second facing portion
421a: inner face; 421b: outer face; 421c: inner portion
422: holding portion
500: first and second guide rails
600: circuit board The disclosure of this application also includes the following clauses numbered 1 through 23:

Clause 1. An electromagnetic actuator comprising:
a first coil;
a first non-movable part being constituted by a magnetic substance, extending in a first direction, being disposed on one side in a second direction relative to the first coil, and including a first end on one side in the first direction, the second direction being substantially orthogonal to the first direction; and
a movable part including a permanent magnet and being movable in the first direction, the first direction being a moving direction of the movable part, wherein
the permanent magnet extends in the first direction, is disposed on the other side in the second direction relative to the first coil, and includes a first end portion on the one side in the first direction, the first end portion having a first end on the one side in the first direction,
the movable part at a neutral position is disposed such that the first end of the permanent magnet is at a relative position in the first direction that substantially coincides with the first end of the first non-movable part, or such that the first end portion of the permanent magnet is positioned, in the first direction, on the one side in the first direction relative to the first end of the first non-movable part,
applying a current to the first coil generates a first driving force to move the permanent magnet to the one side in the first direction, and the first driving force moves the movable part relatively and linearly from the neutral position to a first position relative to the first coil and the first non-movable part, the first position being located on the one side in the first direction relative to the neutral position,
as the movable part moves from the neutral position to the one side in the first direction, a first enlarging portion of the permanent magnet that is positioned on the one side in the first direction relative to the first end of the first non-movable part gradually enlarges, and
the first enlarging portion of the permanent magnet is magnetically attracted toward the first non-movable part, so that the movable part moves to the other side in the first direction.

Clause 2. The electromagnetic actuator according to claim 1, further comprising:
a second coil; and
a second non-movable part being constituted by a magnetic substance, extending in the first direction, being disposed on the other side in the second direction relative to the second coil, and including a first end on the one side in the first direction,
the first coil is disposed in the second direction between the movable part and the first non-movable part, and the second coil is disposed in the second direction between the movable part and the second non-movable part,
the movable part is disposed in the second direction between the first coil and the second coil, and the movable part at the neutral position is disposed such that the first end of the permanent magnet is at a relative position in the first direction that substantially coincides with the first end of the second non-movable part, or such that the first end portion of the permanent magnet is positioned, in the first direction, on the one side in the first direction relative to the first end of the second non-movable part,
applying a current to the second coil generates a second driving force to move the permanent magnet to the one side in the first direction,
the first and second driving forces move the movable part relatively and linearly from the neutral position to the first position relative to the first and second coils and the first and second non-movable parts,
as the movable part moves from the neutral position to the one side in the first direction, the first enlarging portion of the permanent magnet, which is also positioned on the one side in the first direction relative to the first end of the second non-movable part, gradually enlarges, and
the first enlarging portion of the permanent magnet is magnetically attracted toward the first and second non-movable parts, so that the movable part moves to the other side in the first direction.

Clause 3. An electromagnetic actuator comprising:
a first coil;
a first non-movable part being constituted by a permanent magnet, extending in a first direction, being disposed on one side in a second direction relative to the first coil, and including a first end on one side in the first direction, the second direction being substantially orthogonal to the first direction; and
a movable part being fixed to the first coil, being movable in the first direction together with the first coil, and including a magnetic member constituted by a magnetic substance, the first direction being a moving direction of the movable part, wherein
the magnetic member extends in the first direction, is disposed on the other side in the second direction relative to the first coil, and includes a first end portion on the one side in the first direction, the first end portion having a first end on the one side in the first direction, the movable part at a neutral position is disposed such that the first end of the magnetic member is at a relative position in the first direction that substantially coincides with the first end of the first non-movable part, or such that the first end portion of the magnetic member is positioned, in the first direction, on the one side in the first direction relative to the first end of the first non-movable part, applying a current to the first coil generates a first driving force to move the magnetic member to the one side in the first direction, and the first driving force moves the movable part and the first coil relatively and linearly from the neutral position to a first position relative to the first non-movable part, the first position being located on the one side in the first direction relative to the neutral position, as the movable part moves from the neutral position to the one side in the first direction, a first enlarging portion of the magnetic member that is positioned on the one side in the first direction relative to the first end of the first non-movable part gradually enlarges, and the first enlarging portion of the magnetic member is magnetically attracted by the first non-movable part, so that the movable part moves to the other side in the first direction.

Clause 4. The electromagnetic actuator according to clause 3, further comprising:

a second coil; and a second non-movable part being constituted by a permanent magnet, extending in the first direction, being disposed on the other side in the second direction relative to the second coil, and including a first end on the one side in the first direction, the first coil is disposed in the second direction between the movable part and the first non-movable part, and the second coil is disposed in the second direction between the movable part and the second non-movable part, the movable part is fixed to the second coil and disposed in the second direction between the first coil and the second coil, the movable part at the neutral position is disposed such that the first end of the magnetic member is at a relative position in the first direction that substantially coincides with the first end of the second non-movable part, or such that the first end portion of the magnetic member is positioned, in the first direction, on the one side in the first direction relative to the first end of the second non-movable part, applying a current to the second coil generates a second driving force to move the magnetic member to the one side in the first direction, the first and second driving forces move the movable part and the first and second coils relatively and linearly from the neutral position to the first position relative to the first and second non-movable parts, as the movable part moves from the neutral position to the one side in the first direction, the first enlarging portion of the magnetic member, which is also positioned on the one side in the first direction relative to the first end of the second non-movable part, gradually enlarges, and the first enlarging portion of the magnetic member is magnetically attracted by the first and second non-movable parts, so that the movable part moves to the other side in the first direction.

Clause 5. An electromagnetic actuator comprising:

a first coil;

a first non-movable part being constituted by a permanent magnet, extending in a first direction, being disposed on one side in a second direction relative to the first coil, and including a first end on one side in the first direction and a second end on the other side in the first direction, the second direction being substantially orthogonal to the first direction; and a movable part being fixed to the first coil, being movable in the first direction together with the first coil, and including a magnetic member constituted by a magnetic substance, the first direction being a moving direction of the movable part, wherein the magnetic member extends in the first direction, is disposed on the other side in the second direction relative to the first coil, and includes a first end portion on the one side in the first direction and a second end portion on the other side in the first direction, the first end portion having a first end on the one side in the first direction, the second end portion having a second end on the other side in the first direction, the movable part at a neutral position is disposed such that the first end of the magnetic member is at a relative position in the first direction that substantially coincides with the first end of the first non-movable part or such that the first end portion of the magnetic member is positioned, in the first direction, on the one side in the first direction relative to the first end of the first non-movable part, and such that the second end of the magnetic member is at a relative position in the first direction that substantially coincides with the second end of the first non-movable part or such that the second end portion of the magnetic member is positioned, in the first direction, on the other side in the first direction relative to the second end of the first non-movable part, applying a current, which is reversed in polarity repeatedly at predetermined intervals, to the first coil alternately generates a first driving force to move the magnetic member to the one side in the first direction and a third driving force to move the magnetic member to the other side in the first direction, and the first and third driving forces alternately move the movable part and the first coil relatively and linearly from a second position to a first position, and relatively and linearly from the first position to the second position, relative to the first non-movable part, the first position being located on the one side in the first direction relative to the neutral position, the second position being located on the other side in the first direction relative to the neutral position, the neutral position being located in the first direction between the first position and the second position, as the movable part moves from the neutral position to the one side in the first direction, a first enlarging portion of the magnetic member that is positioned on the one side in the first direction relative to the first end of the first non-movable part gradually enlarges, as the movable part moves from the neutral position to the other side in the first direction, a second enlarging portion of the magnetic member that is positioned on the other side in the first direction relative to the second end of the first non-movable part gradually enlarges, the first enlarging portion of the magnetic member is magnetically attracted by the first non-movable part, so that the movable part moves to the other side in the first direction, and the second enlarging portion of the magnetic member is magnetically attracted by the first non-movable part, so that the movable part moves to the one side in the first direction.

Clause 6. The electromagnetic actuator according to clause 5, further comprising:

a second coil; and a second non-movable part being constituted by a permanent magnet, extending in the first direction, being disposed on the other side in the second direction relative to the second coil, and including a first end on the one side in the first direction and a second end on the other side in the first direction, the first coil is disposed in the second direction between the movable part and the first non-movable part, and the second coil is disposed in the second direction between the movable part and the second non-movable part, the movable part is fixed to the second coil and disposed in the second direction between the first coil and the second coil, and the movable part at the neutral position is disposed such that the first end of the magnetic member is at a relative position in the first direction that substantially coincides with the first end of the second non-movable part or such that the first end portion of the magnetic member is positioned, in the first direction, on the one side in the first direction relative to the first end of the second non-movable part, and such that the second end of the magnetic member is at a relative position in the first direction that substantially coincides with the second end of the second non-movable part or such that the second end portion of the magnetic member is positioned, in the first direction, on the other side in the first direction relative to the second end of the second non-movable part, applying a current, which is reversed in polarity repeatedly at predetermined intervals, to the second coil alternately generates a second driving force to move the magnetic member to the one side in the first direction and a fourth driving force to move the magnetic member to the other side in the first direction, the first and second driving forces and third and fourth driving forces alternately generated alternately move the movable part and the first and second coils relatively and linearly from the second position to the first position, and relatively and linearly from the first position to the second position, relative to the first and second non-movable parts, as the movable part moves from the neutral position to the one side in the first direction, the first enlarging portion of the magnetic member, which is also positioned on the one side in the first direction relative to the first end of the second non-movable part, gradually enlarges, as the movable part moves from the neutral position to the other side in the first direction, the second enlarging portion of the magnetic member, which is also positioned on the other side in the first direction relative to the second end of the second non-movable part, gradually enlarges, the first enlarging portion of the magnetic member is magnetically attracted by the first and second non-movable parts, so that the movable part moves to the other side in the first direction, and the second enlarging portion of the magnetic member is magnetically attracted by the first and second non-movable parts, so that the movable part moves to the one side in the first direction.

Clause 7. An electromagnetic actuator comprising:
a first coil;
a first non-movable part being constituted by a permanent magnet, extending in a first direction including one and the other sides, being disposed on one side in a second direction relative to the first coil, and including a third portion and a fourth portion on the other side in the first direction relative to the third portion, the second direction being substantially orthogonal to the first direction; and
a movable part including a magnetic member constituted by a magnetic substance, being fixed to the first coil, and being movable in the first direction together with the first coil, the first direction being a moving direction of the movable part, wherein the magnetic member extends in the first direction, is disposed on the other side in the second direction relative to the first coil, and has an opening extending through the magnetic member in the second direction, the opening includes a first edge portion on one side in the first direction of the opening and a second edge portion on the other side in the first direction of the opening, the first edge portion of the opening includes a first edge on the one side in the first direction of the opening, and the second edge portion of the opening includes a second edge on the other side in the first direction of the opening, the movable part at a neutral position is disposed such that the first edge portion of the opening of the magnetic member is positioned in the second direction in spaced relation to the third portion of the first non-movable part, such that the opening of the magnetic member is positioned in the second direction in spaced relation to the fourth portion of the first non-movable part, and such that the first edge and the second edge of the opening of the magnetic member substantially coincide in the first direction with an end on the other side in the first direction of the third portion of the first non-movable part and an end on the other side in the first direction of the fourth portion of the first non-movable part, respectively, applying a current to the first coil generates a first driving force to move the magnetic member to the one side in the first direction, and the first driving force moves the movable part and the first coil relatively and linearly from the neutral position to a first position relative to the first non-movable part, the first position being located on the one side in the first direction relative to the neutral position, as the movable part moves from the neutral position to the one side in the first direction, a third enlarging portion of the third portion of the first non-movable part that is positioned on the other side in the first direction relative to the first edge of the movable part and a fourth enlarging portion of the fourth portion of the first non-movable part that is positioned on the other side in the first direction relative to the second edge of the movable part gradually enlarge, and the third and fourth enlarging portions of the first non-movable part magnetically attract the magnetic member, so that the movable part moves to the other side in the first direction.

Clause 8. The electromagnetic actuator according to clause 7, further comprising:
a second coil; and
a second non-movable part being constituted by a permanent magnet, extending in the first direction, being disposed on the other side in the second direction relative to the second coil, and including a third portion and a fourth portion on the other side in the first direction relative to the third portion of the second non-movable part, the first coil is disposed in the second direction between the movable part and the first non-movable part, and the second coil is disposed in the second direction between the movable part and the second non-movable part, the movable part is fixed to the second coil and disposed in the second direction between the first coil and the second coil, the movable part at the neutral position is disposed such that the first edge portion of the opening of the magnetic member is positioned in the second direction in spaced relation to the third portion of the second non-movable part, such that the opening of the magnetic member is positioned in the second direction in spaced relation to the fourth portion of the second non-movable part, and such that the first edge and the second edge of the opening of the magnetic member substantially coincide in the first direction with the end on the other side in the first direction of the third portion of the second non-movable part and the end on the other side in the first direction of the fourth portion of the second non-movable part, respectively, applying a current to the second coil generates a second driving force to move the magnetic member to the one side in the first direction, the first and second driving forces move the movable part and the first and second coils relatively and linearly from the neutral position to the first position relative to the first and second non-movable parts, as the movable part moves from the neutral position to the one side in the first direction, a third enlarging portion of the third portion of the second non-movable part that is positioned on the other side in the first direction relative to the first edge of the movable part and a fourth enlarging portion of the fourth portion of the second non-movable part that is positioned on the other side in the first direction relative to the second edge of the movable part gradually enlarge, and the third and fourth enlarging portions of the second non-movable part magnetically attract the magnetic member, so that the movable part moves to the other side in the first direction.

Clause 9. An electromagnetic actuator comprising:

a first coil;

a first non-movable part being constituted by a permanent magnet, extending in a first direction including one and the other sides, being disposed on one side in a second direction relative to the first coil, and including a first portion, a second portion on the other side in the first direction relative to the first portion, a third portion on the one side in the first direction relative to the first portion, and a fourth portion between the first portion and the second portion, the second direction being substantially orthogonal to the first direction; and a movable part including a magnetic member constituted by a magnetic substance, being fixed to the first coil, and being movable in the first direction together with the first coil, the first direction being a moving direction of the movable part, wherein the magnetic member extends in the first direction, is disposed on the other side in the second direction relative to the first coil, and has an opening extending through the magnetic member in the second direction, the opening includes a first edge portion on one side in the first direction of the opening and a second edge portion on the other side in the first direction of the opening, the first edge portion of the opening includes a first edge on the one side in the first direction of the opening, and the second edge portion of the opening includes a second edge on the other side in the first direction of the opening, the movable part at a neutral position is disposed such that the first edge portion of the opening of the magnetic member is positioned in the second direction in spaced relation to the third portion of the first non-movable part, such that the opening of the magnetic member is positioned in the second direction in spaced relation to the fourth portion of the first non-movable part, such that the opening of the magnetic member is positioned in the second direction in spaced relation to the first portion of the first non-movable part, such that the second edge portion of the opening of the magnetic member is positioned in the second direction in spaced relation to the second portion of the first non-movable part, such that the first edge and the second edge of the opening of the magnetic member substantially coincide in the first direction with an end on the other side in the first direction of the third portion of the first non-movable part and an end on the other side in the first direction of the fourth portion of the first non-movable part, respectively, and such that the first edge and the second edge of the opening of the magnetic member substantially coincide in the first direction with an end on the one side in the first direction of the first portion of the first non-movable part and an end on the one side in the first direction of the second portion of the first non-movable part, respectively, applying a current, which is reversed in polarity repeatedly at predetermined intervals, to the first coil alternately generates a first driving force to move the magnetic member to the one side in the first direction and a third driving force to move the magnetic member to the other side in the first direction, and the first and third driving forces alternately move the movable part and the first coil relatively and linearly from a second position to a first position, and relatively and linearly from the first position to the second position, relative to the first non-movable part, the first position being located on the one side in the first direction relative to the neutral position, the second position being located on the other side in the first direction relative to the neutral position, the neutral position being located in the first direction between the first position and the second position, as the movable part moves from the neutral position to the one side in the first direction, a third enlarging portion of the third portion of the first non-movable part that is positioned on the other side in the first direction relative to the first edge of the movable part and a fourth enlarging portion of the fourth portion of the first non-movable part that is positioned on the other side in the first direction relative to the second edge of the movable part gradually enlarge, as the movable part moves from the neutral position to the other side in the first direction, a first enlarging portion of the first portion of the first non-movable part that is positioned on the one side in the first direction relative to the first edge of the movable part and a second enlarging portion of the second portion of the first non-movable part that is positioned on the one side in the first direction relative to the second edge of the movable part gradually enlarge, the third and fourth enlarging portions of the first non-movable part magnetically attract the magnetic member, so that the movable part moves to the other side in the first direction, and the first and second enlarging portions of the first non-movable part magnetically attract the magnetic member, so that the movable part moves to the one side in the first direction.

Clause 10. The electromagnetic actuator according to clause 9, further comprising:

a second coil; and a second non-movable part being constituted by a permanent magnet, extending in the first direction, being disposed on the other side in the second direction relative to the second coil, and including a first portion, a second portion on the other side in the first direction relative to the first portion of the second non-movable part, a third portion on the one side in the first direction relative to the first portion of the second non-movable part, and a fourth portion between the first portion and the second portion of the second non-movable part, the first coil is disposed in the second direction between the movable part and the first non-movable part, and the second coil is disposed in the second direction between the movable part and the second non-movable part, the movable part is fixed to the second coil and disposed in the second direction between the first coil and the second coil, the movable part at the neutral position is disposed such that the first edge portion of the opening of the magnetic member is positioned in the second direction in spaced relation to the third portion of the second non-movable part, such that the opening of the magnetic member is positioned in the second direction in spaced relation to the fourth portion of the second non-movable part, such that the opening of the magnetic member is positioned in the second direction in spaced relation to the first portion of the second non-movable part, such that the second edge portion of the opening of the magnetic member is positioned in the second direction in spaced relation to the second portion of the second non-movable part, such that the first edge and the second edge of the opening of the magnetic member substantially coincide in the first direction with the end on the other side in the first direction of the third portion of the second non-movable part and the end on the other side in the first direction of the fourth portion of the second non-movable part, respectively, and such that the first edge and the second edge of the opening of the magnetic member substantially coincide in the first direction with the end on the one side in the first direction of the first portion of the second non-movable part and the end on the one side in the first direction of the second portion of the second non-movable part, respectively, applying a current, which is reversed in polarity repeatedly at predetermined intervals, to the second coil alternately generates a second driving force to move the magnetic member to the one side in the first direction and a fourth driving force to move the magnetic member to the other side in the first direction, the first and second driving forces and third and fourth driving forces alternately generated alternately move the movable part and the first and second coils relatively and linearly from the second position to the first position, and relatively and linearly from the first position to the second position, relative to the first and second non-movable parts, as the movable part moves from the neutral position to the one side in the first direction, a third enlarging portion of the third portion of the second non-movable part that is positioned on the other side in the first direction relative to the first edge of the movable part and a fourth enlarging portion of the fourth portion of the second non-movable part that is positioned on the other side in the first direction relative to the second edge of the movable part gradually enlarge, as the movable part moves from the neutral position to the other side in the first direction, the first enlarging portion of the first portion of the second non-movable part, which is also positioned on the one side in the first direction relative to the first edge of the movable part, and the second enlarging portion of the second portion of the second non-movable part, which is also positioned on the one side in the first direction relative to the second edge of the movable part, gradually enlarge, the third and fourth enlarging portions of the second non-movable part magnetically attract the magnetic member, so that the movable part moves to the other side in the first direction, and.

the first and second enlarging portions of the second non-movable part magnetically attract the magnetic member, so that the movable part moves to the one side in the first direction.

Clause 11. The electromagnetic actuator according to clause 2, 4, 6, 8, or 10, wherein a first distance in the second direction from the first non-movable part to the movable part is substantially equal to a second distance in the second direction from the second non-movable part to the movable part.

Clause 12. The electromagnetic actuator according to clause 1, 3, or 7, wherein a current having one of two polarities is intermittently applied to the first coil.

Clause 13. The electromagnetic actuator according to clause 2, 4, or 8, wherein a current having one of two polarities is intermittently applied to the first and second coils.

Clause 14. The electromagnetic actuator according to clause 1, further comprising a housing, wherein the first coil and the first non-movable part are directly or indirectly fixed to the housing.

Clause 15. The electromagnetic actuator according to clause 2, further comprising a housing, wherein the first and second coils and the first and second non-movable parts are directly or indirectly fixed to the housing.

Clause 16. The electromagnetic actuator according to clause 3, 5, 7, or 9, further comprising a housing, wherein the first non-movable part is directly or indirectly fixed to the housing.

Clause 17. The electromagnetic actuator according to clause 4, 6, 8, or 10, further comprising a housing, wherein the first and second non-movable parts are directly or indirectly fixed to the housing.

Clause 18. The electromagnetic actuator according to clause 14 or 16, wherein the housing includes a first facing portion facing the first coil in the second direction, the first facing portion includes an inner face facing the first coil in the second direction, an outer face opposite to the inner face in the second direction, and an inner portion between the inner face and the outer face, and the first non-movable part is fixed to the outer or inner face of the first facing portion or embedded in the inner portion of the first facing portion.

Clause 19. The electromagnetic actuator according to clause 15 or 17, wherein the housing includes a first facing portion facing the first coil in the second direction and a second facing portion facing the second coil in the second direction, the first facing portion includes an inner face facing the first coil in the second direction, an outer face opposite to the inner face in the second direction, and an inner portion between the inner face and the outer face, the second facing portion includes an inner face facing the second coil in the second direction, an outer face opposite to the inner face of the second facing portion in the second direction, and an inner portion between the inner face and the outer face of the second facing portion, the first non-movable part is fixed to the outer or inner face of the first facing portion or embedded in the inner portion of the first facing portion, and the second non-movable part is fixed to the outer or inner face of the second facing portion or embedded in the inner portion of the second facing portion.

Clause 20. The electromagnetic actuator according to clause 2, 8, 10, 11, 13, 15, 17, or 19, further comprising at least one support between the first non-movable part and the second non-movable part in the second direction, the at least one support being configured to support the first and second non-movable parts.

Clause 21. The electromagnetic actuator according to clause 20, further comprising:
a housing to accommodate the first coil, the second coil, and the movable part,
wherein the first non-movable part and the second non-movable part hold the housing therebetween in the second direction.

Clause 22. The electromagnetic actuator according to any one of clauses 1 to 21, further comprising a guide configured to guide the movable part movably in the first direction.

Clause 23. A vibration generator comprising the electromagnetic actuator according to any one of clauses 1 to 12,
wherein the vibration generator vibration is configured to generate vibration by moving the movable part.

The invention claimed is:

1. An electromagnetic actuator comprising:
a first coil;
a first non-movable part being constituted by a magnetic substance, extending in a first direction, being disposed on one side in a second direction relative to the first coil, and having an opening extending through the first non-movable part in the second direction, the opening including a first edge portion on one side in the first direction of the opening and a second edge portion on the other side in the first direction of the opening, the first edge portion of the opening including a first edge on the one side in the first direction of the opening, the second edge portion of the opening including a second edge on the other side in the first direction of the opening, the second direction being substantially orthogonal to the first direction;
a guide configured to guide the movable part movably in the first direction; and
a movable part including a permanent magnet and being movable in the first direction, the first direction being a moving direction of the movable part, wherein
the permanent magnet extends in the first direction, is disposed on the other side in the second direction relative to the first coil, and includes a first portion and a second portion on the other side in the first direction relative to the first portion,
the movable part at a neutral position is disposed such that the first portion of the permanent magnet is positioned in the second direction in spaced relation to the opening of the first non-movable part, such that the second portion of the permanent magnet is positioned in the second direction in spaced relation to the second edge portion of the opening of the first non-movable part, and such that an end on the one side in the first direction of the first portion of the permanent magnet and an end on the one side in the first direction of the second portion of the permanent magnet substantially coincide in the first direction with the first edge and the second edge, respectively, of the opening of the first non-movable part,
applying a current to the first coil generates a first driving force to move the permanent magnet to the one side in the first direction, and the first driving force moves the movable part relatively and linearly from the neutral position to a first position relative to the first coil and the first non-movable part, the first position being located on the one side in the first direction relative to the neutral position,
as the movable part moves from the neutral position to the one side in the first direction, a first enlarging portion of the first portion of the permanent magnet that is positioned on the one side in the first direction relative to the first edge of the opening of the first non-movable part and a second enlarging portion of the second portion of the permanent magnet that is positioned on the one side in the first direction relative to the second edge of the opening of the first non-movable part gradually enlarge, and
the first and second enlarging portions of the permanent magnet are magnetically attracted in a first diagonal direction toward the first non-movable part, so that the movable part moves to the other side in the first direction, wherein the first diagonal direction includes components of the other side in the first direction and the one side in the second direction.

2. The electromagnetic actuator according to claim 1, further comprising:
a second coil; and
a second non-movable part being constituted by a magnetic substance, extending in the first direction, being disposed on the other side in the second direction relative to the second coil, and having an opening extending through the second non-movable part in the second direction, the opening of second non-movable part including a first edge portion on one side in the first direction of the opening of second non-movable part and a second edge portion on the other side in the first direction of the opening of second non-movable part, the first edge portion of the opening of second non-movable part including a first edge on the one side in the first direction of the opening of second non-movable part, the second edge portion of the opening of second non-movable part including a second edge on the other side in the first direction of the opening of second non-movable part,
the first coil is disposed in the second direction between the movable part and the first non-movable part, and the second coil is disposed in the second direction between the movable part and the second non-movable part,
the movable part is disposed in the second direction between the first coil and the second coil,
the movable part at the neutral position is disposed such that the first portion of the permanent magnet is positioned in the second direction in spaced relation to the opening of the second non-movable part, such that the second portion of the permanent magnet is positioned in the second direction in spaced relation to the second edge portion of the opening of the second non-movable part, and such that the end on the one side in the first direction of the first portion of the permanent magnet and the end on the one side in the first direction of the second portion of the permanent magnet substantially coincide in the first direction with the first edge and the second edge, respectively, of the opening of the second non-movable part,
applying a current to the second coil generates a second driving force to move the permanent magnet to the one side in the first direction,
the first and second driving forces move the movable part relatively and linearly from the neutral position to the first position relative to the first and second coils and the first and second non-movable parts,
as the movable part moves from the neutral position to the one side in the first direction, the first enlarging portion of the first portion of the permanent magnet, which is also positioned on the one side in the first direction relative to the first edge of the opening of the second non-movable part, and the second enlarging portion of the second portion of the permanent magnet, which is also positioned on the one side in the first direction relative to the second edge of the opening of the second non-movable part, gradually enlarge, and the first and second enlarging portions of the permanent magnet are magnetically attracted in the first diagonal direction toward the first non-movable part and magnetically attracted in a second diagonal direction toward the second non-movable part, so that the movable part moves to the other side in the first direction, wherein the second diagonal direction includes components of the other side in the first direction and the other side in the second direction.

3. The electromagnetic actuator according to claim 2, wherein a first distance in the second direction from the first non-movable part to the movable part is substantially equal to a second distance in the second direction from the second non-movable part to the movable part.

4. The electromagnetic actuator according to claim 2, wherein a current having one of two polarities is intermittently applied to the first and second coils.

5. The electromagnetic actuator according to claim 2, further comprising a housing,
wherein the first and second coils and the first and second non-movable parts are directly or indirectly fixed to the housing.

6. The electromagnetic actuator according to claim 5, wherein
the housing includes a first facing portion facing the first coil in the second direction and a second facing portion facing the second coil in the second direction,
the first facing portion includes an inner face facing the first coil in the second direction, an outer face opposite to the inner face in the second direction, and an inner portion between the inner face and the outer face,
the second facing portion includes an inner face facing the second coil in the second direction, an outer face opposite to the inner face of the second facing portion in the second direction, and an inner portion between the inner face and the outer face of the second facing portion,
the first non-movable part is fixed to the outer or inner face of the first facing portion or embedded in the inner portion of the first facing portion, and
the second non-movable part is fixed to the outer or inner face of the second facing portion or embedded in the inner portion of the second facing portion.

7. The electromagnetic actuator according to claim 2, further comprising at least one support between the first non-movable part and the second non-movable part in the second direction, the at least one support being configured to support the first and second non-movable parts.

8. The electromagnetic actuator according to claim 7, further comprising:
a housing to accommodate the first coil, the second coil, and the movable part,
wherein the first non-movable part and the second non-movable part hold the housing therebetween in the second direction.

9. The electromagnetic actuator according to claim 3, wherein a current having one of two polarities is intermittently applied to the first coil.

10. The electromagnetic actuator according to claim 3, further comprising a housing,
wherein the first coil and the first non-movable part are directly or indirectly fixed to the housing.

11. The electromagnetic actuator according to claim 10, wherein
the housing includes a first facing portion facing the first coil in the second direction,
the first facing portion includes an inner face facing the first coil in the second direction, an outer face opposite to the inner face in the second direction, and an inner portion between the inner face and the outer face, and
the first non-movable part is fixed to the outer or inner face of the first facing portion or embedded in the inner portion of the first facing portion.

12. An electromagnetic actuator comprising:
a first coil;
a first non-movable part being constituted by a magnetic substance, extending in a first direction, being disposed on one side in a second direction relative to the first coil, and having an opening extending through the first non-movable part in the second direction, the opening including a first edge portion on one side in the first direction of the opening and a second edge portion on the other side in the first direction of the opening, the first edge portion of the opening including a first edge on the one side in the first direction of the opening, the second edge portion of the opening including a second edge on the other side in the first direction of the opening, the second direction being substantially orthogonal to the first direction;
a guide configured to guide the movable part movably in the first direction; and
a movable part including a permanent magnet and being movable in the first direction, the first direction being a moving direction of the movable part, wherein
the permanent magnet extends in the first direction, is disposed on the other side in the second direction relative to the first coil, and includes a first portion, a second portion on the other side in the first direction relative to the first portion, a third portion on the one side in the first direction relative to the first portion, and a fourth portion between the first portion and the second portion,
the movable part at a neutral position is disposed such that the first portion of the permanent magnet is positioned in the second direction in spaced relation to the opening of the first non-movable part, such that the second portion of the permanent magnet is positioned in the second direction in spaced relation to the second edge portion of the opening of the first non-movable part, such that the third portion of the permanent magnet is positioned in the second direction in spaced relation to the first edge portion of the opening of the first non-movable part, such that the fourth portion of the permanent magnet is positioned in the second direction in spaced relation to the opening of the first non-movable part, such that an end on the one side in the first direction of the first portion of the permanent magnet and an end on the one side in the first direction of the second portion of the permanent magnet substantially coincide in the first direction with the first edge and the second edge, respectively, of the opening of the first non-movable part, and such that an end on the other side in the first direction of the third portion of the permanent magnet and an end on the other side in the first direction of the fourth portion of the permanent magnet substantially coincide in the first direction with the first edge and the second edge, respectively, of the opening of the first non-movable part, and
applying a current, which is reversed in polarity repeatedly at predetermined intervals, to the first coil alternately generates a first driving force to move the permanent magnet to the one side in the first direction and a third driving force to move the permanent magnet to the other side in the first direction, and the first and third driving forces alternately move the movable part relatively and linearly from a second position to a first position, and relatively and linearly from the first position to the second position, relative to the first coil and the first non-movable part, the first position being located on the one side in the first direction relative to the neutral position, the second position being located on the other side in the first direction relative to the neutral position, the neutral position being located in the first direction between the first position and the second position, as the movable part moves from the neutral position to the one side in the first direction, a first enlarging portion of the first portion of the permanent magnet that is positioned on the one side in the first direction relative to the first edge of the opening of the first non-movable part and a second enlarging portion of the second portion of the permanent magnet that is positioned on the one side in the first direction relative to the second edge of the opening of the first non-movable part gradually enlarge, as the movable part moves from the neutral position to the other side in the first direction, a third enlarging portion of the third portion of the permanent magnet that is positioned on the other side in the first direction relative to the first edge of the opening of the first non-movable part and a fourth enlarging portion of the fourth portion of the permanent magnet that is positioned on the other side in the first direction relative to the second edge of the opening of the first non-movable part gradually enlarge, the first and second enlarging portions of the permanent magnet are magnetically attracted in a first diagonal direction toward the first non-movable part, so that the movable part moves to the other side in the first direction, wherein the first diagonal direction includes components of the other side in the first direction and the one side in the second direction, and the third and fourth enlarging portions of the permanent magnet are magnetically attracted in a second diagonal direction toward the first non-movable part, so that the movable part moves to the one side in the first direction, wherein the second diagonal direction includes components of the one side in the first direction and the one side in the second direction.

13. The electromagnetic actuator according to claim 12, further comprising:

a second coil; and a second non-movable part being constituted by a magnetic substance, extending in the first direction, being disposed on the other side in the second direction relative to the second coil, and having an opening extending through the second non-movable part in the second direction, the opening of second non-movable part including a first edge portion on one side in the first direction of the opening of second non-movable part and a second edge portion on the other side in the first direction of the opening of second non-movable part, the first edge portion of the opening of second non-movable part including a first edge on the one side in the first direction of the opening of second non-movable part, the second edge portion of the opening of second non-movable part including a second edge on the other side in the first direction of the opening of second non-movable part, the first coil is disposed in the second direction between the movable part and the first non-movable part, and the second coil is disposed in the second direction between the movable part and the second non-movable part, the movable part is disposed in the second direction between the first coil and the second coil, the movable part at the neutral position is disposed such that the first portion of the permanent magnet is positioned in the second direction in spaced relation to the opening of the second non-movable part, such that the second portion of the permanent magnet is positioned in the second direction in spaced relation to the second edge portion of the opening of the second non-movable part, such that the third portion of the permanent magnet is positioned in the second direction in spaced relation to the first edge portion of the opening of the second non-movable part, such that the fourth portion of the permanent magnet is positioned in the second direction in spaced relation to the opening of the second non-movable part, such that the end on the one side in the first direction of the first portion of the permanent magnet and the end on the one side in the first direction of the second portion of the permanent magnet substantially coincide in the first direction with the first edge and the second edge, respectively, of the opening of the second non-movable part, and such that the end on the other side in the first direction of the third portion of the permanent magnet and the end on the other side in the first direction of the fourth portion of the permanent magnet substantially coincide in the first direction with the first edge and the second edge, respectively, of the opening of the second non-movable part, applying a current, which is reversed in polarity repeatedly at predetermined intervals, to the second coil alternately generates a second driving force to move the permanent magnet to the one side in the first direction and a fourth driving force to move the permanent magnet to the other side in the first direction, the first and second driving forces and third and fourth driving forces alternately generated alternately move the movable part relatively and linearly from the second position to the first position, and relatively and linearly from the first position to the second position, relative to the first and second coils and the first and second non-movable parts, as the movable part moves from the neutral position to the one side in the first direction, the first enlarging portion of the first portion of the permanent magnet, which is also positioned on the one side in the first direction relative to the first edge of the opening of the second non-movable part, and the second enlarging portion of the second portion of the permanent magnet, which is also positioned on the one side in the first direction relative to the second edge of the opening of the second non-movable part, gradually enlarge, as the movable part moves from the neutral position to the other side in the first direction, the third enlarging portion of the third portion of the permanent magnet, which is also positioned on the other side in the first direction relative to the first edge of the opening of the second non-movable part, and the fourth enlarging portion of the fourth portion of the permanent magnet, which is also positioned on the other side in the first direction relative to the second edge of the opening of the second non-movable part, gradually enlarge, the first and second enlarging portions of the permanent magnet are magnetically attracted in a third diagonal direction toward the second non-movable part, so that the movable part moves to the other side in the first direction, wherein the third diagonal direction includes components of the other side in the first direction and the other side in the second direction, and the third and fourth enlarging portions of the permanent magnet are magnetically attracted in a fourth diagonal direction toward the second non-movable part, so that the movable part moves to the one side in the first direction, wherein the fourth diagonal direction includes components of the one side in the first direction and the other side in the second direction.

14. The electromagnetic actuator according to claim 13, wherein a first distance in the second direction from the first non-movable part to the movable part is substantially equal to a second distance in the second direction from the second non-movable part to the movable part.

15. The electromagnetic actuator according to claim 13, further comprising a housing,
wherein the first and second coils and the first and second non-movable parts are directly or indirectly fixed to the housing.

16. The electromagnetic actuator according to claim 15, wherein
the housing includes a first facing portion facing the first coil in the second direction and a second facing portion facing the second coil in the second direction,
the first facing portion includes an inner face facing the first coil in the second direction, an outer face opposite to the inner face in the second direction, and an inner portion between the inner face and the outer face,
the second facing portion includes an inner face facing the second coil in the second direction, an outer face opposite to the inner face of the second facing portion in the second direction, and an inner portion between the inner face and the outer face of the second facing portion,
the first non-movable part is fixed to the outer or inner face of the first facing portion or embedded in the inner portion of the first facing portion, and
the second non-movable part is fixed to the outer or inner face of the second facing portion or embedded in the inner portion of the second facing portion.

17. The electromagnetic actuator according to claim 13, further comprising at least one support between the first non-movable part and the second non-movable part in the second direction, the at least one support being configured to support the first and second non-movable parts.

18. The electromagnetic actuator according to claim 17, further comprising:
a housing to accommodate the first coil, the second coil, and the movable part,
wherein the first non-movable part and the second non-movable part hold the housing therebetween in the second direction.

19. The electromagnetic actuator according to claim 12, further comprising a housing,
wherein the first coil and the first non-movable part are directly or indirectly fixed to the housing.

20. The electromagnetic actuator according to claim 19, wherein
the housing includes a first facing portion facing the first coil in the second direction,
the first facing portion includes an inner face facing the first coil in the second direction, an outer face opposite to the inner face in the second direction, and an inner portion between the inner face and the outer face, and
the first non-movable part is fixed to the outer or inner face of the first facing portion or embedded in the inner portion of the first facing portion.

* * * * *

UNITED STATES PATENT AND TRADEMARK OFFICE
CERTIFICATE OF CORRECTION

PATENT NO. : 11,476,744 B2
APPLICATION NO. : 17/241402
DATED : October 18, 2022
INVENTOR(S) : Toyota et al.

Page 1 of 1

It is certified that error appears in the above-identified patent and that said Letters Patent is hereby corrected as shown below:

In the Claims

In Claim 9, at Column 91, Line 61, change "claim 3" to --claim 1--.

In Claim 10, at Column 91, Line 64, change "claim 3" to --claim 1--.

Signed and Sealed this
Third Day of January, 2023

Katherine Kelly Vidal
*Director of the United States Patent and Trademark Office*